(12) United States Patent  
Tsuda et al.

(10) Patent No.: US 6,577,330 B1  
(45) Date of Patent: Jun. 10, 2003

(54) WINDOW DISPLAY DEVICE WITH A THREE-DIMENSIONAL ORIENTATION OF WINDOWS

(75) Inventors: Kenjirou Tsuda, Hirakata (JP); Satoru Inagaki, Suita (JP)

(73) Assignee: Matsushita Electric Industrial Co., Ltd., Osaka-fu (JP)

(*) Notice: Subject to any disclaimer, the term of this patent is extended or adjusted under 35 U.S.C. 154(b) by 0 days.

(21) Appl. No.: 09/463,198

(22) PCT Filed: Aug. 10, 1998

(86) PCT No.: PCT/JP98/03587

§ 371 (c)(1),  
(2), (4) Date: Jan. 18, 2000

(87) PCT Pub. No.: WO99/08178

PCT Pub. Date: Feb. 18, 1999

(30) Foreign Application Priority Data

Aug. 12, 1997 (JP) .............................................. 9-217848  
Sep. 9, 1997 (JP) .............................................. 9-243641

(51) Int. Cl.$^7$ ................................................. G09G 5/00

(52) U.S. Cl. ..................................... 345/782; 345/781

(58) Field of Search ................................ 345/781, 782, 345/848, 849, 850, 851, 852, 427

(56) References Cited

U.S. PATENT DOCUMENTS

| | | | | |
|---|---|---|---|---|
| 5,621,906 A | * | 4/1997 | O'Neill et al. | 345/839 |
| 5,678,015 A | * | 10/1997 | Goh | 345/839 |
| 5,745,109 A | * | 4/1998 | Nakano et al. | 345/823 |
| 5,754,809 A | * | 5/1998 | Gandre | 345/782 |
| 5,880,733 A | * | 3/1999 | Horvitz et al. | 345/427 |
| 5,977,973 A | * | 11/1999 | Sobeski et al. | 345/798 |

FOREIGN PATENT DOCUMENTS

| | | |
|---|---|---|
| EP | 856786 | 8/1998 |
| JP | 5135154 | 6/1993 |
| JP | 5233199 | 9/1993 |
| JP | 6222899 | 8/1994 |
| JP | 9022340 | 1/1997 |

* cited by examiner

Primary Examiner—John Cabeca  
Assistant Examiner—Brian J Detwiler

(57) ABSTRACT

A storage unit 5102 stores image data for a window, and a three-dimensional position calculating unit 5104 calculates a position for the window in a virtual three-dimensional space so that it appears to be at a position inclined in the depth direction. A perspective projection unit 5106 transforms image data so that a window positioned at the calculated coordinates is projected onto a screen in perspective, taking a point in front of the screen as a viewpoint. A frame memory unit 5107 holds image data for the window on which perspective projection has been performed, and a display unit 5108 displays the window on the screen.

24 Claims, 64 Drawing Sheets

FIG. 3A
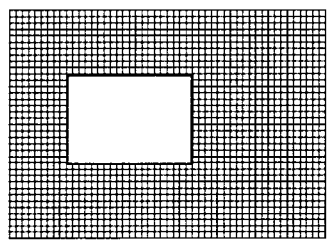
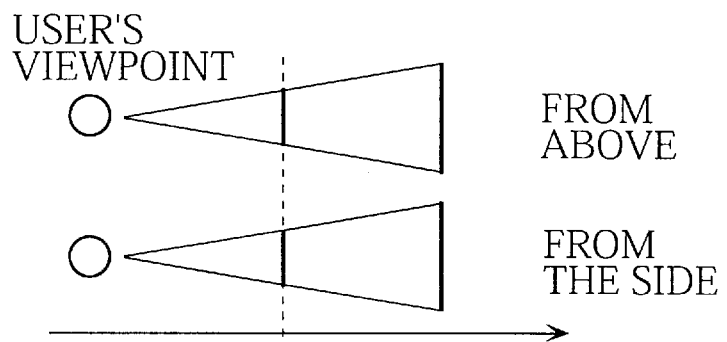
USER'S VIEWPOINT
FROM ABOVE
FROM THE SIDE
FIG. 3B
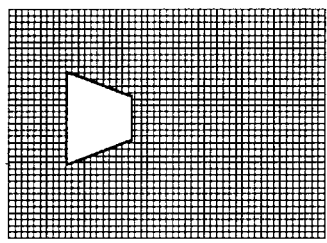
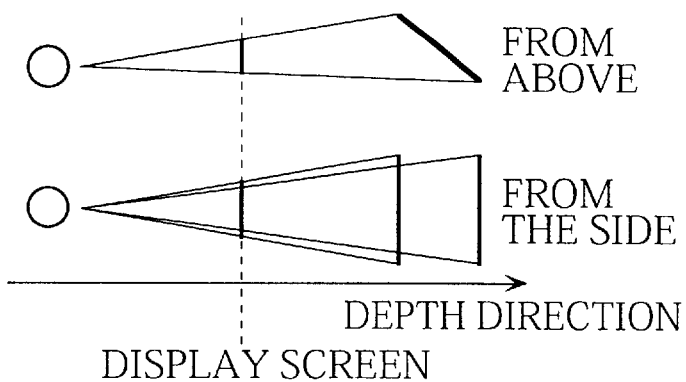
FROM ABOVE
FROM THE SIDE
DEPTH DIRECTION
DISPLAY SCREEN
FIG. 3C
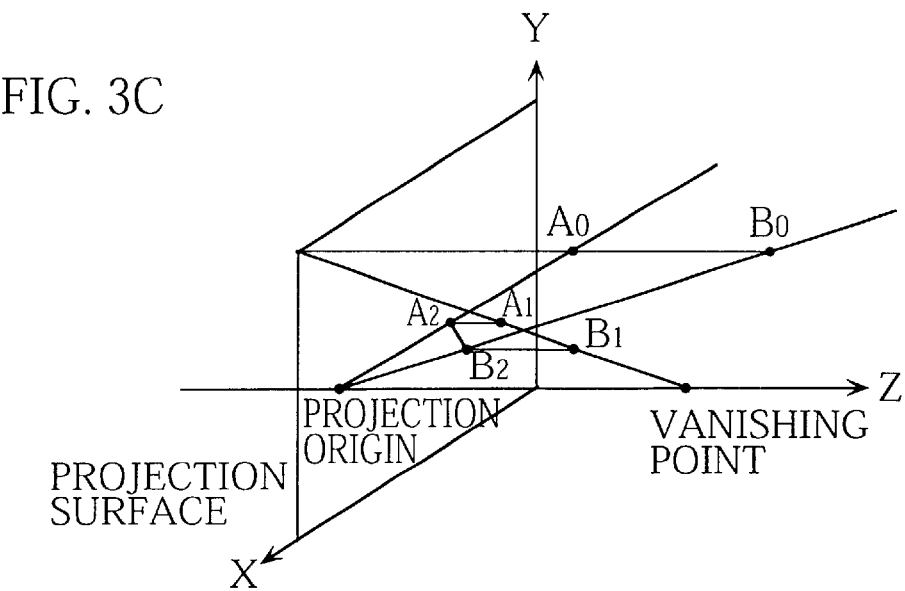
PROJECTION ORIGIN
PROJECTION SURFACE
VANISHING POINT

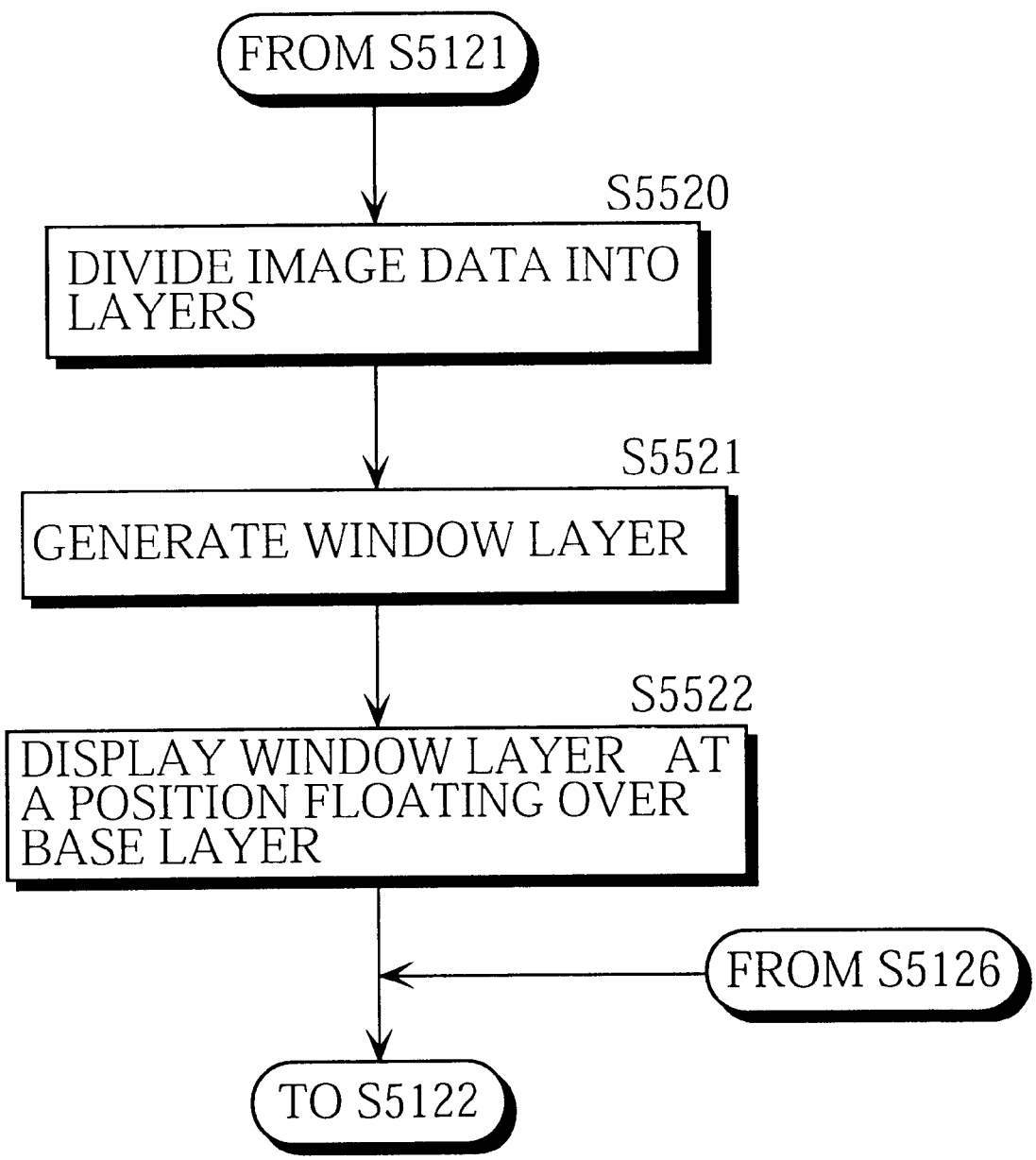

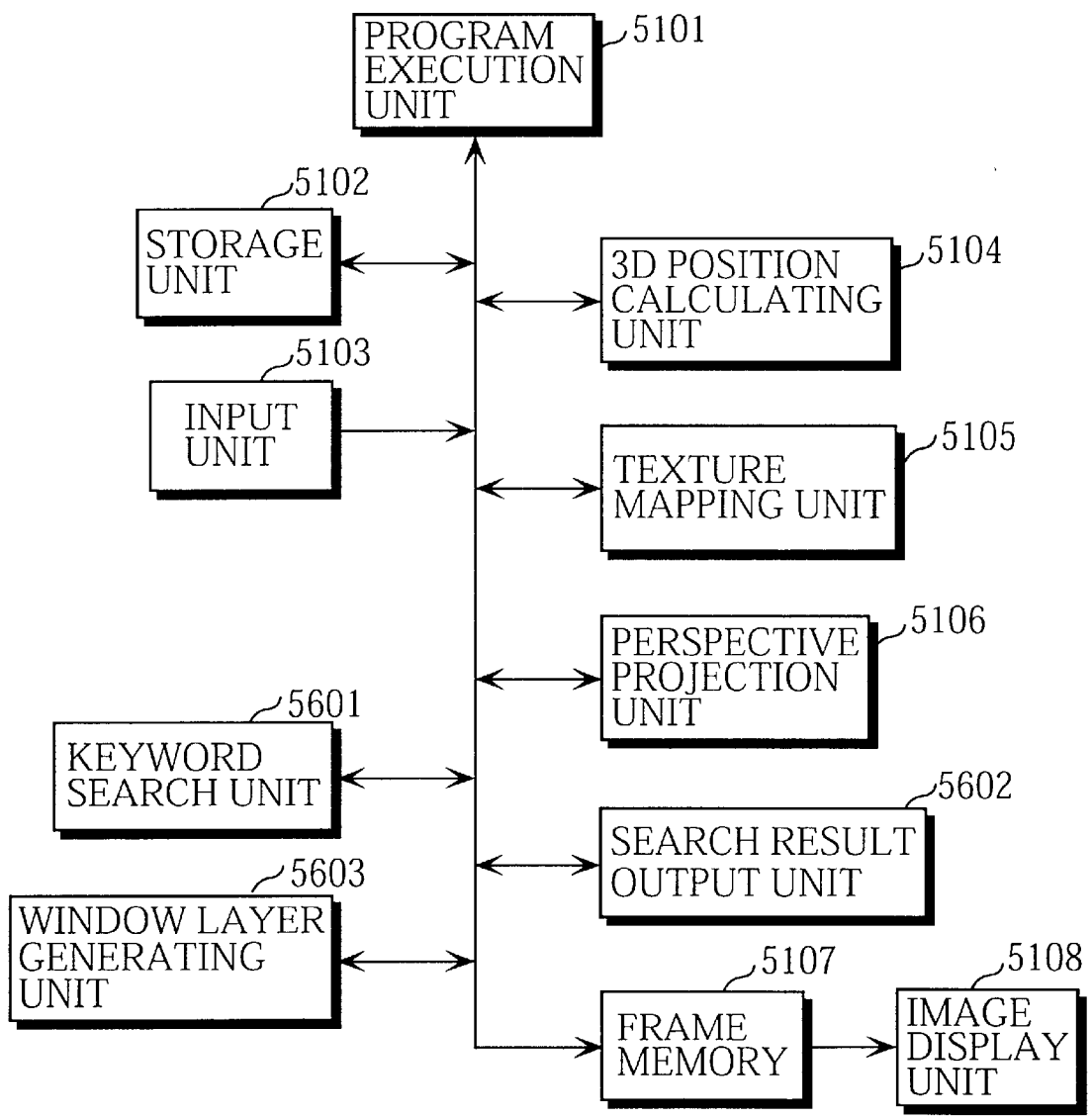

FOLD UP Page3

FOLD UP Page2 AND Page3

FIG. 32

| WINDOW IDENTIFIER | SPATIAL COORDINATES | WINDOW COORDINATES | | | | ROTATION ANGLE | | |
|---|---|---|---|---|---|---|---|---|
| | | UPPER LEFT | LOWER LEFT | UPPER RIGHT | LOWER RIGHT | x AXIS | y AXIS | z AXIS |
| $W_1$ | $(X_1,Y_1,Z_1)$ | $(0,y_1,0)$ | $(0,0,0)$ | $(x_1,0,0)$ | $(x_1,y_1,0)$ | 0° | 0° | 0° |

| | 401 | 402 | 403 | 404 | |
|---|---|---|---|---|---|
| | CHARACTER CODE | FONT SIZE | FONT TYPE | CHARACTER COORDINATES | |
| | 03 19 | 10 | M | $x_{11}, y_{11}, 0$ | ----- [D] |
| | 28 01 | 10 | M | $x_{12}, y_{11}, 0$ | ----- [I] |
| | 24 21 | 10 | M | $x_{13}, y_{11}, 0$ | ----- [S] |
| | 28 08 | 10 | M | $x_{2b}, y_{21}, 0$ | ----- [W] |
| | 04 02 | 40 | M | $x_{31}, y_{31}, 0$ | ----- [A] |

| WINDOW IDENTIFIER | SPATIAL COORDINATES | WINDOW COORDINATES ||||ROTATION ANGLE |||
|---|---|---|---|---|---|---|---|---|
| | | UPPER LEFT | LOWER LEFT | UPPER RIGHT | LOWER RIGHT | x AXIS | y AXIS | z AXIS |
| $W_1$ | $(X_1, Y_1, Z_1)$ | $(0, y_1, 0)$ | $(0, 0, 0)$ | $(x'_1, 0, z'_1)$ | $(x'_1, y_1, z'_1)$ | 0° | 30° | 0° |

FIG. 36

| CHARACTER CODE | FONT SIZE | FONT TYPE | CHARACTER COORDINATES |
|---|---|---|---|
| 03 19 | 10 | M | $x'_{11}, y'_{11}, z'_{11}$ ······ [D] |
| 28 01 | 10 | M | $x'_{12}, y'_{11}, z'_{12}$ ······ [I] |
| 24 21 | 10 | M | $x'_{13}, y'_{11}, z'_{13}$ ······ [S] |
| 28 08 | 10 | M | $x'_{2b}, y'_{11}, z'_{2b}$ ······ [W] |
| 04 02 | 40 | M | $x'_{31}, y'_{31}, z'_{31}$ ······ [A] |

FIG. 37A

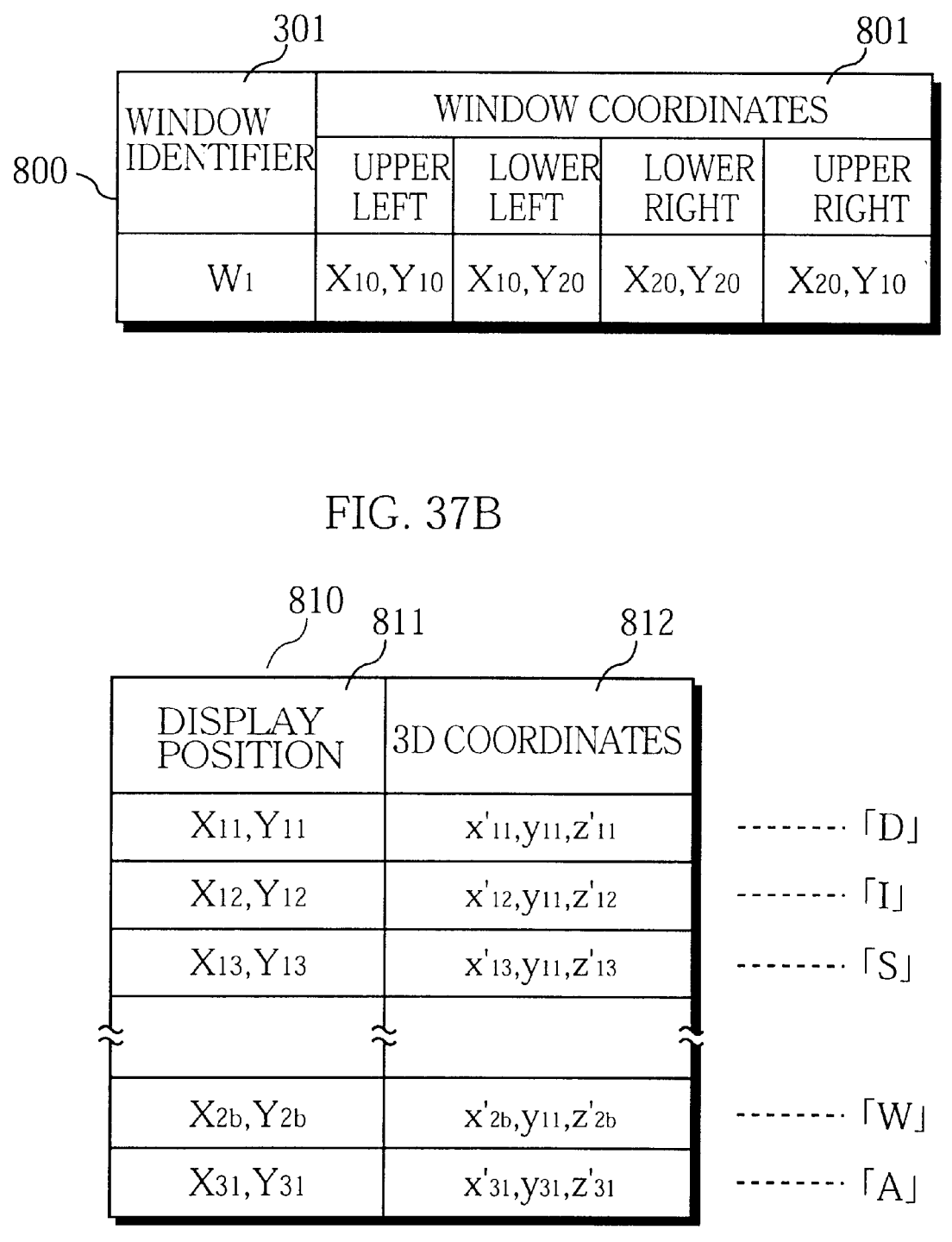

| WINDOW IDENTIFIER | WINDOW COORDINATES | | | |
|---|---|---|---|---|
| | UPPER LEFT | LOWER LEFT | LOWER RIGHT | UPPER RIGHT |
| $W_1$ | $X_{10}, Y_{10}$ | $X_{10}, Y_{20}$ | $X_{20}, Y_{20}$ | $X_{20}, Y_{10}$ |

| DISPLAY POSITION | 3D COORDINATES | |
|---|---|---|
| $X_{11}, Y_{11}$ | $x'_{11}, y_{11}, z'_{11}$ | ······「D」 |
| $X_{12}, Y_{12}$ | $x'_{12}, y_{11}, z'_{12}$ | ······「I」 |
| $X_{13}, Y_{13}$ | $x'_{13}, y_{11}, z'_{13}$ | ······「S」 |
| ≈ | ≈ | |
| $X_{2b}, Y_{2b}$ | $x'_{2b}, y_{11}, z'_{2b}$ | ······「W」 |
| $X_{31}, Y_{31}$ | $x'_{31}, y_{31}, z'_{31}$ | ······「A」 |

| CHARACTER | ORIGINAL SIZE | DISPLAY SIZE |
|---|---|---|
| D | 10 | 9.5 |
| I | 10 | 9 |
| S | 10 | 8 |
| W | 10 | 6 |
| A | 40 | 36 |

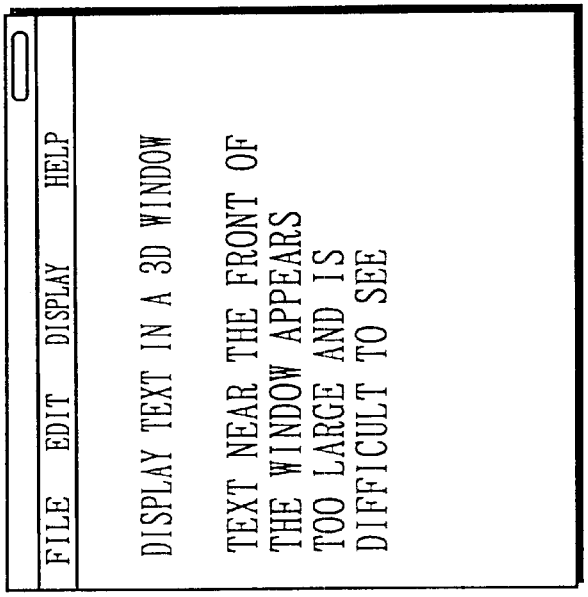
FIG. 64A
FIG. 64C
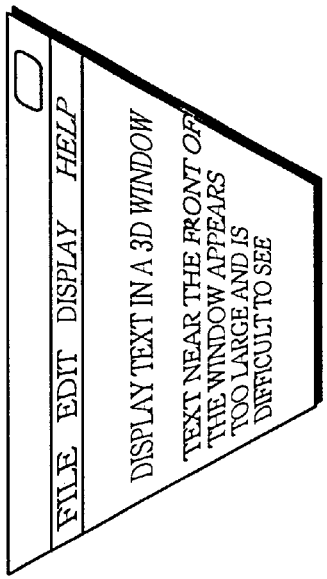
FIG. 64B
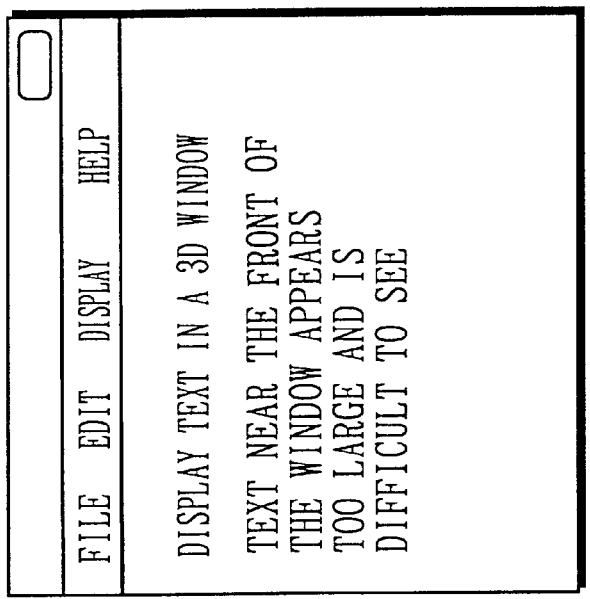
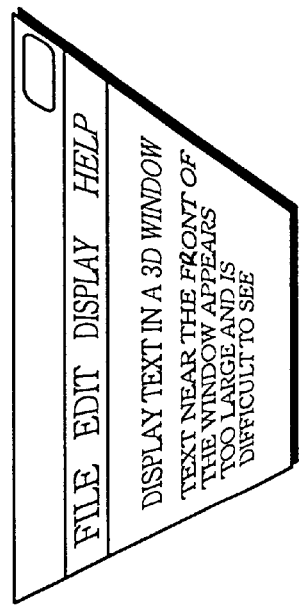
FIG. 64D

FIG. 66A
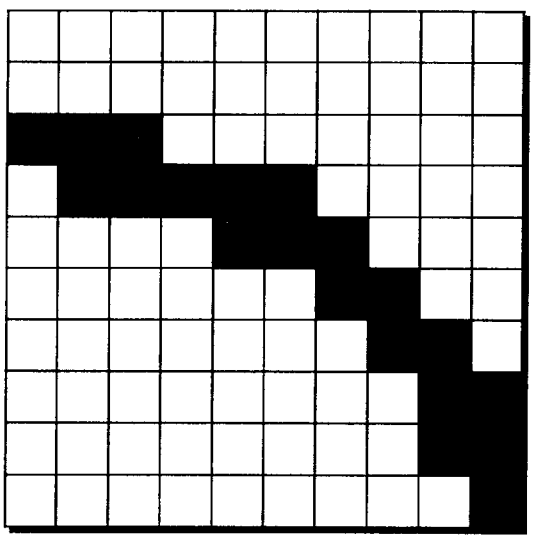
FIG. 66B
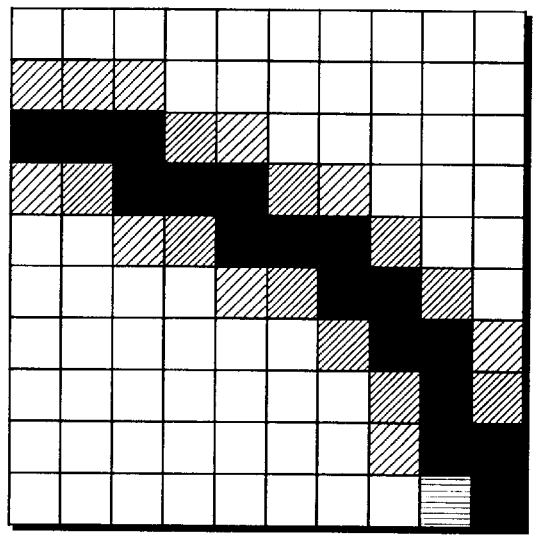
FIG. 66C
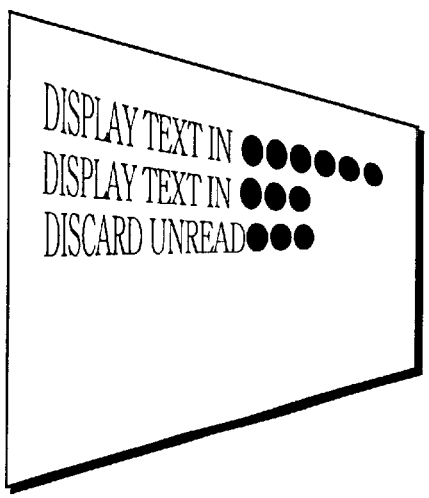
FIG. 66D
GRAY-SCALE FONT
NORMAL FONT    NO FONT

WINDOW DISPLAY DEVICE WITH A THREE-DIMENSIONAL ORIENTATION OF WINDOWS

INDUSTRIAL FIELD OF USE

The present invention relates to a window display device for displaying windows on the screen of an information processing apparatus, and in particular to a device for displaying windows in a virtual three-dimensional (3D) space.

BACKGROUND ART

Multiple window display devices are used to increase the performance of the man-machine interface in computer information terminals and the like.

One example of a prior art technique is disclosed in Japanese Laid-Open Patent No 6-222899. Here, a multiple window display device improves display efficiency by displaying as many windows as possible in the limited screen space available.

FIG. 69 shows a display screen for this prior art example.

In the prior art, windows are placed in a virtual 3D space, with windows positioned deep within the 3D space reduced in size. As a result, more windows can be displayed, making the screen appear larger than it actually is.

However, in this prior art example, a window placed deep within the 3D space is displayed reduced in size, making it impossible to distinguish any of the display content of the window.

DISCLOSURE OF THE INVENTION

The present invention, a device for displaying windows placed in a virtual 3D space, is designed to overcome the stated problem. The object of the invention is to provide a window display device that increases the efficiency with which windows can be displayed, making the screen appear larger than it actually is, and moreover, preventing a situation in which the entire display content of a window is unreadable.

The present invention aiming to achieve this object is a window display device displaying a plurality of windows on a screen. The window display device includes the following. A display data holding unit holds display data representing display content of the plurality of windows. A position determining unit determines a position for each window in a virtual three-dimensional (3D) space, the positions being such that the windows are not parallel to the screen. A perspective projection unit transforms the display data to project the windows onto the screen in perspective based on the determined positions. A display unit then displays the transformed display data on the screen.

This enables at least one window to be displayed inclined in the depth direction of a virtual 3D space. Even if the window is positioned deep within the 3D space, the problem apparent in the prior art, where reducing the size of the whole window by the same amount meant that all of the window display content became unreadable, can be avoided. The screen display area can also be used more effectively, and the screen made to appear larger than it actually is. Furthermore, information in the inclined window that is near to the front of the 3D space remains easily recognizable, and less display area needs to be used for the part of the window deep in the 3D space. Thus a window display apparatus capable of using the screen display area effectively, while ensuring that at least one part of the window display content is readable can be realized.

Here, the window display device further includes an input unit acquiring indication from a user, enabling the position determining unit to determine positions according to indications acquired from the input unit. This enables the user to determine the size of the entire window and the degree at which it slants in the depth direction.

The position determining means also determines 3D coordinates for each vertex of a window as the position for the window. If the window is a rectangular plane, this enables the position of the window in the 3D space to be determined simply by the coordinates for its four vertices.

The window display device further includes a window analyzing unit detecting, as a key part for each window, a part of the display content fulfilling certain conditions. Detection is performed based on display data held by the display data holding unit. This enables the position determining unit to determine the position of windows so that the key parts detected by the window analyzing unit are displayed near the front of the virtual 3D space. The window can thus be displayed inclined in the depth direction, so that the key part of the display content is near the front of the 3D space. Therefore, even if a plurality of windows are being displayed, the user can grasp the type and display content of each window at a glance.

The window analyzing unit also determines whether a title is included in the display data for each window and, if a title is included, detects a part of a window in which the title is displayed as the key part. This enables the user to easily recognize window types.

The window analyzing unit also determines whether a text and an indication for displaying the text horizontally are included in the display data for each window, and if the text and the indication are included, detects a left side of a window when viewed from the front as the key part. This enables the user to easily recognize the type and general content of a horizontally-written document displayed in a window.

The window analyzing unit also determines whether a text, and an indication for displaying the text vertically are included in the display data for each window, and if the text and the indication are included, detects a right side of a window when viewed from the front as the key part. This enables the user to easily recognize the type and general content of a vertically-written document displayed in a window.

The position determining unit includes an automatic alignment unit for determining the position of a plurality of windows so that the windows are placed in a predetermined arrangement, where at least one window is not parallel with the screen. This enables a plurality of windows that were displayed scattered around the screen to be displayed in alignment, using the screen display area more effectively and allowing all of the windows currently displayed to be viewed at a glance.

The position determining means further includes a unit determining a position according to an indication acquired from the input unit, so that a window displayed in the alignment position is newly displayed facing the front; and a unit determining a position according to an indication acquired from the input unit, so that a window displayed facing the front is returned to the alignment position. This enables a operation, in which a window faces the front when it is being operated on, and returns to the alignment position once it is no longer being operated on, to be easily performed.

The window display device further includes a window information image position changing unit editing display data stored in the display data holding unit so that a window information image is displayed near the front of the virtual 3D space. The window information image is formed from a title bar and a menu bar, and editing is performed based on a position determined by the position determining unit. This enables the title bar and menu bar for a window to be displayed near the front of the 3D space, even if the window is inclined in the depth direction. As a result, recognizing window types and performing window operations becomes easier.

The window display device further includes a window information image orientation changing unit controlling the position determining unit so that, in a window where a window information image is displayed near the front of the virtual 3D space, the window information image faces the front, while the remaining part of the window :is not parallel with the screen. This enables the title bar and menu bar to be displayed facing the front near the front of the virtual 3D space, even if the window is inclined in the depth direction. As a result, recognizing window types and performing window operations becomes easier.

The window display device further includes the following. An unreadable area determining unit determines whether an unreadable area displaying characters smaller than a specified size has been generated from display data transformed by the perspective projection unit. A scroll button position determining unit determines a position for a scroll button when an unreadable area has been determined to exist, the position determined as if the unreadable area was not displayed in the window. A scroll bar attachment unit edits the display data so that a scroll bar image, including a scroll button arranged at the determined position, is attached to the window. This enables characters and the like in an unreadable area of a window displayed inclined in the depth direction to be scrolled up into the readable display area.

The window display device further includes the following. A layer separating unit separates display data held in the display data holding unit, the display data corresponding to a window with a layered construction having a base layer and at least one upper layer, and the display data for each upper layer, but not the base layer, being separated. A window layer generating unit generates display data for a window layer corresponding to each separated layer. The position determining unit determines a position for each window layer parallel with and a specified distance from the base layer. This enables window layers to be displayed floating over the base layer so that objects displayed on each layer can be grasped at a glance, and editing of an object across windows can be easily performed.

The window display device further includes the following. A keyword searching unit searches display data held in the display data holding unit for parts that match a keyword acquired from the input unit. A window layer generating unit generates display data for a new window layer in which the keyword is arranged at positions corresponding to the matching parts, and stores the generated display data in the display data holding unit. Here, the position determining unit determines a position for the window layer parallel with and a specified distance from a display object window. This enables a window layer showing the matching parts to be displayed floating over the original window. The user's attention is focused on the window layer only, allowing the position of the keyword to be confirmed.

The window display device further includes the following. An inter-related window specifying unit specifies a group of inter-related windows from the plurality of displayed windows. A link information storage unit generates and stores link information used to line up the group of inter-related windows in a concertina arrangement with frames of neighboring windows touching. Here, the position determining unit determines positions of the group of inter-related windows based on the link information. This enables a plurality of document pages displayed in different windows to be displayed in a linked sequence, so that, for example, windows belonging to the same document can be easily distinguished.

The window display device further includes the following. A link information changing unit changes the link information according to an indication acquired from the input means, so that the group of inter-related windows is lined up with part of the group excluded. Here, the position determining unit determines positions for the group of inter-related windows, apart from the excluded part of the group, based on the changed link information. This enables the windows that the user wants to focus on from the linked sequence of windows to be displayed.

The window display device further includes an inter-window editing unit editing display data held in the display data holding unit according to an indication acquired from the input unit, so that editing of display content can be performed between two windows in the group of inter-related windows. This enables the windows that the user wants to focus on from the linked sequence to be displayed adjacent to each other, and editing of an object performed between the two windows, so that the efficiency of operations performed spanning a plurality of windows is improved.

The display data holding unit includes a character data storage unit storing character data formed of character information displayed in the windows, and a window data storage unit storing window data formed of information concerning non-character information displayed in the windows. Here, the position placement determining unit determines a position for each window and the corresponding characters according to an indication acquired from the input unit, and the perspective projection unit includes the following. A perspective transform unit generates two-dimensional data showing the vertices and window image data by performing a perspective projection transform on the window data, the perspective projection transform being performed based on window positions determined by the position determining unit. A character data transform unit generates character image data by transforming the character data, based on character positions determined by the position determining unit and two-dimensional data showing vertices obtained by the transform performed by the perspective transform unit. A combining unit combines image data generated by the perspective transform unit and image data generated by the character data transform unit. Here, the display unit displaying image data combined by the combining unit.

The character data storage unit includes a character information storage unit storing information relating to characters displayed in the window, the information including at least character position information showing positions of the characters in virtual space, character identifying information specifying which characters should be displayed, and character size information, and a character image storage unit storing character images. Here, the window data storage unit stores graphics data, comprising window display content excluding characters, and window coordinate information showing a position of the window in the virtual 3D space, the position determining unit changes the window data and the character position information in response to an indication acquired from the input unit and the perspective transform unit performs a perspective projection transform on window data that has been changed by the position determining unit. The character data transform unit includes the following. A character position information conversion unit converts character position information changed by the position determining unit into screen position information. A character image selecting unit selects a character image from the character images stored in the character image storage unit, the character image corresponding to the character identifying information. A character image transform unit transforms the character image selected by the character image selecting unit in accordance with the result of the position changing process performed by the position determining unit. Here, the combining unit combines a character image transformed by the character image transform unit with image data generated by the perspective transform unit, so that the character image is placed at a position in the window shown by the screen position information produced by the character position information conversion unit, the window having been transformed onto the screen by the perspective transform unit.

The character image transform unit includes a shape transform unit transforming the shape of the character image using a similarity transform related to the shape of the window transformed by the perspective transform unit; and a scaling unit finding a scale based on character position information stored in the character information storage unit, and changing the size of the character image according to the scale. Here, character images are separated from the window as 2D data, their shape transformed by a similarity transform with the perspective-transformed window, and their size converted according to a scale calculated from coordinate values. After being transformed into a shape similar to the perspective transform result, the character images are combined with the perspective-transformed window. This processing occurs rather than having character images rotated and perspective-transformed after they have been developed into virtual 3D data. When compared to the prior art, in which a window including character images was rotated and then perspective-projected, the amount of processing is reduced, and performance improved. The amount of data used for the character images is also decreased, reducing the amount of memory required.

The character image transform unit calculates a scale based on character position information stored in the character information storage unit, and changes the size of the character image according to the scale. This enables only character image size to be changed by the scale found from the character position coordinates, further reducing the amount of processing required and creating a sense of depth when characters are displayed in a window as a character string.

The character image transform unit includes an aspect ratio conversion unit finding an aspect ratio based on character position information stored in the character information storage unit and changing the length to width ratio of the character image according to the aspect ratio, and a scaling unit finding a scale based on character position information stored in the character information storage unit, and changing the size of the character image according to the scale. This enables character images to be transformed using an aspect ratio, rather than simply by using a scale. As a result, a more natural sense of depth can be achieved when character images are displayed as a character string in a window than was the case when only the size of character images was changed according to a scale.

The character image storage unit stores character images on which a similarity transform has been performed for each of a plurality of representative positions for a window in the virtual 3D space, the similarity transform being related to the shape of the window produced at each of the plurality of positions as a result of a perspective projection transform. The character image selecting unit selects a character image from the character image storage unit, the character image coinciding with character identifying information stored in the character information storage unit, and with window coordinate information stored in the window data storage unit. The character image transform unit finds a scale based on character position information stored in the character information storage unit, and changes the size of the character image selected by the character image-selecting unit, .the size of the character image being changed according to the scale. This enables character images having a natural sense of depth and similar to character images that have been perspective-transformed, to be displayed simply by changing the size of pre-prepared character images.

The window display device further includes a character image readability judging unit. This unit calculates a size for a transformed character image transformed by the character image transform unit from size information stored in the character information storage unit, and a scale calculated from character position information stored in the character information storage unit. It then judges whether the transformed character image is readable by comparing the calculated size with a threshold value, and informs the character image selecting unit of the judgement result. Here, the character image storage unit further stores symbol images, the character image selecting unit selects a specified symbol image from the character image storage unit to be displayed instead of a character image if the character image readability judging unit judges that the character image is unreadable, the character image transform unit does not perform transform processing on the symbol image, and the combining unit combines the symbol image with image data generated by the perspective transform unit so that the symbol image is placed at a position in a window shown by screen position information produced by the character position information conversion unit, the window having been transformed onto the screen by the perspective transform unit. This enables a symbol to be displayed instead of characters considered to be difficult or impossible to read if transformed. As a result, processing for reading and transforming character images is shortened, reducing both processing volume and the amount of time required for processing.

The character information storage unit further stores font type information showing character font types. The character image storage unit stores character images for each font type. The window display device further includes a character image readability judging unit. This unit calculates a size for a transformed character image transformed by the character image transform unit from size information stored in the character information storage unit, and a scale calculated from character position information stored in the character information storage unit. It judges if the font type of the transformed character image is readable by comparing the calculated size with a threshold value, and informs the character image selecting unit of the judgement result. Here, when the font type of a character is judged unreadable by the character image readability judging unit, the character image selecting unit selects a character image with a specified font type, ignoring font type information stored in the character information storage unit. This enables individual fonts to be ignored in the case of character images whose display font will not be discernable if transformed. Instead these characters are displayed in an identical specified font. If cache memory is used, the cache hit rate when the font is read increases, improving processing efficiency.

The window data storage unit further stores coordinate system information showing a virtual space window coordinate system, and the window display device further includes a coordinate system converting unit for changing a scale of a coordinate axis showing screen positions, the scale being changed according to window coordinate information stored in the window data storage unit. Here, the perspective projection unit performs a perspective projection transform, converting the coordinate system to a coordinate system having a coordinate axis with the changed scale. This enables the scale of the coordinate system to be changed, so that even characters far from the rotation axis, which would be cramped and difficult to read in a conventional coordinate system, can be displayed so that they are easy to read.

BRIEF EXPLANATION OF THE DRAWINGS

FIG. 2A shows the positional relationship of the center of the projection, the projection screen, and the object (a window);

FIG. 2B shows a perspective view produced when the object is solid;

FIGS. 3A to 3C show the actual processing content of the perspective projection performed by the perspective projection unit 5106;

FIG. 3A shows the user's viewpoint, the positional relationship of display screen and window, and the shape of the perspective-projected window when the window placed in the virtual 3D space is parallel to the display screen;

FIG. 3B shows the user's viewpoint, positional relationship of display screen and window, and the shape of the perspective-projected window when the window placed in the virtual 3D space is not parallel to the display screen;

FIG. 3C shows actual calculation processing for the perspective projection;

FIG. 21 is a flowchart showing operation procedures for a window layer separating unit 5501 and a window layer generating unit 5502;

FIG. 23 is a block diagram showing a structure for a multiple window display device in the seventh embodiment;

FIG. 29A is identical to FIG. 28A and shows a display screen when windows for pages 1 to 5 are displayed based on initial link information;

FIG. 29B shows a situation in which an object from page 1 is copied to page 4 after pages 2 and 3 have been folded up so that pages 1 and 4 are displayed as facing pages;

FIG. 32 shows an example of window information in the ninth embodiment;

FIG. 33 shows an example of character information in the ninth embodiment;

FIG. 35 shows an example of window information produced after rotation processing has been performed in the ninth embodiment;

FIG. 36 shows an example of character information produced after rotation processing has been performed in the ninth embodiment;

FIGS. 37A and 37B show examples of character and window information after a perspective transform in the ninth embodiment;

FIG. 41 shows examples of sizes of display fonts in the ninth embodiment;

FIGS. 64A to 64D show examples of perspective transform views of windows occurring in the fifteenth embodiment;

FIGS. 66A to 66D are examples of window displays when the present invention is applied to a gray-scale display font;

BEST MODE FOR CARRYING OUT THE INVENTION

The following is a description of the embodiments of the invention, with reference to the drawings.

First Embodiment

First, a multiple window display device in the first embodiment is explained.

The multiple window display device is characterized by the ability to display windows inclined in the depth direction of the screen (hereafter also described as the ability to display windows in perspective) as if placed in a virtual 3D space. A window is a rectangular plane, the outline of which is formed by specifying four vertices.

Structure

Figure 1:
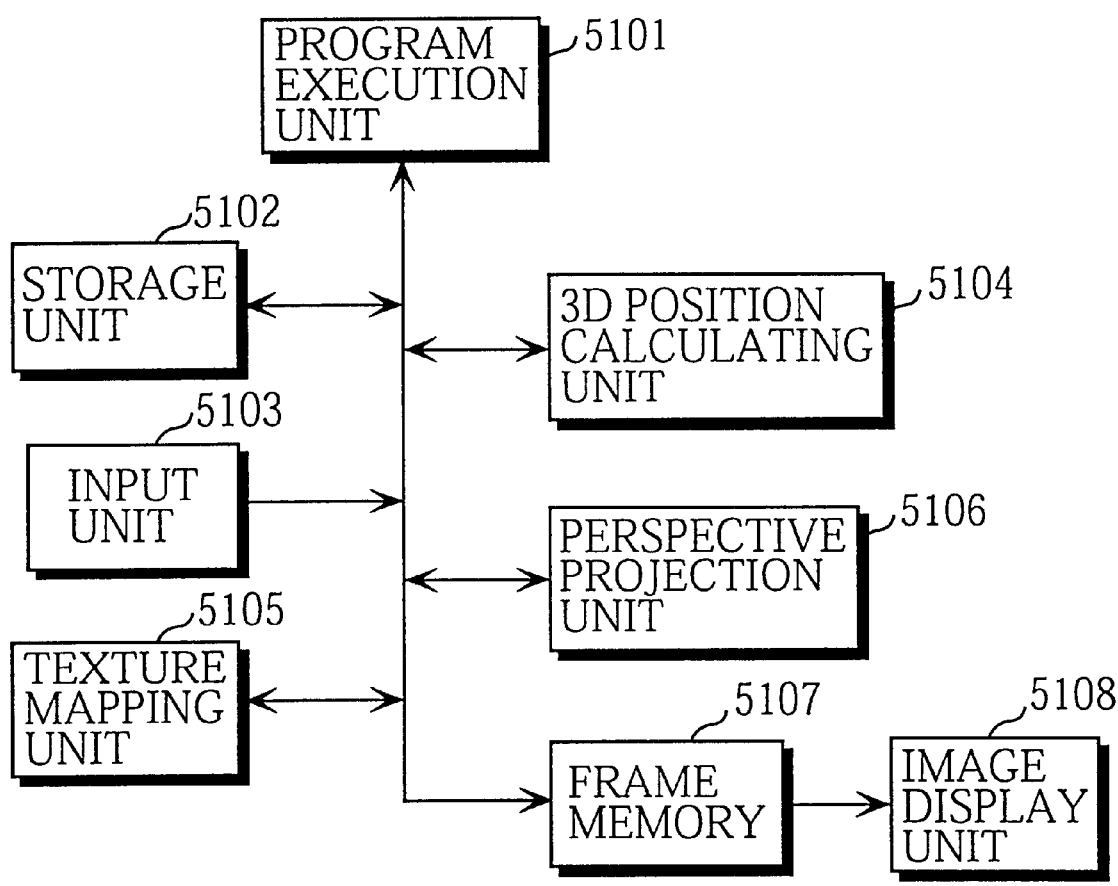
FIG. 1 is a block diagram showing a structure for a multiple window display device in the first embodiment of the invention.

FIG. 1 is a block diagram showing a structure for a multiple window display device in the first embodiment.

The multiple window device includes a program execution unit 5101, a storage unit 5102, an input unit 5103, a 3D position calculating unit 5104, a texture mapping unit 5105, a perspective projection unit 5106, a frame memory 5107 and an image display unit 5108.

The program execution unit 5101 is a CPU or similar, which activates and executes application programs that interact with users by displaying conventional two-dimensional (2D) windows. The program execution unit 5101 stores display data representing content to be displayed in each window in the storage unit 5102. This display data includes code data specifying window display content (documents, characters, graphics etc.) and image data expressing the objects as bitmap images. The program execution unit 5101 exchanges information regarding the windows with the other structural components 5201 to 5108. The image data is of a predetermined fixed size and is not dependent on the size of an entire window or on the position of a window within the 3D space.

The storage unit 5201 is memory for storing the display data, that is code data and image data, corresponding to each window in the various application programs. All the windows stored in the storage unit 5201 need not be displayed on the image display unit 5108, but all windows displayed on the image display unit 5108 must be stored in the storage unit 5102.

The input unit 5103 is a mouse or pointer that obtains user input.

The 3D position calculating unit 5104 calculates a position (coordinates for the four vertices of the window) in the 3D space for a window stored in the storage unit 5201 and stores the result according to a notification from the program execution unit 5101 or the input unit 5103. In fact, when the 3D position calculating unit 5104 receives notification of four vertex coordinates from the program execution unit 5101 as an initial position, it stores the coordinates without performing any calculation. When the 3D position calculating unit 5104 receives notification of a displacement (type and amount of displacement) in 3D space for a window that has already been positioned, however, it calculates new vertex coordinates using an Affine transform.

If the 3D position calculating unit 5104 does not receive a clear indication regarding the positioning of the window from either the program execution unit 5101 or the input unit 5103, it generates and stores a default position. This default position may be, for example, a position in which the left edge of the window is used as a rotation axis and the right edge inclined at only 45° in the depth direction.

When a new position is calculated by the 3D position calculating unit 5104, the texture mapping unit 5105 reads image data for the window from the storage unit 1502 and reduces or enlarges the data according to the position. The texture mapping unit 5105 performs texture mapping, that is processing for combining and pasting the image data for all the objects making up the window, and transmits the texture data obtained from the processing to the perspective projection unit 5106. The texture data is determined only according to the position of the window in 3D space and not according to the viewpoint from which the window is observed.

The perspective projection unit 5106 performs perspective projection on the texture data transmitted from the texture mapping unit 5105 and stores the data obtained in the frame memory 5107. Here, 'perspective projection' is an operation for generating a perspective view of an object (window) placed in the 3D space. A viewpoint in front of the display screen of the image display unit 5108 is taken as the origin for the projection and the 2D display screen as the projection surface. In other words, image data is converted from a virtual 3D coordinate system to a screen coordinate system. In this description, the terms 'near the front', 'at the back' and 'in the depth direction' are expressed from the viewpoint of a user positioned in front of the display surface.

Figure 2A:
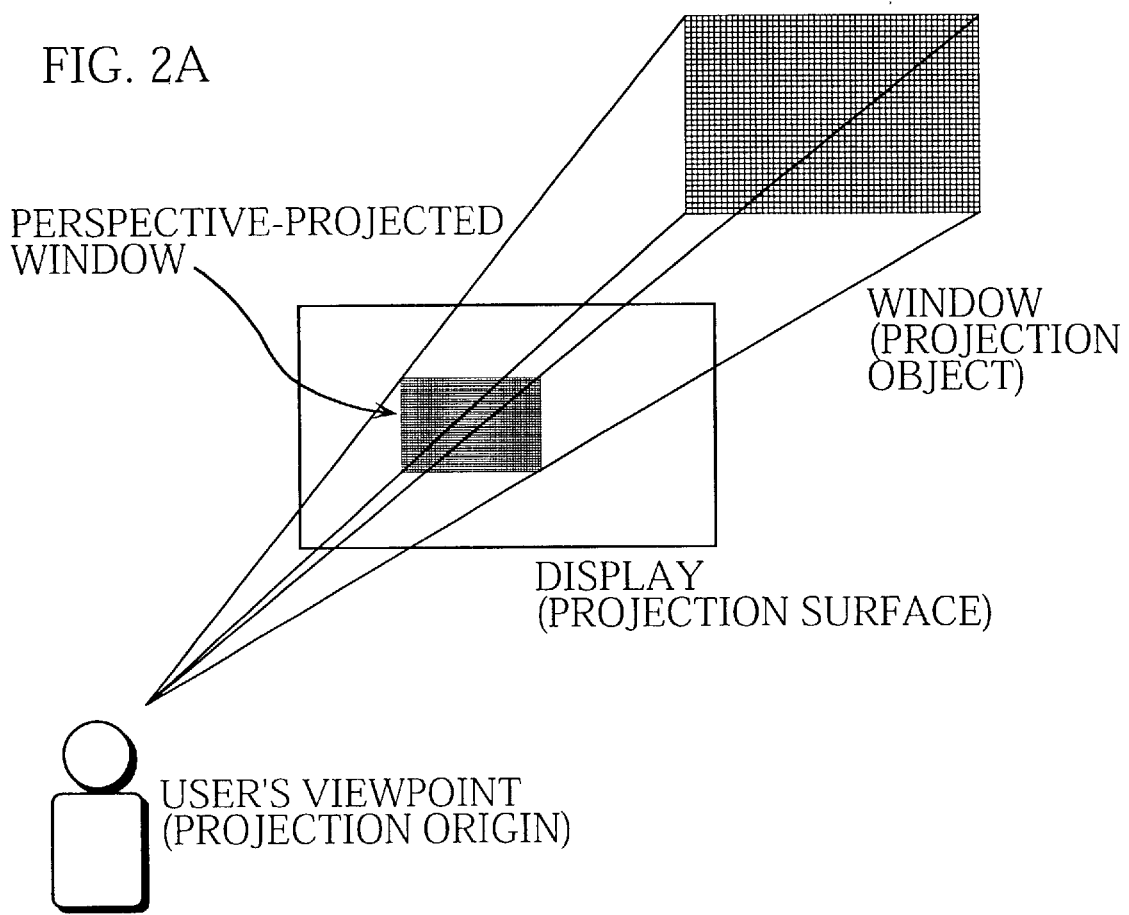
FIGS. 2A and 2B illustrate the concept of perspective projection, performed by a perspective projection unit 5106.
Figure 2B:
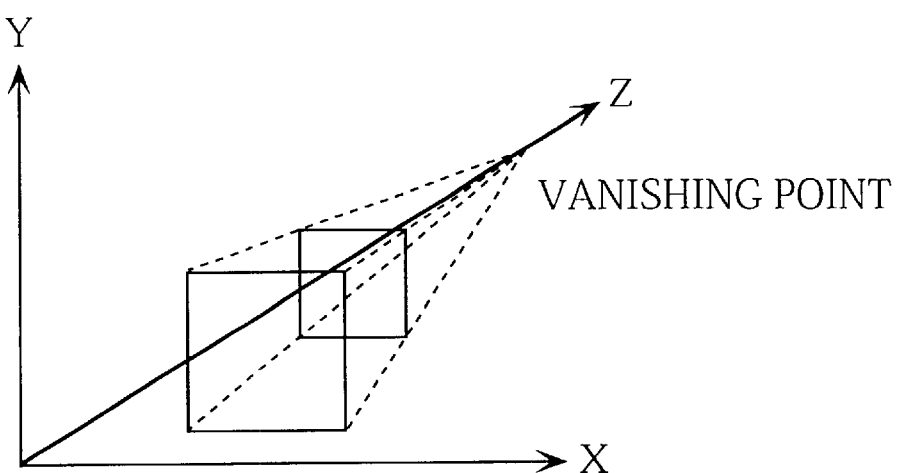

FIGS. 2A and 2B illustrate the concept of the perspective projection performed by the perspective projection unit 5106.

FIG. 2A shows the positional relationship between the projection origin, the projection surface and the object (window).

The perspective projection unit 5106 locates the display screen of the image display unit 5108 between the window positioned in the virtual 3D space and the viewpoint of the user. The perspective projection unit 5106 causes an image to be shown on the display screen by shining beams of light at the window. The light beams converge at the viewpoint. This generates a window on which perspective projection has been performed.

FIG. 2B shows the perspective view when the object is solid.

In this case, a point on a infinite horizon line at which parallel lines meet (the vanishing point) exists to the rear of the solid object. Since the perspective projection unit 5106 performs multipoint rather than one-point perspective projection, coordinates for 256 vanishing points placed at predetermined positions in the virtual 3D space are stored.

FIGS. 3A to 3C illustrate the processing content of perspective projection performed by the perspective projection unit 5106.

FIG. 3A shows the viewpoint of the user, the positional relation between the display screen and the window, and the shape of a window on which perspective projection has been performed, when a window located in the virtual 3D space is parallel to the display screen.

In this case, the perspective-projected window is a rectangle.

FIG. 3B shows the viewpoint of the user, the positional relation between the display screen and the window, and the shape of a window on which perspective projection has been performed, when a window located in the virtual 3D space is not parallel to the display screen, in other words when the window is tilted with respect to the screen and displayed in perspective.

In this case, the perspective-projected window is a trapezoid.

FIG. 3C illustrates actual calculation processing for the perspective projection.

The display screen is an xy plane, whose depth direction is shown by a z-axis. The drawing shows a situation in which a line segment $A0B0$ parallel to the z-axis is perspective-projected. First, the perspective projection unit 5106 calculates a line segment $A1B1$ by performing a perspective transform based on a vanishing point C. The vanishing point C is specified from among the 256 vanishing points by the program execution unit 5101 or the input unit 5103. Then the perspective projection unit 5106 calculates a final line segment $A2B2$ by performing a projection conversion in which a parallel projection of the line segment to the xy plane takes place.

The frame memory 5107 is video RAM for storing one frame of image data displayed by the screen of the image display unit 5108.

The image display unit 5108 includes an image display control circuit, and a CRT or similar. The image display unit 5108 reads the image data stored in the frame memory 5107 and displays it on the CRT.

Operation

The following is an explanation of the operation of the multiple window display device of the present invention, constructed as described above.

Figure 4:
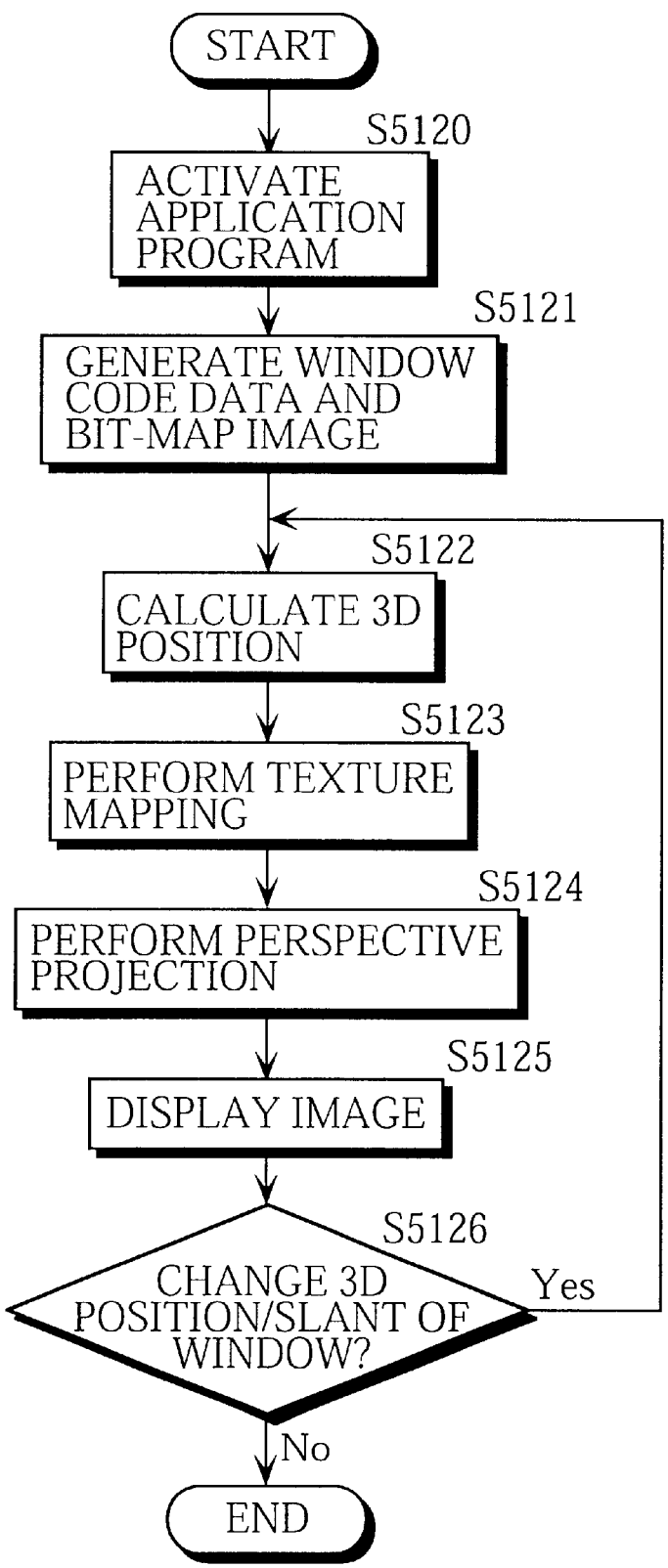
FIG. 4 is a flowchart showing operation processing for the window display device in the first embodiment.

FIG. 4 is a flowchart showing the operation procedure for the multiple window display device in the present embodiment.

Figure 5:
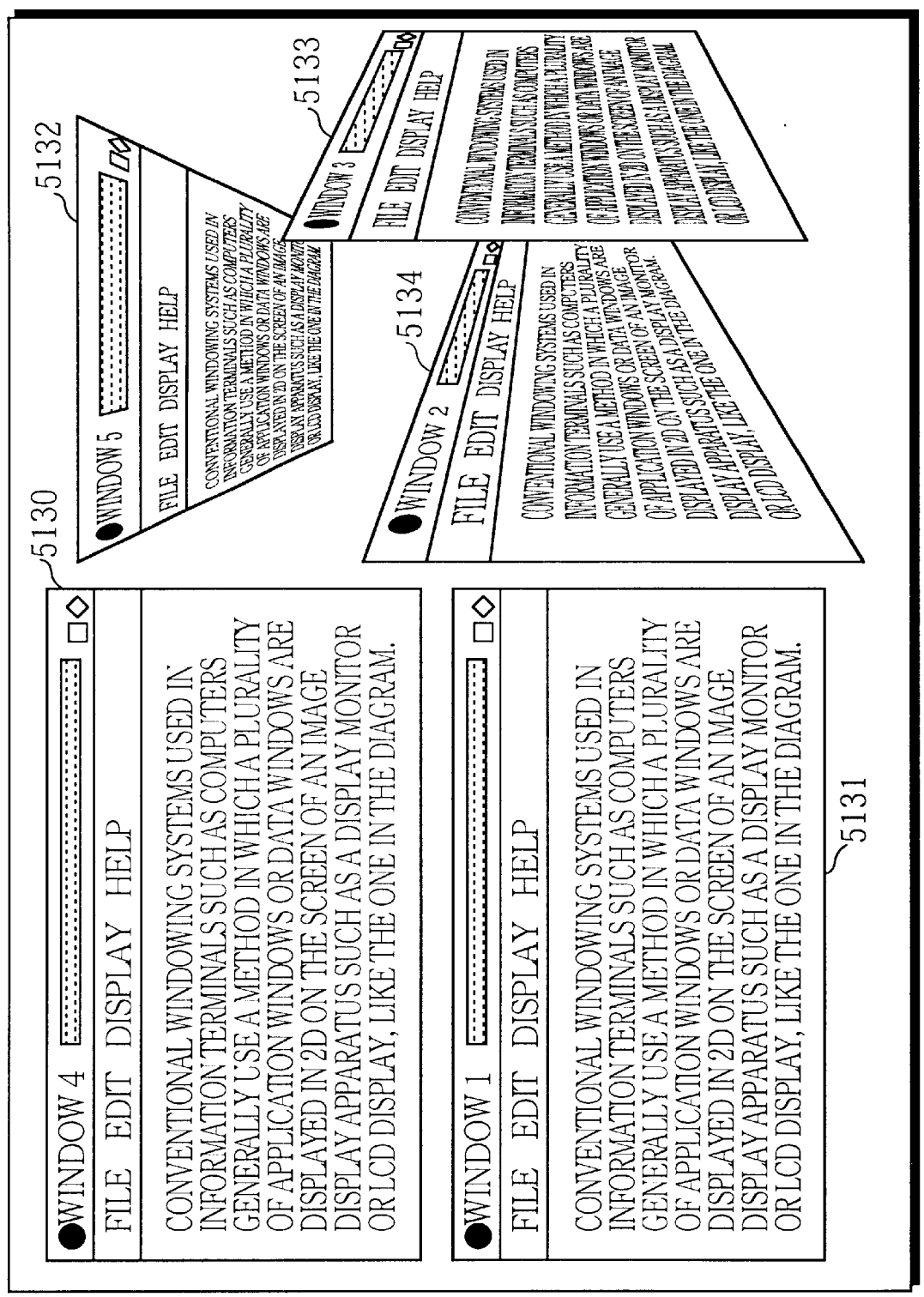
FIG. 5 is an example display screen in which windows 5130 and 5131 are arranged parallel to the screen and windows 5132 and 5133 are arranged in a non-parallel position.

FIG. 5 shows windows displayed on the image display unit 5108 by this operation.

First, the program execution unit 5101 activates and executes an application program and stores the display data (code data and image data) for windows generated by this application program in the storage unit 5201 (step S5120, S5121).

Next, the 3D position calculating unit 5104 calculates the position (coordinates for the four vertices of each window) within the 3D space for one of the windows stored in the storage unit 5201 and stores the result (step S5122). This operation is carried out according to a notification from the program execution unit 5101 or the input unit 5103. The coordinate system used here is the one shown in FIG. 3C.

Following this, when a new position has been calculated by the 3D position calculating unit 5104, the texture mapping unit 5105 reads image data for the window from the storage unit 5102. The texture mapping unit 5105 then performs texture mapping for placing and pasting the image data on a window whose size is determined by the four vertices calculated by the 3D position calculating unit 5104. This enables texture data expressing one window to be generated (step S5123).

Then the perspective projection unit 5106 specifies a vanishing point based on a notification from the program execution unit 5101 or the input unit 5103 and performs perspective projection, using this vanishing point, on the texture data generated by the texture mapping unit 5105. The obtained perspective data is written in a corresponding position in the frame memory 5107 (step S5124). If the vanishing point is not indicated by a clear instruction from the program execution unit 5101 or the input unit 5103, the perspective projection unit 5106 performs perspective projection using a vanishing point whose x and y coordinates coincide with the center of the window and whose z coordinate is equivalent to the depth of the display screen.

Finally, the image display unit 5108 reads the perspective data (image data) written in the frame memory 5107 and displays it on the CRT (step S5125).

Here, if a notification is made by the program execution unit 5101 or the input unit 5103 to the 3D position calculating unit 5104, instructing it to change the position of a window stored in the storage unit 5102, the image display unit 5108 changes the display content by repeating the above steps S5122 to S5125.

As explained above, the multiple window display device specifies coordinates for four vertices of a window located in virtual 3D space and perspective-projects the window onto the display screen. As a result, when the windows generated by the application program are positioned parallel to the display screen in the 3D space, they are displayed on the display screen as in a conventional windowing system, as rectangles shown by windows 5130 and 5131 of FIG. 5. On the other hand, when windows are positioned so that they are not parallel to the display screen, they are displayed as trapezoids, shown by windows 5132 to 5134 in FIG. 5.

In other words, the two windows 5130 and 5131 on the left side of the screen in FIG. 5 are examples of windows that face the front, the window 5132 in the top-right hand corner of the screen is an example of a window whose upper edge is used as a rotation axis, with the lower edge having been inclined away from the user in the depth direction and the two windows 5134 and 5133 in the bottom-left of the screen are examples of windows whose left edge is used as a rotation axis, with the right edge having been inclined away from the user in the depth direction.

As a result of windows being displayed in perspective by the multiple window display device, the user has some difficulty in distinguishing characters and the like on the parts of the inclined windows positioned towards the back of the 3D space, but should easily be able to distinguish the content of the parts of the windows near the front. The display area required by an inclined (perspective) window is less than that for displaying a window facing the front and the screen display area can thus be used effectively.

The screen display area is limited in notebook computers intended for portable use, and mobile information terminals such as electronic organizers and PDAs (Personal Digital Assistants). In this case, effective use of the screen could be achieved by treating the displayed objects so that a window on which an operation is being performed is displayed facing the front and, if a plurality of windows are being viewed, windows on which an operation is not being performed are displayed in perspective. This invention may also be effective for desktop computers, if a user is browsing various homepages on the Internet, or activating a variety of application programs.

In the present embodiment, a rectangular window is rotated using one edge of the window as an axis, but the window may also be rotated using two edges in succession as a rotation axis.

In the present embodiment, perspective projection was implemented after texture mapping had been performed on the entire display content of a window. This order may be reversed, however, so that perspective projection is only performed in advance on the window frame, enabling it to be projected onto the 2D display screen. This window frame is formed from four vertices for a window positioned in the 3D space. Then texture mapping may be performed by pasting the image data for the window stored in the storage unit 5201 into the projected window frame while implementing an linear transform such as an Affine transform. By switching the order of the texture mapping and the perspective projection and performing a 2D linear transform when texture mapping takes place, texturing may not be as precise, but performing 2D (x, y) calculation instead of 3D calculation (x, y, z) allows calculation for the z-axis to be omitted and thus reduces the calculation load.

Furthermore, in the multiple window display device of the present embodiment, the 3D position calculating unit 5104, the texture mapping unit 5105 and the perspective projection unit 5106 are separate from the program execution unit 5101, but a structure in which the program execution unit 5101 executes all or part of the processing performed by these units may be used.

The storage unit 5201 and the frame memory 5107 may share the same memory device.

Second Embodiment

The following is an explanation of a multiple window display device in the second embodiment.

This multiple window display device is characterized by the ability to display windows in perspective so that a key part of the window display content appears near the front of the 3D space.

Structure

Figure 6:
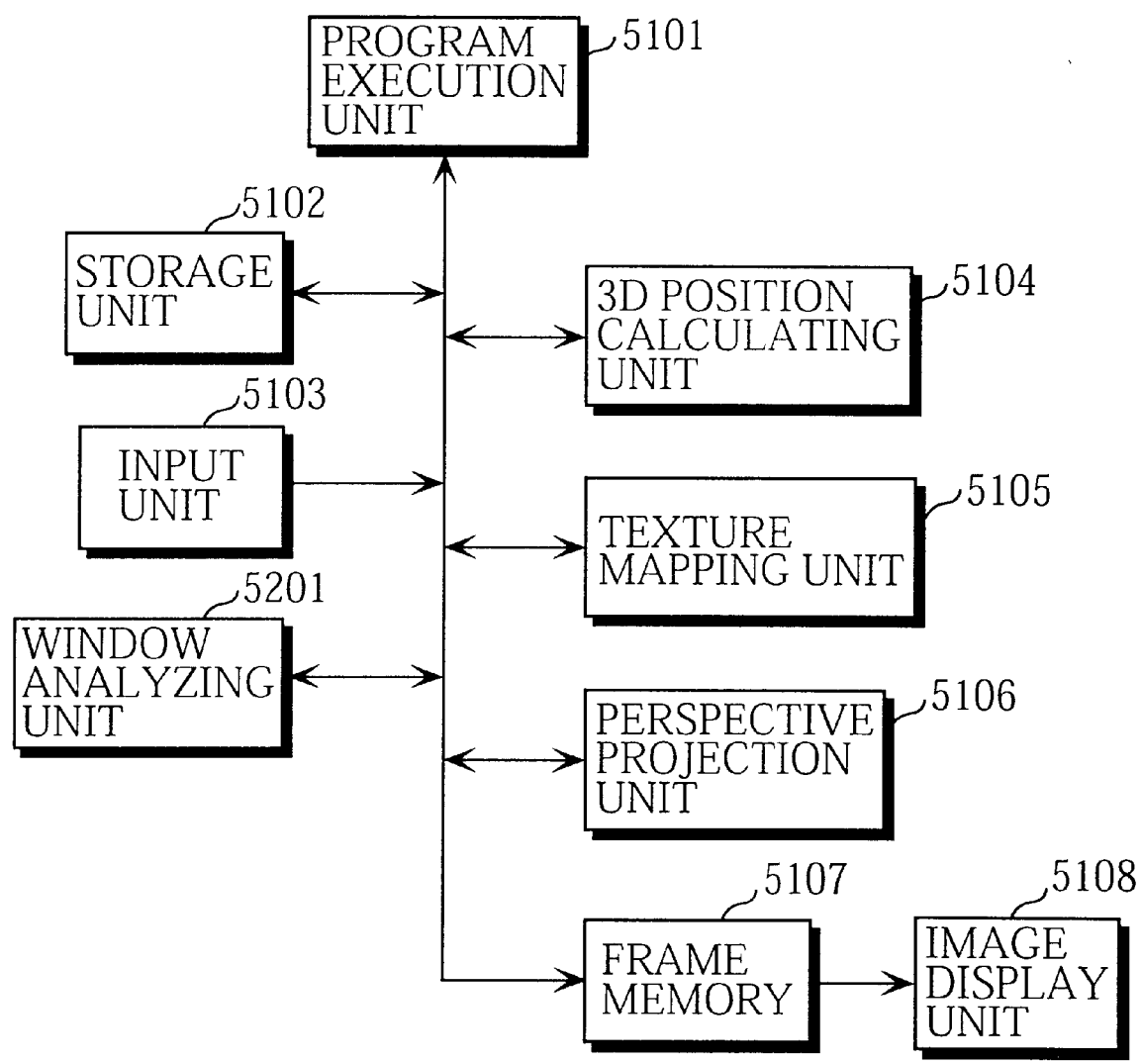
FIG. 6 is a block diagram showing a structure for a multiple window display device in the second embodiment.

FIG. 6 is a block diagram showing a structure for the multiple window display device in the second embodiment.

This multiple window display device includes a window analyzing unit 5201, in addition to the structural components 5101 to 5108 of the first embodiment. The following is an explanation of those points which differ from the first embodiment.

An application program is activated by the program execution unit 5101 and the display data (code data and image data) for one window stored in the storage unit 5102. Once these operations have been completed, the window analyzing unit 5201 reads the code data for the window, specifies the key part of the data and determines the position of the window so that this part of the data is displayed near the front. The window analyzing unit 5201 then notifies the 3D position calculating unit 5104 of this position.

To be precise, the window analyzing unit 5201 notifies the 3D position calculating unit 5104 to take the edge of the window nearest to the specified important part as the rotation axis and rotate the opposite edge 45 degrees in the depth direction. The 'key part' is a part of the window that enables the user to instantly grasp the type and display content. The actual criteria used for deciding on the key part follows a pre-determined procedure described later in this document.

In this embodiment the 3D position calculating unit 5104 calculates the new position having received notification of initial and displacement positions for windows from the window analyzing unit 5201 as well as from the program execution unit 5101 and the input unit 5103.

Operation

The following is an explanation of the operation of the multiple window display device of the present invention, structured as described above.

The operation of the multiple window display device differs from the operation performed in the first embodiment in that additional processing for specifying the key part of the window is inserted between the generation of the window display data (FIG. 4, step S5121) and the 3D position calculation (FIG. 4, step S5122). This additional processing is explained below.

Figure 7:
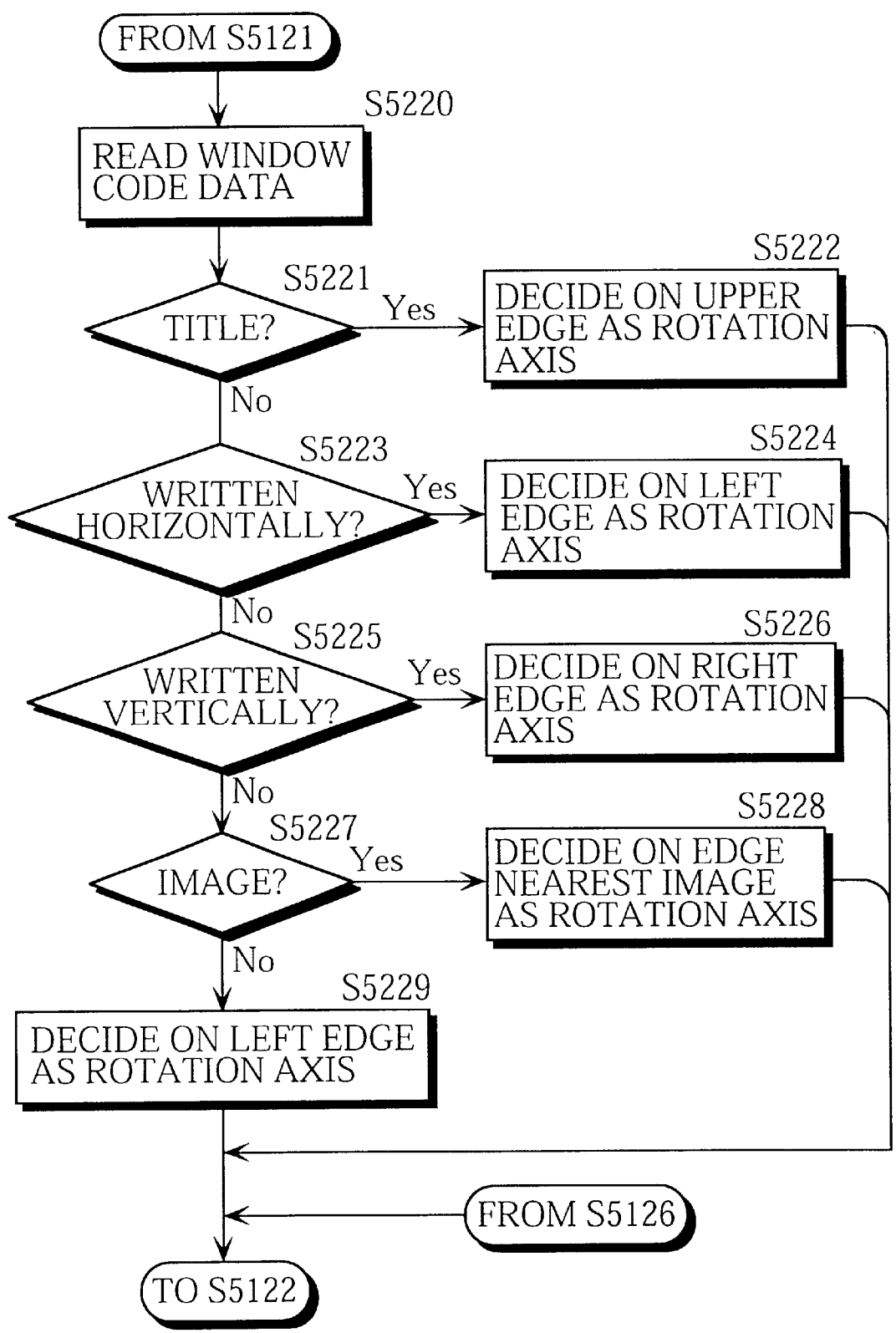
FIG. 7 is a flowchart showing the processing performed when a window analyzing unit 5201 specifies a key part of a window.

FIG. 7 is a flowchart showing the procedure performed when the window analyzing unit 5201 specifies the key part of the window.

Figure 8:
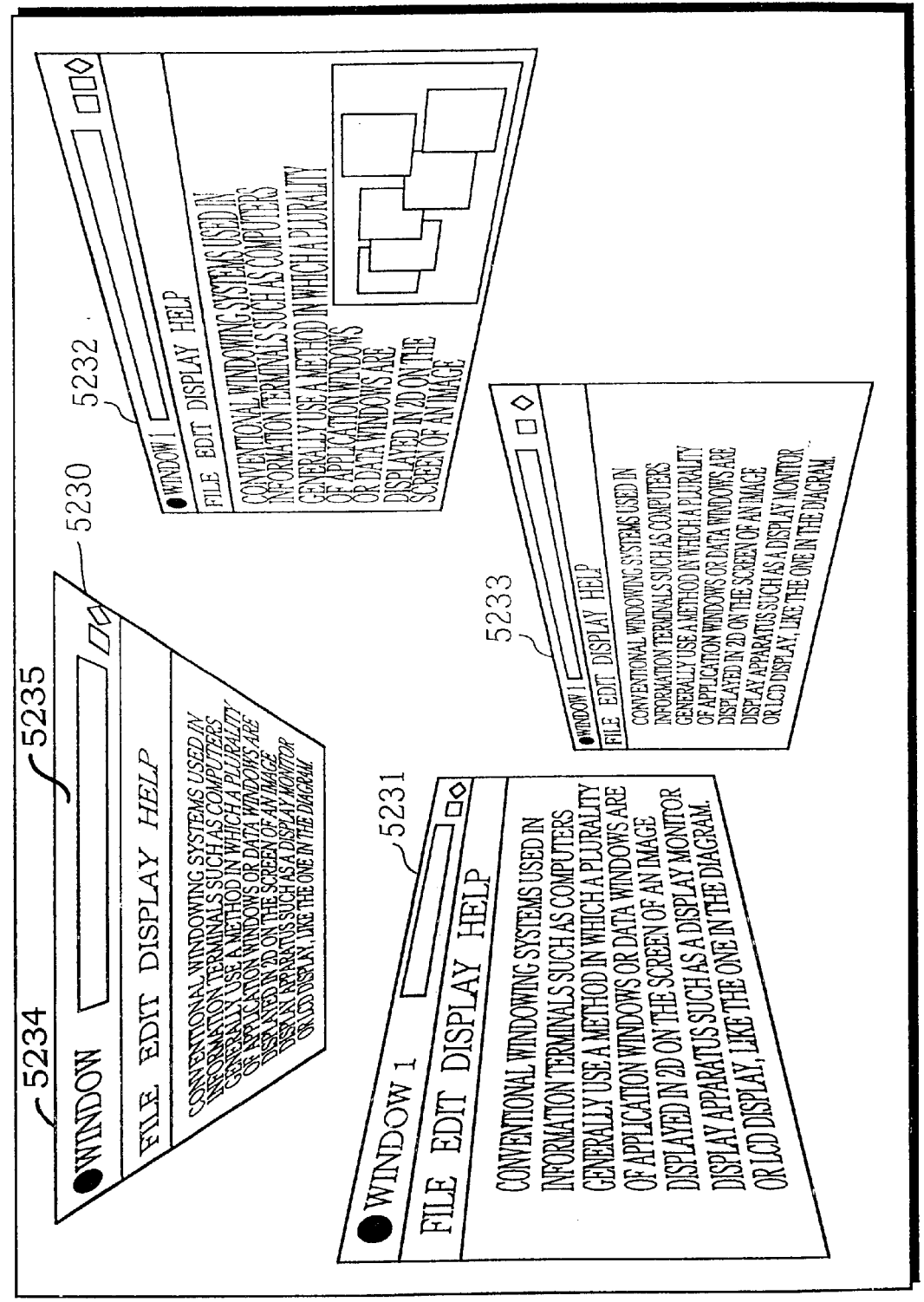
FIG. 8 is an example display screen occurring when the key part has been specified by the window analyzing unit 5201.

FIG. 8 shows an example of a display screen produced when a key part has been specified by the window analyzing unit 5201.

An application program is activated by the program execution unit 5101 and display data (code data and image data) for one window is stored in the storage unit 5201 (FIG. 4, step S5121). Then, the window analyzing unit 5201 reads the code data for the window (step S5220).

The window analyzing unit 5201 determines whether the code data includes a title displayed in the title bar of the window (step S5221). If the data includes a title the window analyzing unit 5201 determines that the title bar is the key part of the window and notifies the 3D position calculating unit 5104 that the upper edge of the window is to be used as the rotation axis (step S5222, FIG. 4, step 5122). The resulting screen display is the same as a window 5230 in FIG. 8. A title 5234 is included in title bar 5235, so the window is displayed in perspective with the upper edge appearing near the front. The title is detected by determining whether a reserved word indicating the title of the window is included in the code data.

If the window has no title, the window analyzing unit 5201 then determines whether text written horizontally from left to right is included in the code data (step S5223). If such text is included in the code data, the window analyzing unit 5201 determines that the left side of the window is the key part, and informs the 3D position calculating unit 5104 that the left edge of the window is to be used as the rotation axis (step S5224, FIG. 4, step S5122). The resulting screen display is the same as a window 5231 in FIG. 8. The window is displayed in perspective, with the left edge, from which the text starts, near the front of the 3D space.

If the code of data does not include horizontal text, the window analyzing unit 5201 then determines whether it includes text written vertically in lines ordered from right to left (step S5225). If the code data includes vertical text the window analyzing unit 5201 determines that the right side of the window is the key part, and informs the 3D position calculating unit 5104 that right edge is to be used as the rotation axis (step S5226, FIG. 4, step S5122). The window is displayed in perspective, so that the right edge, from which the text starts, appears near the front of the 3D space. Horizontal and vertical text are detected by determining whether a reserved word specifying either of these text styles is included in the code data.

If the code data does not include vertical text either, the window analyzing unit 5201 then determines whether the code data includes an image (data in a predetermined image format) (step S5227). If an image is included, the window analyzing unit 5201 determines it to be the key part, specifies the edge of the window nearest to the position of the image (the central point of the rectangular area surrounding the image) and informs the 3D position calculating unit 5104 that this edge is to be used as the rotation axis (step S5228, FIG. 4, step S5122). The resulting screen display is the same as windows 5232 and 5233 in FIG. 8. The window is displayed so that the right edge, which is closest to the image, appears near the front of the 3D space.

If an image is not included either, the window analyzing unit 5201, as a default process, informs the 3D position calculating unit 5104 that the left edge of the window is to be used as a rotation axis. The resulting screen display is the same as the window 5231 in FIG. 8. This is due to the fact that significant display content is commonly found in the upper left part of a window.

The multiple window display device specifies key parts of windows and displays the windows in perspective with the key parts appearing to be near the front, as explained above. This reduces the problems related to distinguishing display content when windows are displayed in perspective.

In the present embodiment, the window analyzing unit 5201 specified the key part of a window according to the existence of a title, text style, and the existence of an image, but in addition to these criteria, the part of a window in which display information is concentrated or the part of the window in which a keyword representative of the page content is positioned may also be specified as the key part.

If the entire display content of a window is an image, the window analyzing unit 5201 makes judgements according to the composition of the graphics. Should the window be composed of an image of a human figure for example, the window analyzing unit 5201 determines the position of the face of the figure by the distribution of flesh tones in the image, and places the window in perspective so that the face appears near the front and is thus easy to see. Should the window be composed of an image including a mountain, the window analyzing unit 5201 analyzes the distribution of the green and brown of the mountain and the blue of the sky. If the mountain is taken as the key part, the window analyzing unit 5201 puts the window in perspective so that the area in which the green and brown of the mountain are common appears to be near the front. This kind of display information can be easily determined from image data, character codes and the like before they are developed into display data.

Third Embodiment

The following is an explanation of a multiple window display device in the third embodiment.

This multiple window display device is characterized by the ability to bring a plurality of windows displayed scattered around the screen into automatic alignment.

Structure

Figure 9:
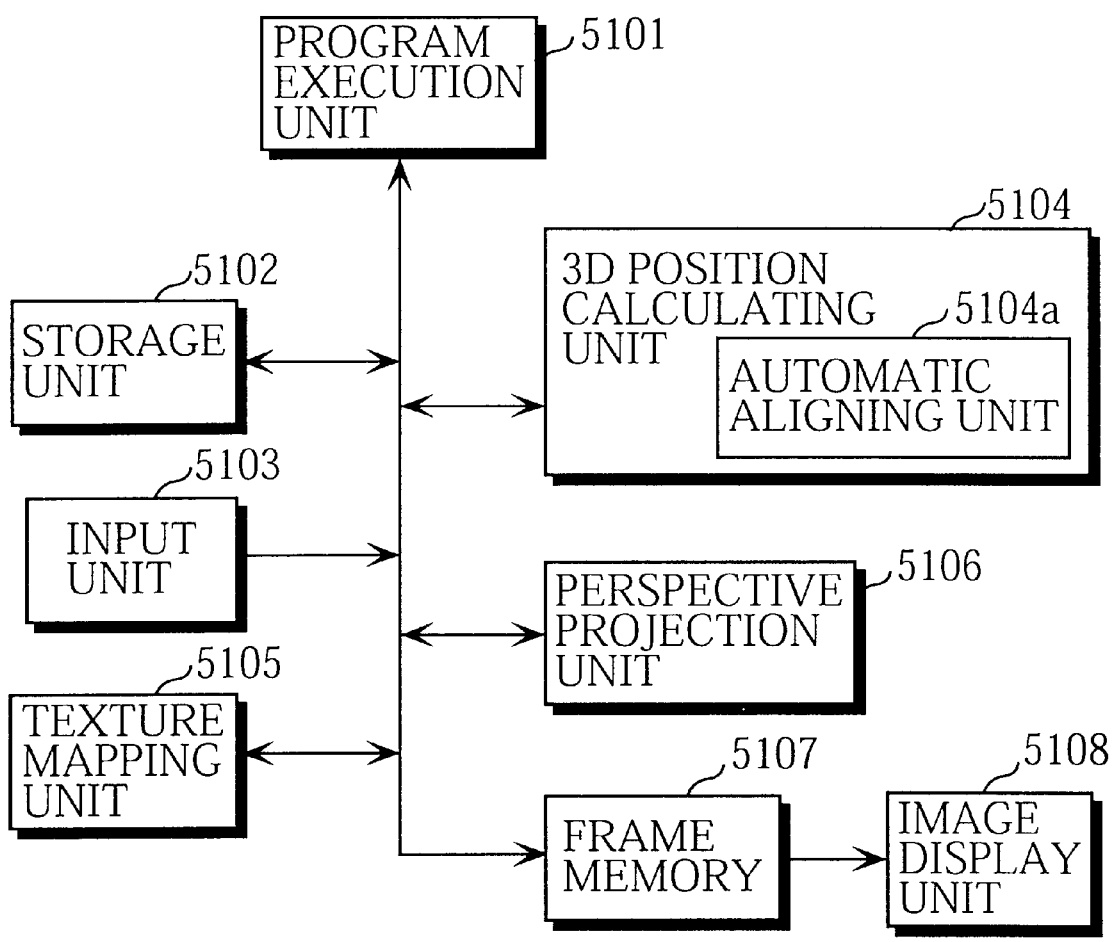
FIG. 9 is a block diagram showing a structure for a multiple window display unit in the third embodiment.

FIG. 9 is a block diagram showing a structure for the multiple window display device in the third invention.

This multiple window display device shares the structural elements 5101 to 5108 with the multiple window display device of the first embodiment, but differs in including an automatic aligning unit 5104a inside the 3D position calculating unit 5104. The following is an explanation of those points which differ from the first embodiment.

The automatic aligning unit 5104a performs positional alignment on all of the windows (objects) stored in the storage unit 5201 using either a first alignment method or a second alignment method. The second alignment method involves window-stacking, but the first alignment method does not.

In the first alignment method, the automatic aligning unit 5104a stores in advance sixteen alignments for when the number of displayed windows is one to sixteen, each alignment formed so that no window overlaps another window. In the second alignment method, however, the automatic aligning unit 5104a calculates positions for the windows so that each window appears in perspective with its left edge appearing near the front of the 3D space and its right edge inclined in the depth direction. The windows are stacked horizontally an equal distance apart, with the right half of each window overlapped by the next window in line.

Then the automatic aligning unit 5104a receives a notification from the 3D position calculating unit 5104 specifying the alignment method and the number of windows (objects). Next, the automatic aligning unit 5104a sends the position of each window in turn to the texture mapping unit 5105.

Operation

The following is an explanation of the operation of a multiple window display device structured as described above.

This multiple window display device differs from the multiple window display device of the first embodiment in that the automatic aligning unit 5104a calculates a new position during the 3D position calculation performed in the first embodiment (step S5122). The following is an explanation of the actual procedure for automatic alignment performed by the automatic aligning unit 5104a.

Figure 10:
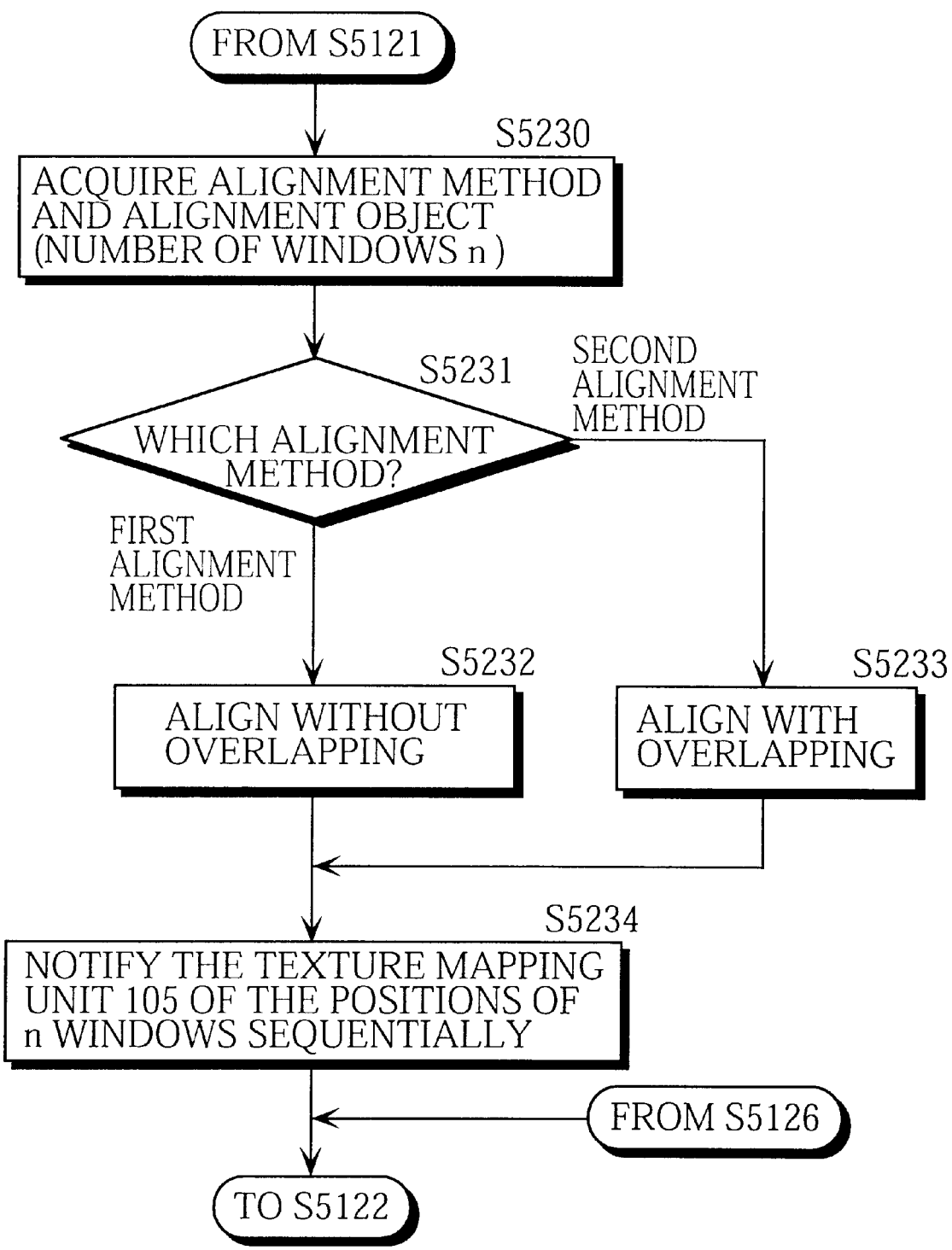
FIG. 10 is a flowchart showing automatic alignment processing performed by an automatic aligning unit 5104.

FIG. 10 is a flowchart showing the procedure for automatic alignment performed by the automatic aligning unit 5104a.

Figure 11A:
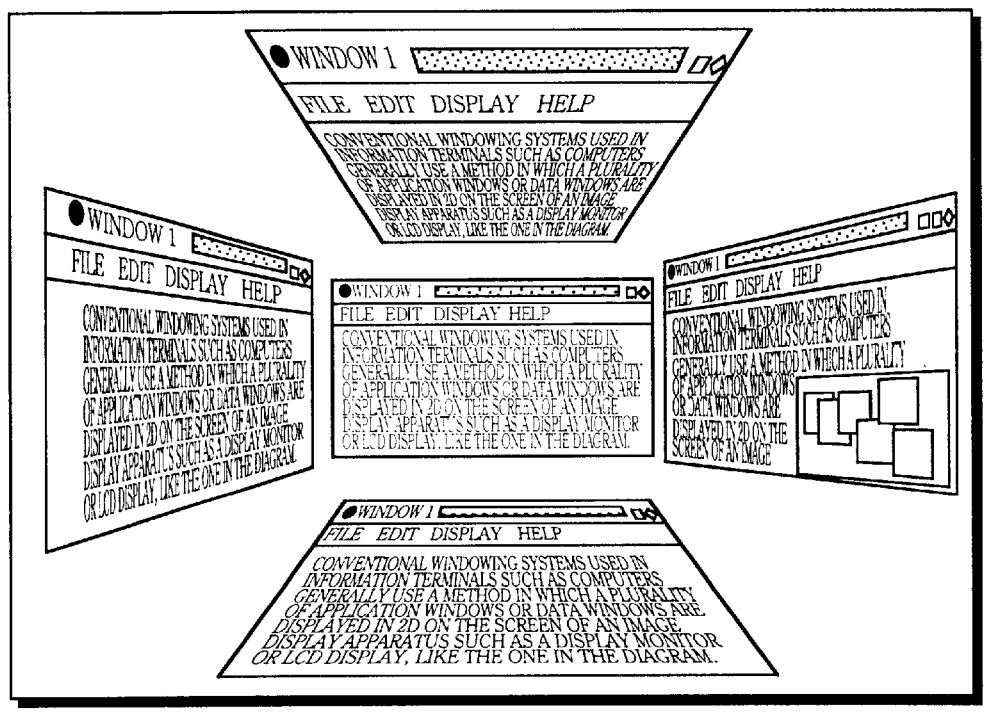
FIG. 11A shows an example of a first alignment method in which windows are not stacked.
Figure 11B:
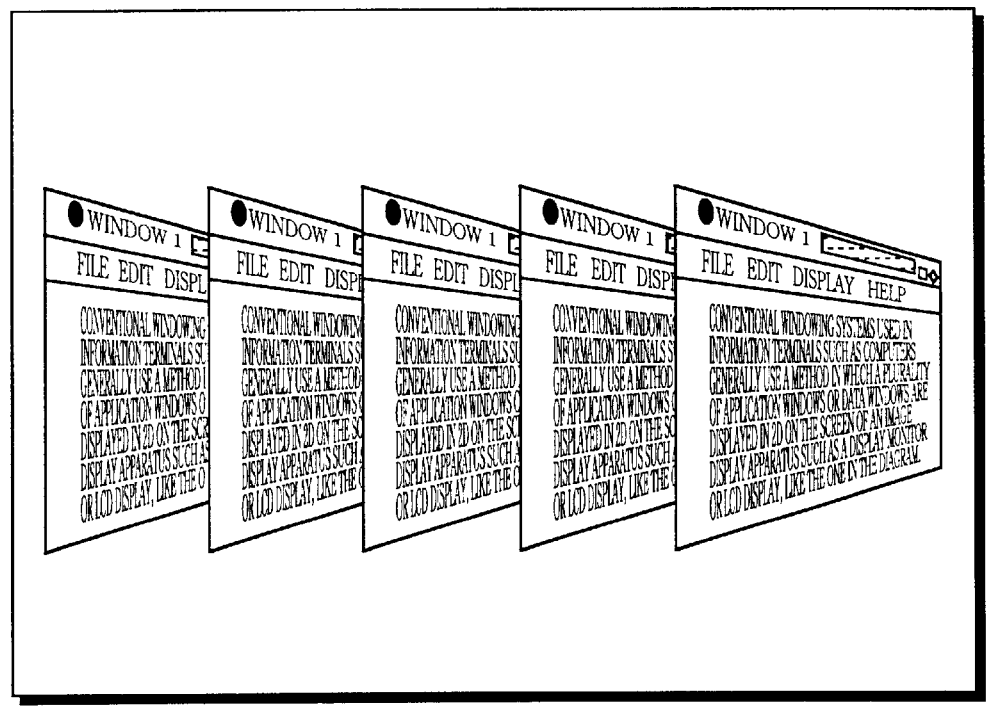
FIG. 11B shows an example of a second alignment method in which windows are stacked.

FIGS. 11A and 11B show examples of display screens in which five windows have been placed in automatic alignment by the automatic aligning unit 5104a. FIG. 11A shows an example of the first, alignment method, in which windows are not stacked, and FIG. 11B of the second alignment method, in which windows are stacked.

First, the 3D position calculating unit 5104 receives an input regarding the alignment method from the input unit 5103. The 3D position calculating unit 5104 refers to the storage unit 5201 and specifies a number of windows n that are to be aligned. The 3D position calculating unit 5104 then notifies the automatic aligning unit 5104a of the alignment method and number of windows n (step S5230).

Upon receiving the notification, the automatic aligning unit 5104a determines the alignment method (step S5231).

If the alignment method is the first alignment method, in which windows are not stacked, the automatic aligning unit 5104a reads in sequence the pre-stored positions to be used for the notified n windows (step S5232). The automatic aligning unit 5104a notifies the texture mapping unit 5105 of the positions (step S5234). The resulting screen display is as shown in FIG. 11A.

In the case of the second display method, in which windows are stacked, the automatic aligning unit 5104a calculates positions for each of n windows in turn, in response to the notified number n. Positions are calculated such that the windows are stacked horizontally an equal distance apart with the left side of each window appearing near the front and the right half overlapped by the next window in line (step S5233). The automatic aligning unit 5104a then informs the texture mapping unit 5105 of the positions (step S5234). The resulting screen display is shown in FIG. 11B.

As explained, a large number of windows displayed scattered around the screen are automatically aligned in a perspective-projected state by the multiple window display device. This eliminates wasted area on the screen and enables the position and content of all the windows to be grasped at a glance.

Here, once automatic alignment has been performed for a window, the aligned position can be used effectively as the default position for each window. For example, the 3D position calculating unit 5104 may store aligned positions for the windows obtained by automatic alignment as default positions. If one of the windows in the automatically-aligned window group is specified by the input unit 5103, the 3D position calculating unit 5104 calculates the position of the window so that it faces the front using the edge of the window near the front as a rotation axis. A means for calculating a position enabling the front-facing window to return to the default position at automatic alignment may also be added. This procedure is performed when a specific part of the front-facing window (for example, a window adjustment button positioned on the title bar) is indicated by the input unit 5103.

Figure 12A:
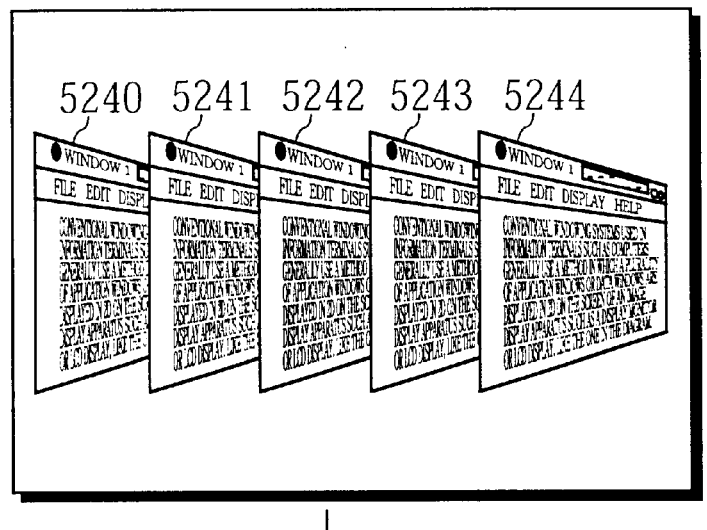
FIG. 12A shows an example of a display screen immediately after automatic alignment has been performed.
Figure 12B:
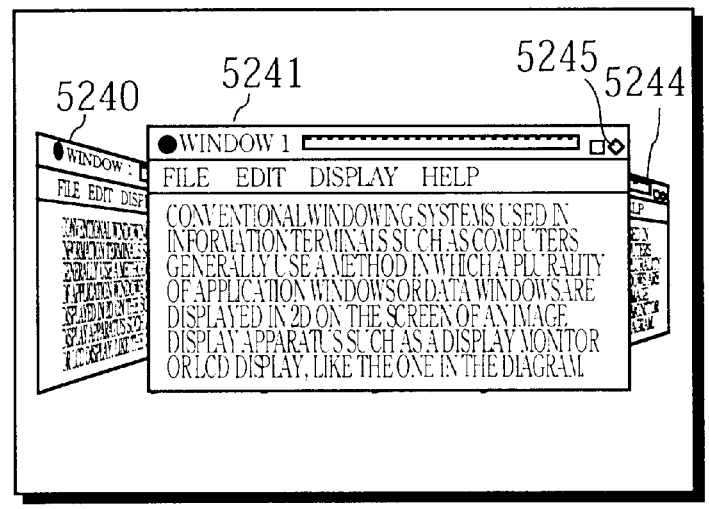
FIG. 12B shows an example of a display screen immediately after a window 5241 displayed in the display screen of FIG. 12A has been selected by an input unit 5103.
Figure 12C:
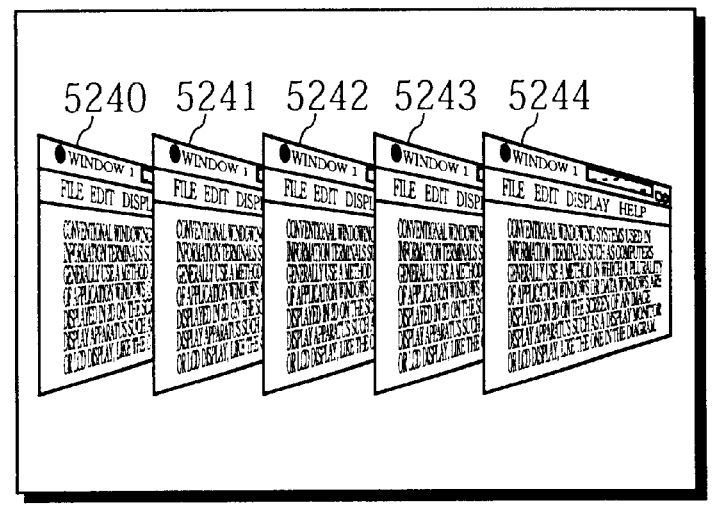
FIG. 12C shows as example of a display screen immediately after a window adjustment button 5245 on the right edge of the title bar of the window 5241 in the display screen of FIG. 12B has been pressed using the input unit 5103.

FIGS. 12A to 12C show an example of how the position of each automatically aligned window may be effectively used as its default position.

FIG. 12A shows a display screen after automatic alignment has been performed, and corresponds to FIG. 11B.

FIG. 12B shows a display screen immediately after a window 5241 in FIG. 12A has been selected by the input unit 5103.

Here, the 3D position calculating unit 5104 calculates a new position so that the selected window 5241 is rotated to face the front with the edge that was near the front of the 3D space in perspective (the left edge) remaining in a fixed position.

FIG. 12C shows a display screen immediately after the window adjustment button 5245 positioned in the right corner of the title bar of the window 5241 has been pressed using the input unit 5103.

Here, the 3D position calculating unit 5104 reads the already stored default position for the window, on which the window adjustment button 5245 has been pressed, as the new position for the window, and sends this position to the texture mapping unit 5105. This places the window 5241 in perspective, returning it to the position following automatic alignment.

Thus, a window can be brought to face the front and returned to the automatically aligned position at the touch of a button. This procedure is particularly useful in small portable information terminals, where it makes windows easier to manipulate.

In the present embodiment, use of the second alignment method for stacking windows causes a plurality of windows to be aligned so that the right half of each window is covered by the next window. The addition of the window analyzing unit 5201 of the second embodiment, however, makes it easy to transform windows so that only insignificant parts of each window are covered up.

In addition, instead of clicking a mouse to move a specified window to the position immediately after automatic alignment or to the position facing the front, automatic interchanging of display positions may be performed by moving a mouse cursor. In this case, a window on which the mouse cursor is positioned is implicitly specified and is displayed facing the front, while a window on which the mouse cursor is no longer positioned is returned to its position immediately following automatic alignment.

Fourth Embodiment

The following is an explanation of a multiple window display device in the fourth embodiment.

This multiple window display device is characterized by the ability to change the position of the title and menu bars according to the orientation of the window.

Figure 13:
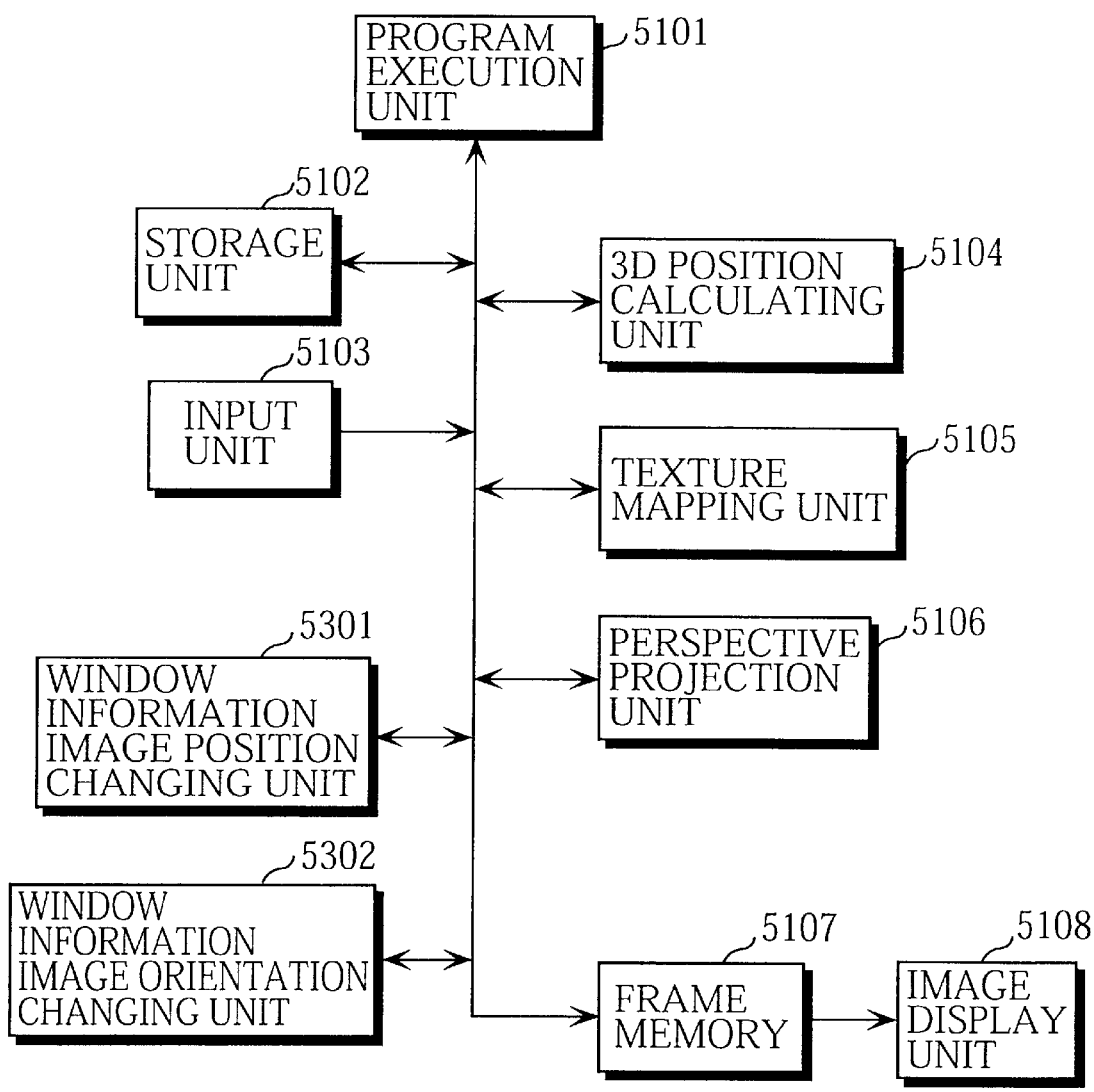
FIG. 13 is a block diagram showing a structure for a multiple window display device in the fourth embodiment.

FIG. 13 is a block diagram showing the structure of the multiple window display device in the fourth embodiment.

This multiple window display device includes a window information image position changing unit 5301 and a window information image orientation changing unit 5302, in addition to the structural elements 5101 to 5108 of the multiple window display device in the first embodiment. The following is an explanation of those points which differ from the first embodiment.

When a window is displayed in perspective, the window information image position changing unit 5301 changes the position of the window information image (title bar and menu bar image) so that it is displayed on the edge of the window near the front of the 3D space. To do so, the window information image position changing unit 5301 reads the position of the window in the 3D space as calculated by the 3D position calculating unit 5104. If the window is in perspective with one edge near the front of the 3D space, and the window information image is not displayed on that edge, the window information image position changing unit 5301 moves the window information image to the edge near the front by overwriting the window image data stored in the storage unit 5102.

When the window is displayed in perspective and the window information image is displayed on the near edge, the window information image orientation changing unit 5302 changes the image data so that only the rectangle containing the window information image is rotated round so that it faces the front (is parallel with the display screen). To do so, the window information image orientation changing unit 5302 divides the image data for the whole window stored in the storage unit 5201 into data for the window information image and data for the main part of the window. The window information image orientation changing unit 5302 notifies the 3D position calculating unit 5104 that the window information image is to be displayed facing the front and that the remaining main part of the window is to be displayed in perspective.

Operation

The following is an explanation of the operation of the multiple window display device of the present embodiment, structured as described above.

The multiple window display device of the present embodiment differs from the first embodiment in that processing of the window information image is added between calculation of the 3D position (FIG. 4, step S5122) and the subsequent texture mapping (FIG. 4, step S5123) occurring in the first embodiment. This additional processing is explained here.

Figure 14:
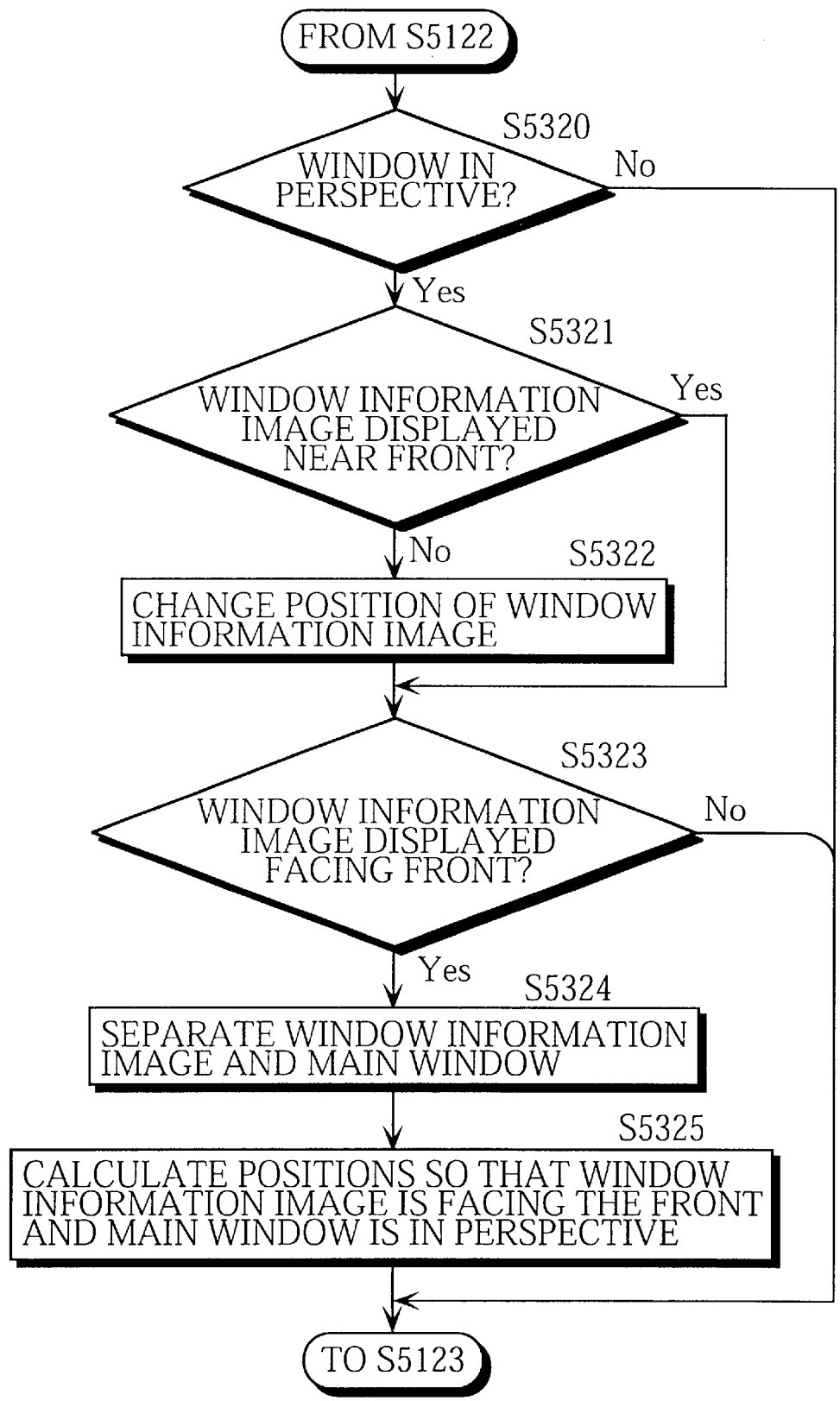
FIG. 14 is a flowchart showing operation processing for a window information image position changing unit 5301 and a window information image orientation changing unit 5302.

FIG. 14 is a flowchart showing the operating procedure for the window information image position changing unit 5301 and the window information image orientation changing unit 5302.

When a position in the 3D space has been calculated by the 3D position calculating unit 5104 (FIG. 4, step S5122), the window information image position changing unit 5301 refers to this position to determine whether the window has been placed in perspective with one edge appearing near the front (step S5320).

If this is the case, the window information image position changing unit 5301 next determines whether the window information image is located on the near edge (step S5321). If the window information image is not displayed on the near edge, the window information image position changing unit 5301 rewrites the window image data stored in the storage unit 5201 so that the window information image is displayed on that edge (step S5322).

Figure 15:
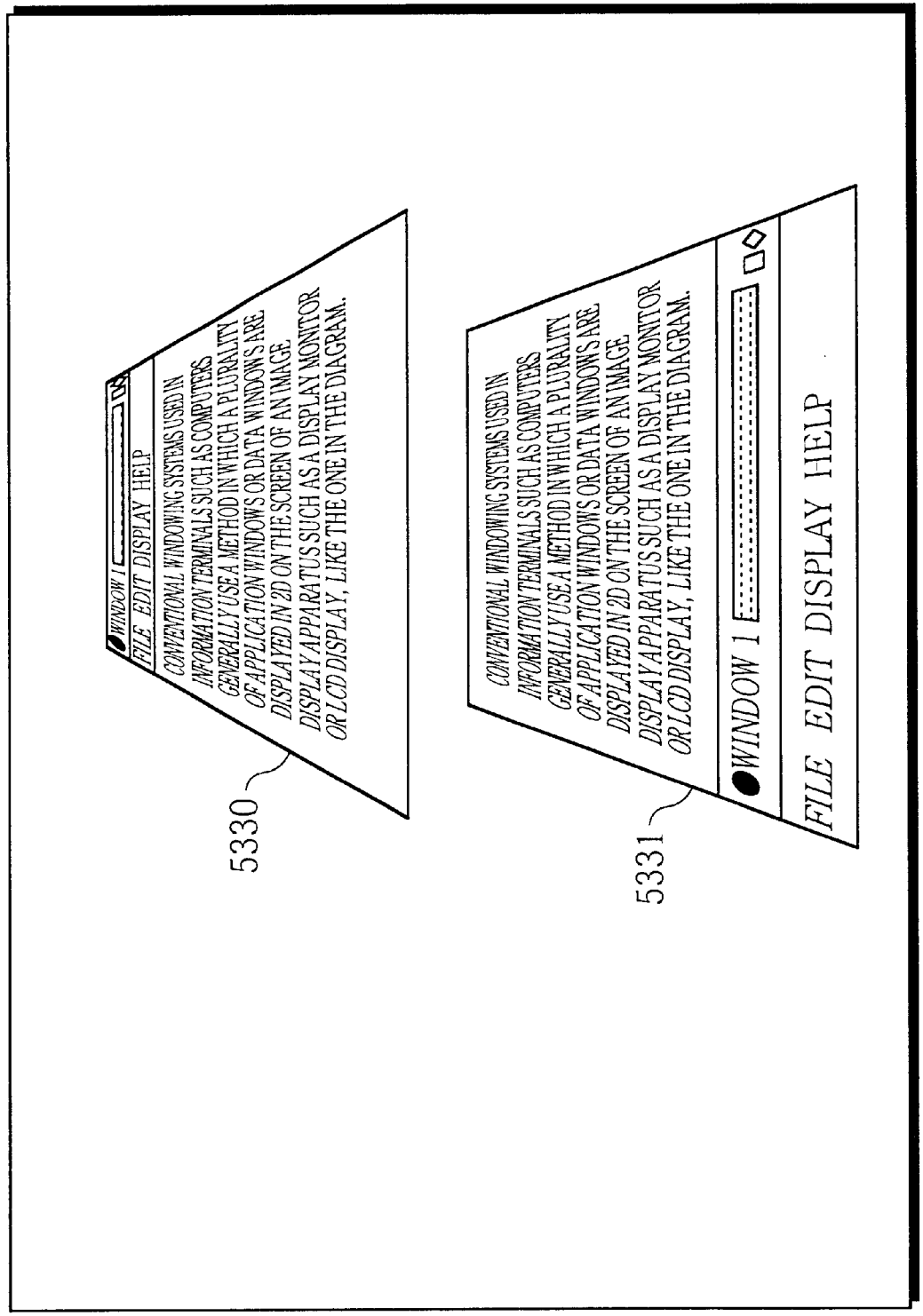
FIG. 15 shows an example display screen containing a window 5330, prior to changing the position of the window image information and a window 5331, after changing the position of the window image information.

FIG. 15 shows an example of a display screen displaying two windows 5330 and 5331. A window 5330 shows the situation before the position of the window information image is changed and a window 5331 the situation after this change has taken place. Both windows were subject to texture mapping and perspective projection before being displayed.

It can be seen that the title bar and menu bar (window information image), which would normally be displayed positioned towards the back of the 3D space, are moved so as to be displayed on the edge nearer to the front of the 3D space.

Next, the window information image orientation changing unit 5302 determines whether an input instructing the window information image to be placed facing the front has been received from the input unit 5103 (step S5323). If such an input has been received, the window information image orientation changing unit 5302 specifies the key part from data stored in the storage unit 5201 by splitting data for the window information image from data for the main part of the window (step S5324). The window information image orientation changing unit 5302 also instructs the 3D position calculating unit 5104 to calculate separate positions for the two parts of the window, so that the window information image faces the front with the main part of the window next to it in perspective. (step S5325).

Following this, texture mapping and perspective projection are performed in turn on the window information image and the main part of the window and the resulting image displayed on the screen (FIG. 4, steps S5123 to S5125).

Figure 16:
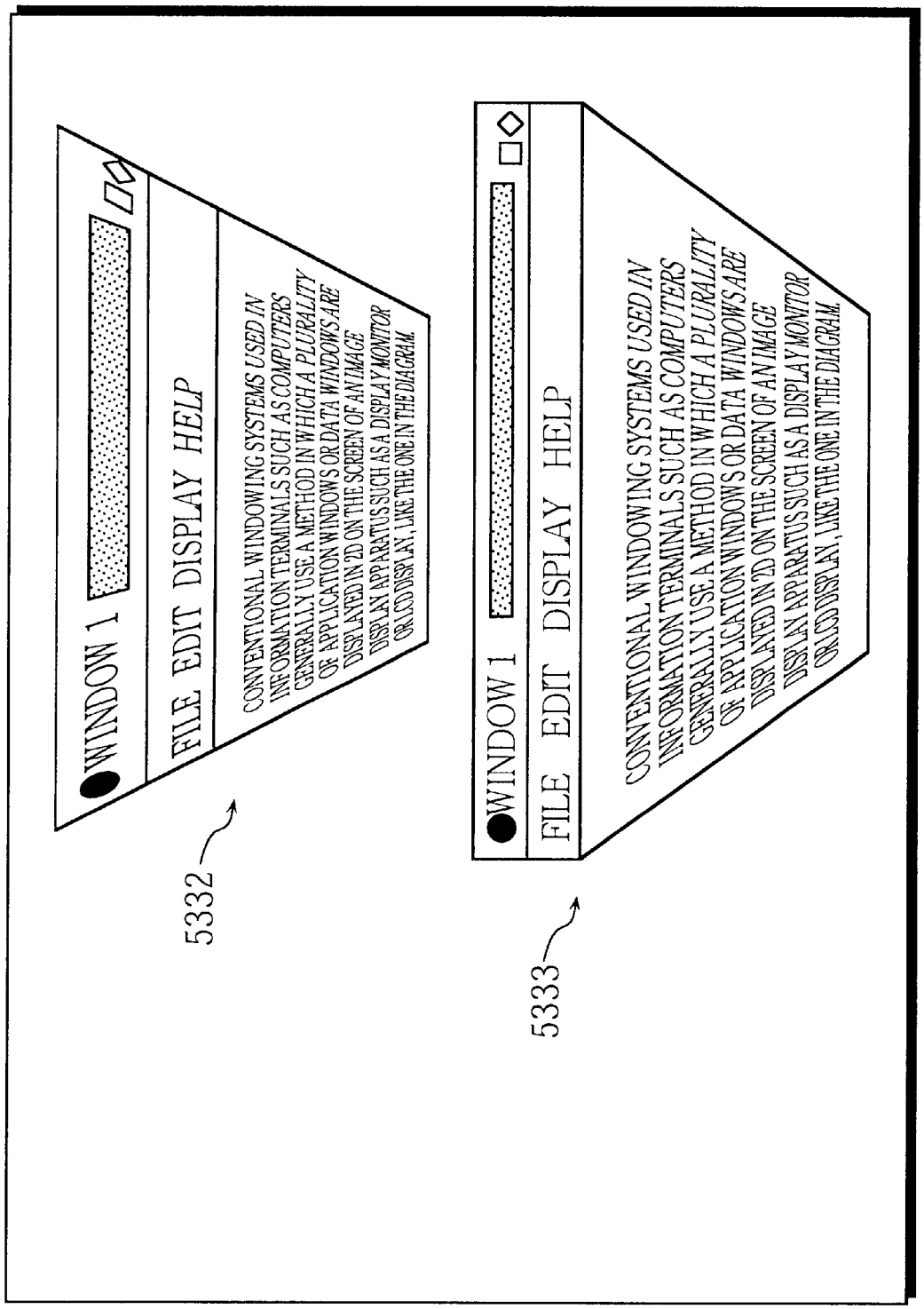
FIG. 16 shows an example display screen containing a window 5332, prior to changing the orientation of the window image information and a window 5333, after changing the orientation.

FIG. 16 shows an example of a display screen, displaying a window 5332 showing the situation before the orientation of the window information image is changed, and a window 5333 showing the situation after the window information image has been changed to face the front.

It can be seen that the title bar and menu bar (window information image) of the window in perspective have been rotated forward so that this part of the window faces the front.

As explained above, the multiple window display device of the present embodiment can display the window information image for performing window operations and menu operations so that it always faces the front, even if a window is displayed in perspective. Alternatively, the window information image may be fixed in place so that it always faces the front. This prevents any difficulty in performing window operations and menu operations when the window being displayed is in perspective.

In the present invention, processing was implemented so that the whole of a planar window was folded into two parts: the window information image and the main part of the window. However, a method in which the window itself is presumed to be a 3D object and, when the window is in perspective, the title bar and the menu bar are displayed on a side surface of the object that is adjacent to the near edge of the window surface, may also be used. This enables data for the window information image and the main part of the window to be treated as a whole without needing to be divided, making the position change and orientation change processing simpler.

This method makes windows more visually appealing and simplifies window operations. It also eliminates the need for the window information image to be displayed on the surface of the window, enabling the window surface to be utilized more effectively. Additionally, if window operations are capable of changing the orientation of a window displayed as a 3D object, the title bar and menu bar may be displayed in advance on all four side surfaces adjacent to the window surface.

Fifth Embodiment

The following is an explanation of a multiple window display device in the fifth embodiment.

The multiple window display device is characterized by the ability to control the display of a scroll bar in accordance with the size of an unreadable display area created when a window is placed in perspective.

Operation

Figure 17:
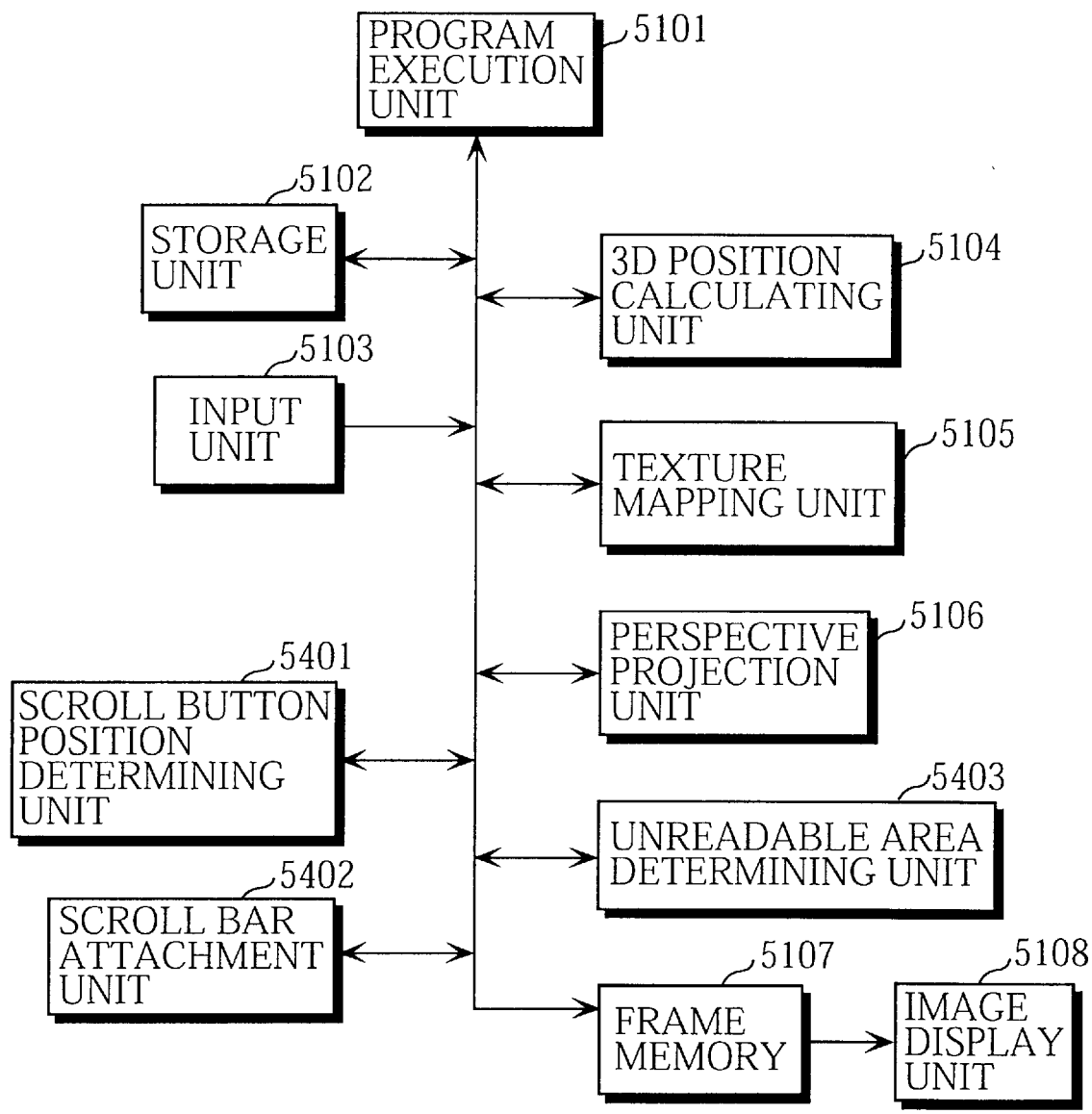
FIG. 17 is a block diagram showing a structure for a multiple window display device in the fifth embodiment.

FIG. 17 is a block diagram showing a structure for the multiple window display device in the fifth embodiment.

The multiple window display device includes a scroll button position determining unit 5401, a scroll bar attaching unit 5402 and an unreadable area determining unit 5403, in addition to the structural elements 5101 to 5108 of the multiple window display device in the first embodiment. The following is an explanation of those points that differ from the first embodiment.

The unreadable area determining unit 5403 specifies an area that is unreadable after the window has been placed in perspective. To do so, the unreadable area determining unit 5403 calculates in advance the final display size of characters located at representative points in the window. Processing is then performed by the texture mapping unit 5105 and the perspective projection unit 5106. The area where characters would be displayed at a size smaller than 5 point×5 point is determined to be the unreadable area. This calculation is performed with reference to the size of characters in the window stored in the storage unit 5102, the window position calculated by the 3D position calculating unit 5104, and the transform constants (coordinates for vanishing points and the viewpoint) in the perspective projection unit 5106.

When an unreadable area is detected by the unreadable area determining unit 5403, the scroll button position determining unit 5401 determines the position of a scroll button so that it reflects this. To do so, an edge running in the depth direction is selected as the scroll direction. The position of the scroll button is determined from the ratio of the length of the readable area in the scroll direction to the length of the unreadable area in the scroll direction. The scroll button is positioned as if the unreadable area was not displayed in the window.

The scroll bar attaching unit 5402 attaches a scroll bar image to an edge of the window running in the depth direction. A scroll button is placed on the scroll bar image at the position determined by the scroll button position determining unit 5401. The scroll bar attaching unit 5402 then has the scroll bar image displayed in this way, by attaching the scroll-bar image to the window image data stored in the storage unit 5102.

Operation

The following is an explanation of the operation of a multiple window display device in the present embodiment, structured as described above.

The multiple window display device includes image processing for the scroll bar in addition to the operations in the first embodiment. This processing is included between the 3D position calculation (FIG. 4, step S5122) and the subsequent texture mapping (FIG. 4, step S5123). The following is an explanation of this additional processing.

Figure 18:
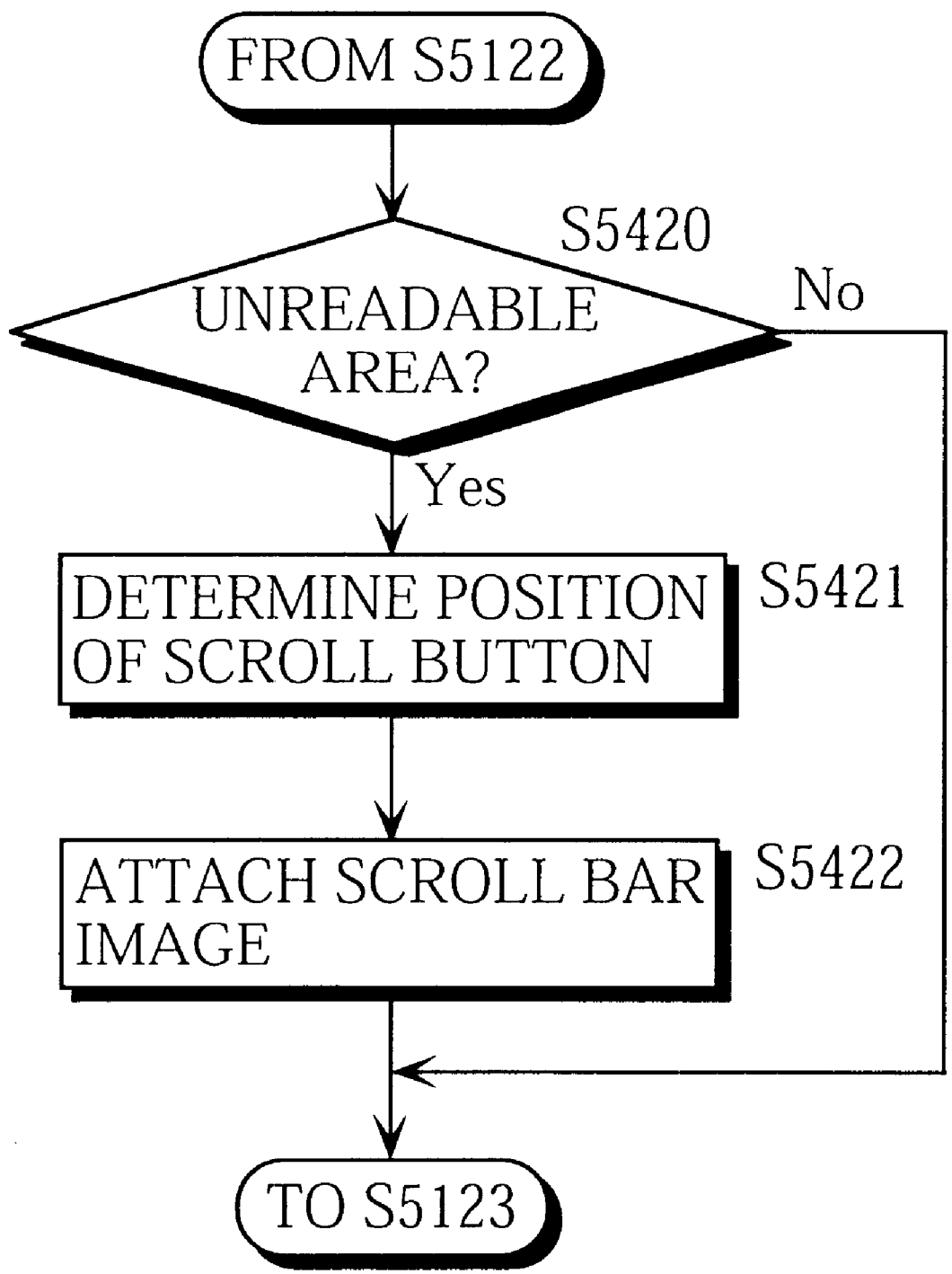
FIG. 18 is a flowchart showing operation procedures for a scroll button position determining unit 5401, a scroll bar attaching unit 5402 and an unreadable area determining unit 5403.

FIG. 18 is a flowchart showing the operating procedure for the scroll button position determining unit 5401, the scroll bar attaching unit 5402 and the unreadable area determining unit 5403.

When a position is calculated for a window in the 3D space by the 3D position calculating unit 5104 (FIG. 4, step S5122), the unreadable area determining unit 5403 determines whether an unreadable area is present in the window finally displayed following placement of the window in perspective (step S5420). If an unreadable area is present, the unreadable area determining unit 5403 specifies this area.

When an unreadable area has been found, the scroll button position determining unit 5401 next determines the position of a scroll button from the size of this area. In other words, the position of the scroll button is determined as if only the readable area was displayed in the window.

Next, the scroll bar attaching unit 5402 attaches a scroll bar image to the image data stored in the storage unit 5402. A scroll button is placed on this scroll bar in the position determined by the scroll button position determining unit 5401 (step S5422).

The contents of the storage unit 5201 are thus rewritten so that the image data is for a new window having a scroll bar. Next, texture mapping and perspective projection are performed on the new image data, and the result displayed on the screen, as in the first embodiment (FIG. 4, step S5123 to S5125).

If the scroll button is then dragged using the input unit 5103, a conventional scrolling operation is performed by the program execution unit 5101. In other words, the position of the window itself does not change, so that the scroll bar is still displayed at a position that deviates only by the size of unreadable area.

Figure 19A:
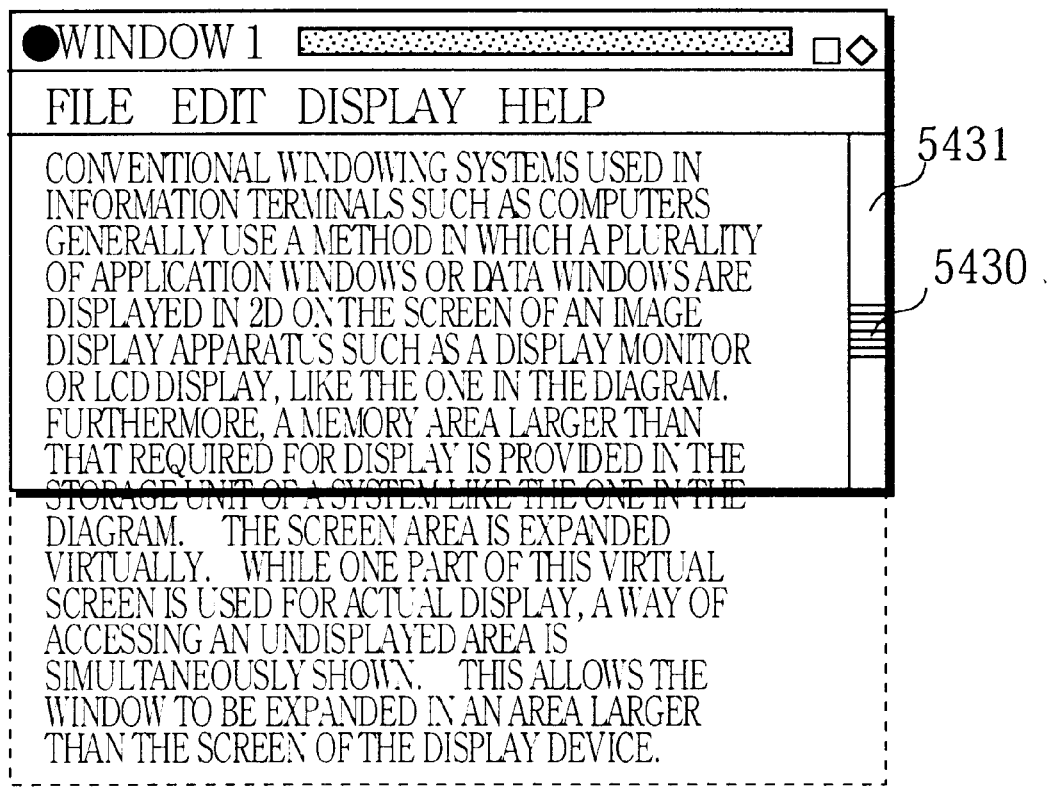
FIG. 19A shows the basic concept for a scroll button 5430 and a scroll bar 5431.

FIG. 19A is an example of a conventional window display, illustrating the general concept for a scroll button 5430 and scroll bar 5431.

The position of the scroll button on the scroll bar shows the relative position of the current display content of the window to the display object as a whole.

Figure 19B:
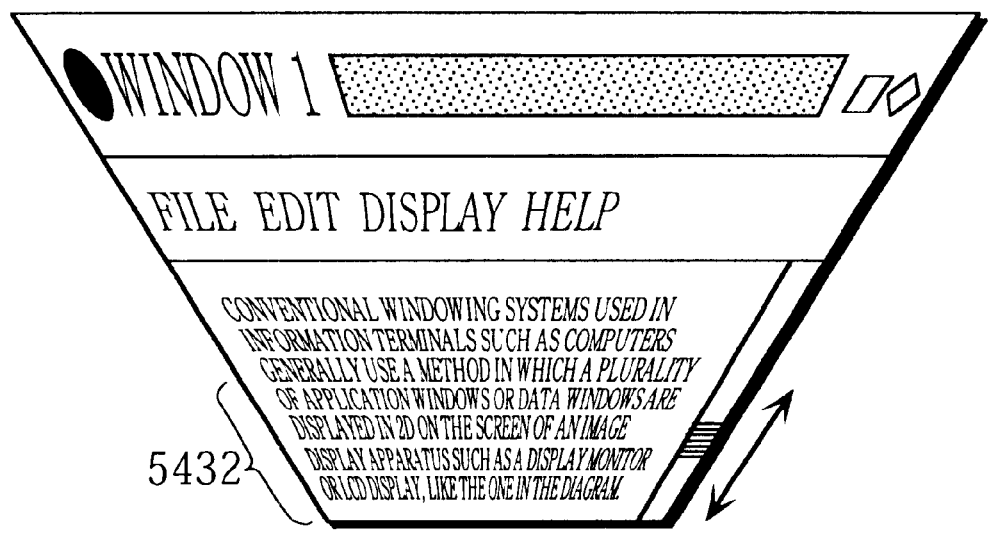
FIG. 19B shows an example display screen when the lower half of the window display area has been determined to be an unreadable area 5432.

FIG. 19B is an example of a screen display in which the lower half of the display area for a window has been determined to be an unreadable area 5432.

Here, the scroll button 5430 is displayed at a position which treats the lower half of the display area 5432 as if it was not visible in the window. Accordingly, when the scroll button 5430 is moved downwards by the input unit 5103, part of the area that was unreadable moves into a readable position.

As explained above, even if an unreadable area is created by displaying the window in perspective, the multiple window display device in the present embodiment attaches a scroll bar for scrolling the content of the window towards the front of the 3D space in the depth direction. As a result, the entire content of the display object can be distinguished by dragging the scroll button in a simple operation, without requiring the window itself to be moved.

In the present embodiment, a scroll bar is attached when an unreadable area is detected. However, a structure in which a scroll bar is attached when part of a document cannot be displayed in the window may also be used, regardless of whether an unreadable area exists or not. In this case, the scroll button signifies a position at which the area treated as not visible on screen is obtained by adding the unreadable area to the area extending beyond the bottom of the window. Additionally, operations can be made more convenient for the user by color coding the scroll bar in the texture mapping process to differentiate between the unreadable area and the area extending beyond the bottom of the window.

Sixth Embodiment

The following is an explanation of a multiple window display device in the sixth embodiment.

The multiple window display device of the present embodiment is characterized by the ability to display windows in layers, with each layer distinct from other layers and in perspective.

Structure

Figure 20:
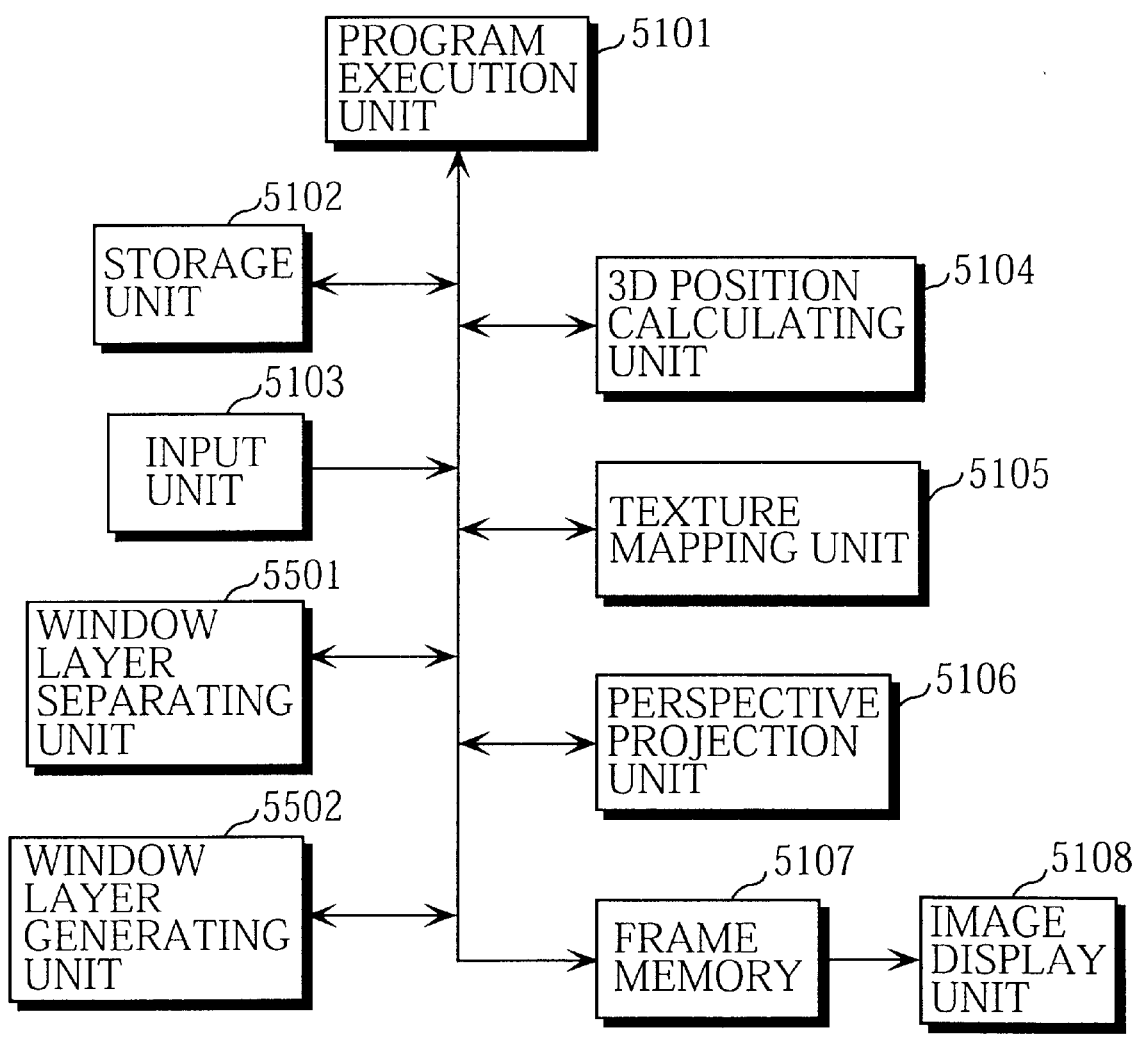
FIG. 20 is a block diagram showing a structure for a multiple window display device in the sixth embodiment.

FIG. 20 is a block diagram showing a structure for the multiple window display device in the sixth embodiment.

The multiple window display device of the present embodiment includes a window layer separating unit 5501 and a window layer generating unit 5502, in addition to the structural elements 5101 to 5108 of the multiple window display device in the first embodiment. The following is an explanation of the differences from the first embodiment.

The window layer separating unit 5501 detects a window with a layered construction from the windows stored in the storage unit 5102, and separates that window into layers.

Some application programs which handle a mixture of text and images or a plurality of mixed images use a layered construction, in which images and text are provided on separate layers, enabling editing and operations to be performed independently for each layer. This is the format used in graphics design software and document layout software used for desktop publishing. When this kind of application program is executed by the program execution unit 5101, code data and image data for a window having a layered construction are stored in the storage unit 5102.

The window layer separating unit 5501 detects layered windows by analyzing the code data of each window stored in the storage unit 5102. The window layer separating unit 5501 then fetches the image data for all the layers in a multilayer window apart from the base (bottom) layer.

The window layer generating unit 5502 generates independent window layers from the layers separated by the window layer separating unit 5501. In other words, the window layer generating unit 5502 generates new image data so that the image data for each of the layers fetched by the window layer separating unit 5501 becomes a separate window, and stores the generated data in the storage unit 5102.

Operation

The following is an explanation of the operation of the multiple window display device of the present embodiment, structured as described above.

The operation of the multiple window display device differs from the first embodiment by including window layer processing between the generation of code data and image data for the window (FIG. 4, step S5121) and the subsequent calculation of a 3D position (FIG. 4, step S5122). The following is an explanation of this additional processing.

FIG. 21 is a flowchart showing the operating procedure for the window layer separating unit 5501 and the window layer generating unit 5502.

When display data (code data and image data) for a window with a layered construction has been stored in the storage unit 5201 by the program execution unit 5101 (FIG. 4, step 5121), the window layer separating unit 5501 specifies the layered window out of the code data stored in the storage unit 5102. The window layer separating unit 5501 divides the image data into layers and then fetches the image data for all of the layers apart from a base layer (step S5520).

Figure 22A:
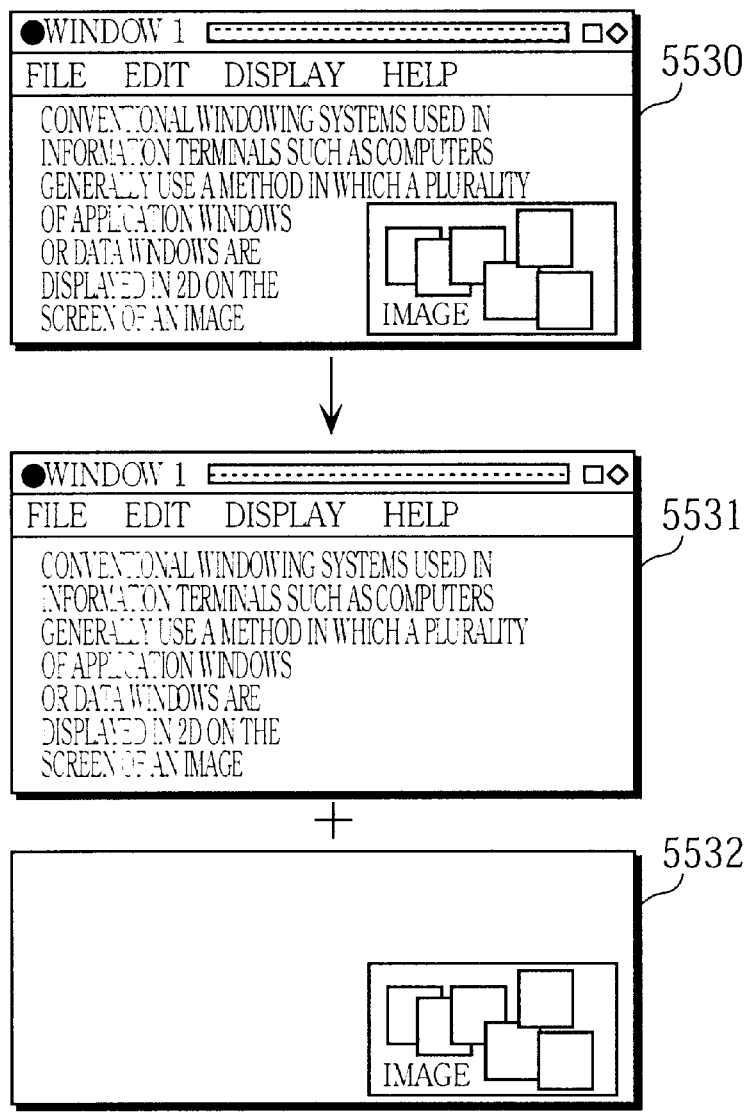
FIG. 22A shows an outline of the layer separation processing occurring when there are two layers.

FIG. 22A illustrates the concept of layer separation when there are two layers (step S5521). A composite window 5530 stored in the storage unit 5201 is shown divided into a base layer 5531 and an upper layer 5532.

Next, the window layer generating unit 5502 generates image data for the upper layer 5532 fetched by the window layer separating unit 5501 so that it forms a separate window and stores the data in the storage unit 5201 (step S5521). Then, the layer window generating unit 5502 notifies the 3D position calculating unit 5104 of the newly generated window layer 5532. The notification stipulates that the window layer 5532 should be parallel to the base layer 5531 in the 3D space, and a specified distance nearer to the front of the 3D spade (step S5522).

Following this, the 3D position calculating unit 5104 calculates a position for the base layer window 5531 as specified by the program execution unit 5101 or the input unit 5103. The 3D position calculating unit 5104 also calculates a position for the upper layer window 5532 as specified by the window layer generating unit 5502. The position of the upper layer window 5532 is calculated so that it is located at a position where the base layer window 5531 would be were it moved a specified distance forward perpendicular to its plane (FIG. 4, step S5122).

Figure 22B:
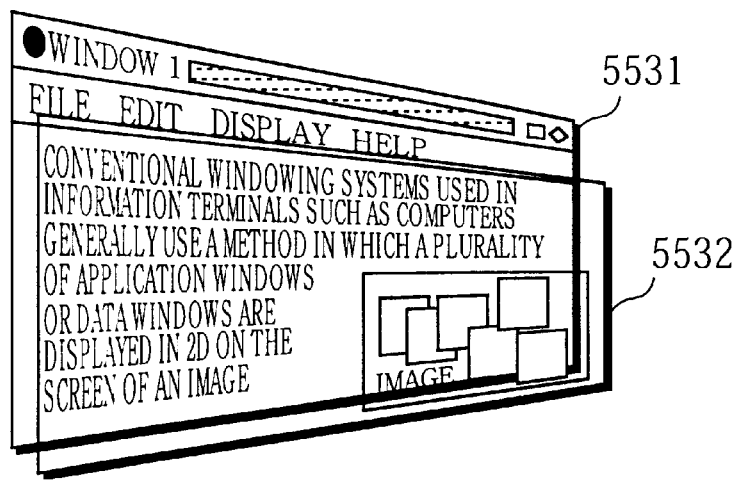
FIG. 22B is an example display screen occurring when a layered window is arranged inclining in the depth direction.

FIG. 22B shows an example of a screen display when a layered window is placed in perspective.

The upper layer 5532 is displayed so that it seems to float over the base layer 5531.

The multiple window display device in the present embodiment displays a window with a layered construction in perspective, and separated into layers. As a result, information which could not be judged from a conventional 'flat' screen, such as which objects are located in which layer, can be grasped at a glance. As all the layers can be displayed simultaneously, objects on any layer can be specified immediately without needing to switch between layers. This enables editing operations and the like spanning a plurality of layers to be performed smoothly.

In the present embodiment, the window layers are transparent and the whole of each overlapping window layer is displayed. If a window layer selected by the user is made semi-transparent, however, it can be highlighted, making it easier to see.

Seventh Embodiment

The following is an explanation of a multiple window display device in the seventh embodiment.

The multiple window display device of the present embodiment is characterized by the ability to separate the result of a keyword search from an original window as a window layer, displaying the new layer so that it stands out from the original window.

Structure

FIG. 23 is a block diagram showing a structure for the multiple window display device in the seventh embodiment.

The multiple window display device of the seventh embodiment includes a keyword search unit 5601, a search result output unit 5602 and a window layer generating unit 5603 in addition to the structural elements 5101 to 5108 of the first embodiment. The following is an explanation of the differences from the first embodiment.

The keyword search unit 5601 searches for a keyword in a document displayed in a window. This means that the keyword search unit 5601 searches among the code data of the document stored in the storage unit 5201 for a character string identical to a keyword indicated by the input unit 5103. If an identical character string is found, the keyword search unit 5601 informs the window layer generating unit 5603 of the window, the position(s) pinpointed by the search and the keyword.

The window layer generating unit 5603 generates a new window layer, in which only the keyword searched for is arranged at the positions found in the search, according to the notification received from the keyword search unit 5601. This means that only image data including the searched character string is taken from the image data of the window indicated by the keyword search unit 5601. The window layer generating unit 5603 stores this image data in the storage unit 5201 as the image data for a new window layer.

The search result output unit 5602 informs the 3D position calculating unit 5104 of the position of the window layer generated by the window layer generating unit 5603. This means that the search result output unit 5602 specifies the position of a new window layer so that the positional relation between the search object, in other words the original window, and the newly generated window is the same as the positional relation between the base layer 5531 and the upper layer 5532 in the sixth embodiment.

Operation

The following is an explanation of the operation of the multiple window display device in the present embodiment, structured as described above.

The operation of the multiple window display device of the present embodiment differs from the first embodiment in that additional window layer processing is included between the generation of code data and image data for the window (FIG. 4, step S5121) and the subsequent calculation of a 3D position (FIG. 4, step S5122). The following is an explanation of the differences from the first embodiment.

Figure 24:
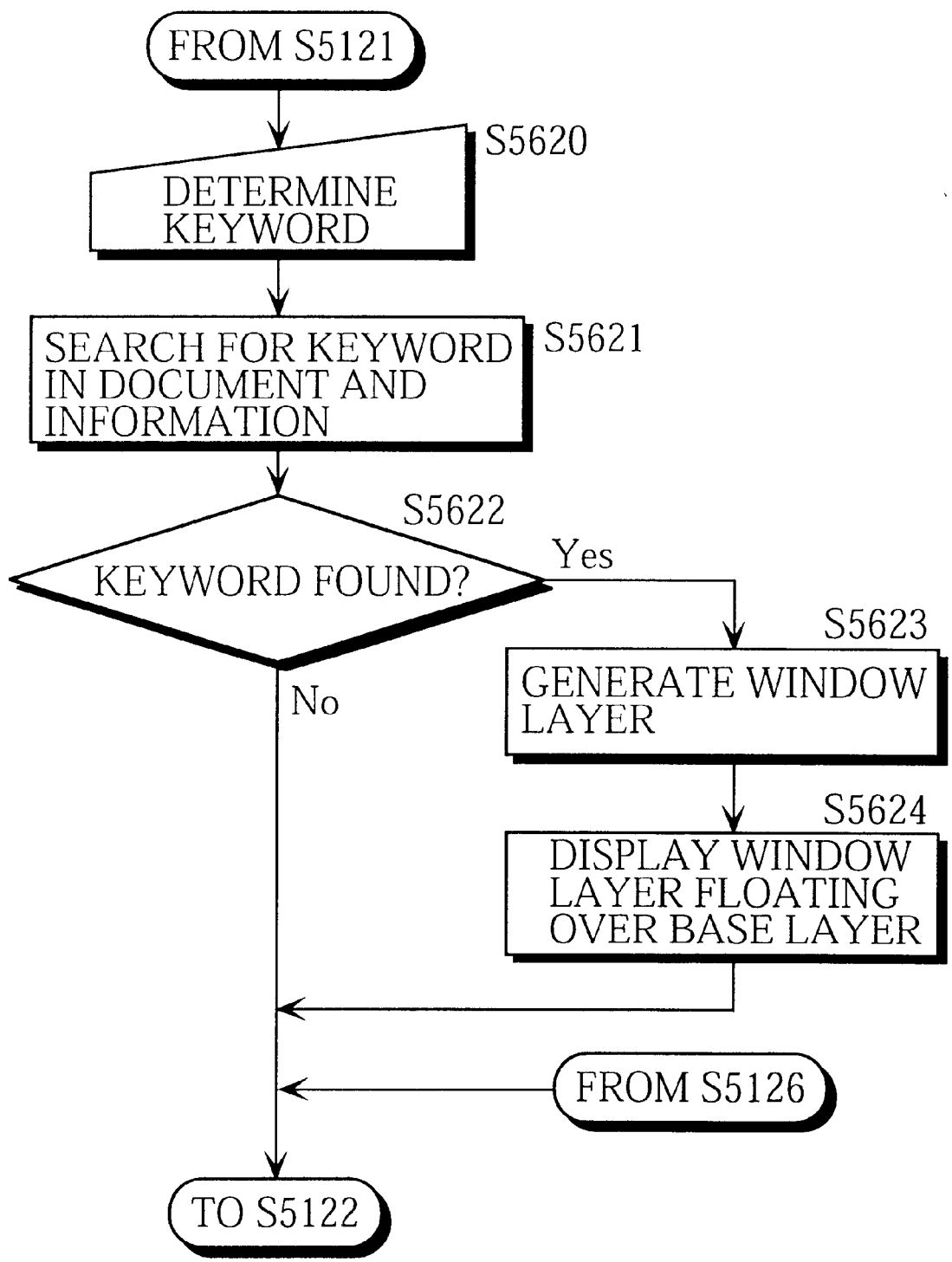
FIG. 24 is a flowchart showing operation procedures for a keyword search unit 5601, a search result output unit 5602 and a window layer generating unit 5603.

FIG. 24 is a flowchart showing the operating procedure for the keyword search unit 5601, the search result output unit 5602 and the window layer generating unit 5603.

When a keyword is input by a user via the input unit 5103. (step S5620), the keyword search unit 5601 searches for a character string identical to this keyword from among the code data for the entire document stored in the storage unit 5201 (step S5621).

If an identical character string is found (step S5622), the keyword search unit 5601 informs the window layer generating unit 5603 of found positions and keywords for each window.

The window layer generating unit 5603 generates image data for a window layer consisting only of instances of the character string found during the search according to this information, and stores the image data in the storage unit 5201 (step S5623).

Then, the search result output unit 5602 directs the 3D position calculating unit 5104 to calculate 3D positions so that the window generated by the window layer generating unit 5603 appears to float over the original window (step S5624).

Consequently, the 3D position calculating unit 5104 calculates the position for the search object, that is the original window, as specified by the program execution unit 5101 or the input unit 5103. The 3D position calculating unit 5104 also calculates the position for the window layer generated by the window layer generating unit 5603 based on an indication from the search result output unit 5602. This position is calculated so that the window layer is positioned in parallel with, and only a specified distance away from the original window (FIG. 4, step S5122).

Figure 25:
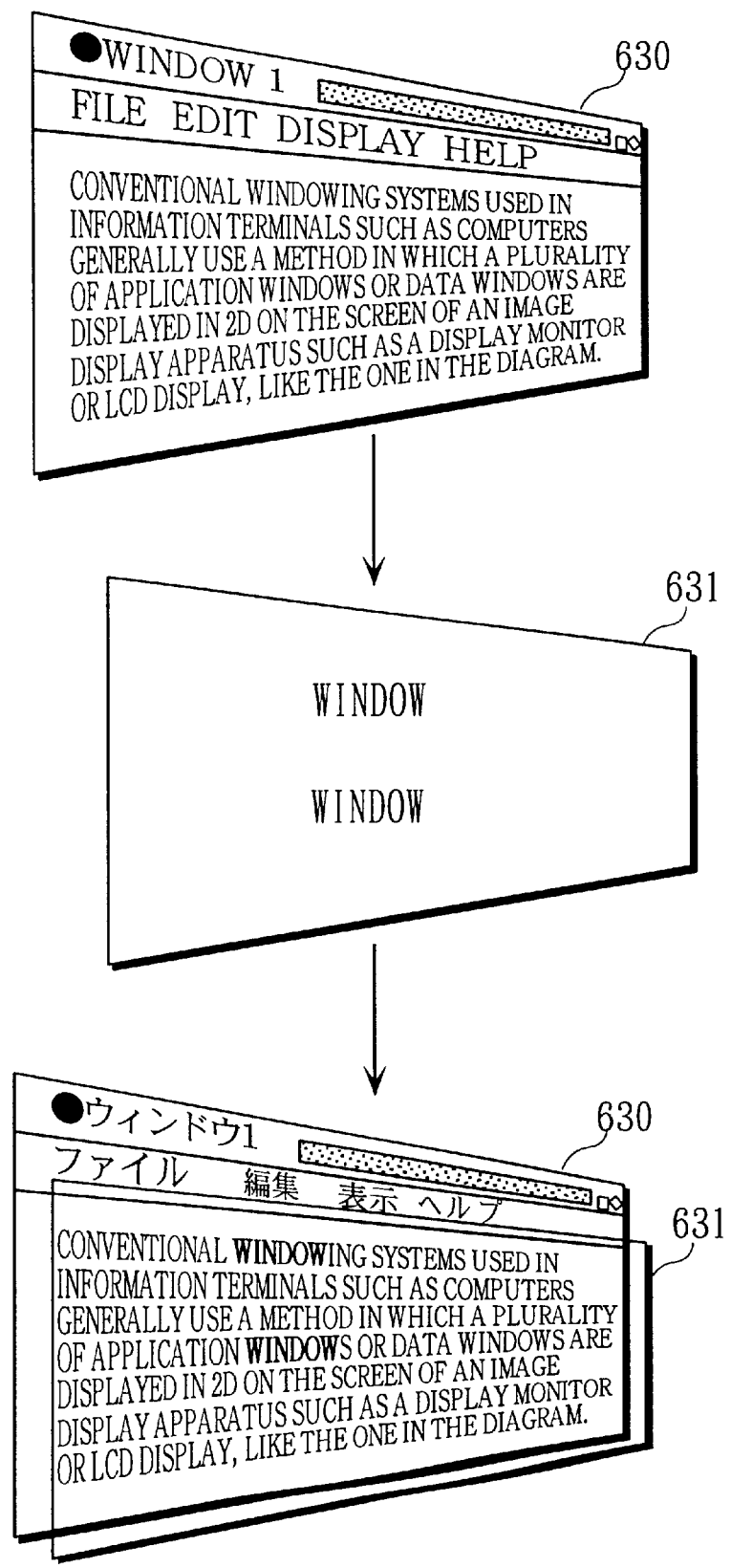
FIG. 25 shows an example of a display screen when a keyword search result is displayed as a window layer.

FIG. 25 shows the above procedure and the final display screen.

If a keyword 'window' is included in the search object, that is the original window 5630, a new window layer 5631 is generated by the window layer generating unit 5603, and displayed so that it appears to stand out from the original window 5630.

An original window and a window showing a keyword search result can be displayed in perspective in this way, enabling the search result to be discerned at a glance. In a conventional 'flat' screen, processing such as representing the search result in a different color was required to achieve this, but the multiple window display device of the present embodiment requires no such special processing.

A device capable of handling a plurality of keywords can easily be achieved by having each keyword displayed on a different semi-transparent layer using a different color.

Eighth Embodiment

The following is an explanation of a multiple window display device in the eighth embodiment.

The multiple window display device of the present embodiment is characterized by the ability to display a plurality of inter-related windows linked and in perspective.

Structure

Figure 26:
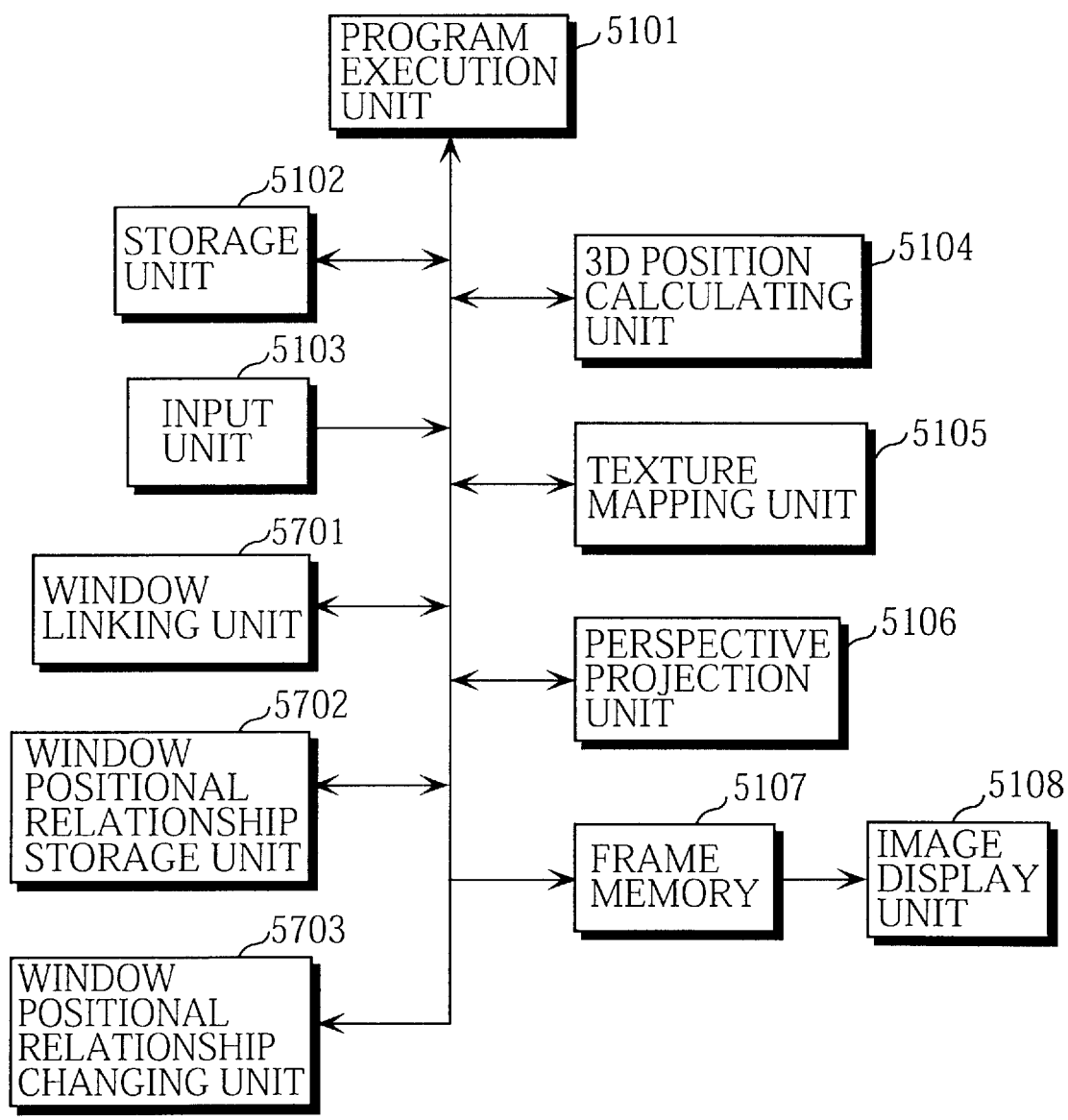
FIG. 26 is a block diagram showing a structure for a multiple window display device in the eighth embodiment.

FIG. 26 is a block diagram showing a structure for the multiple window display device in the eighth embodiment.

The multiple window display device of the present embodiment includes a window linking unit 5701, a relative window position storage unit 5702 and a relative window position changing unit 5703, in addition to the structural elements 5101 to 5108 of the first embodiment. The following is an explanation of the differences from the first embodiment.

The window linking unit 5701 specifies a group of inter-related windows from a plurality of windows currently displayed scattered around the screen. In the present embodiment, inter-related windows are windows generated by the same application program. These windows may, for example, correspond to the situation when a plurality of pages belonging to the same document are displayed simultaneously on a plurality of windows, as in a word-processing program or similar application program.

To achieve this, the window linking unit 5701 specifies windows belonging to the same application program from among a plurality of windows stored in the storage unit 5102. Windows are specified based on a notification from the program execution unit 5101, which is executing an application program. The window linking unit assigns an order to the windows by analyzing the code data for each window, and then-notifies the relative position storage unit 5702 of the order. Windows may be arranged, for example, in ascending order of page number.

The relative position storage unit 5702 generates and stores linking information for calculating the 3D position of each window in a group of windows that have been specified and ordered by the window linking unit 5701. Positions are calculated so that the windows are connected horizontally, and arranged as a concertina. This means that the relative position storage unit 5702 stores the relative coordinates for the position of a first window placed in perspective and the next connected window. The initial position is predetermined, and each window is placed in perspective, using the near edge as a rotation axis and rotating the opposite edge 45°.

The relative position changing unit 5703 deletes only a specified window from the concertina-like sequence of windows on the display screen by folding it up. This means that the relative position changing unit 5703 changes the storage content of the relative position storage unit 5702 so that the windows are connected together bypassing a window specified by the input unit 5103.

Operation

The following is an explanation of the operation of the multiple window display device in the present embodiment, structured as described above.

The operation of the multiple window display device in the present embodiment differs from the first embodiment in that window linking processing is added between the generation of the code data and the image data for the window (FIG. 4, step S5121) and the subsequent calculation of a 3D position (FIG. 4, step S5122). The following is an explanation of this additional processing.

Figure 27:
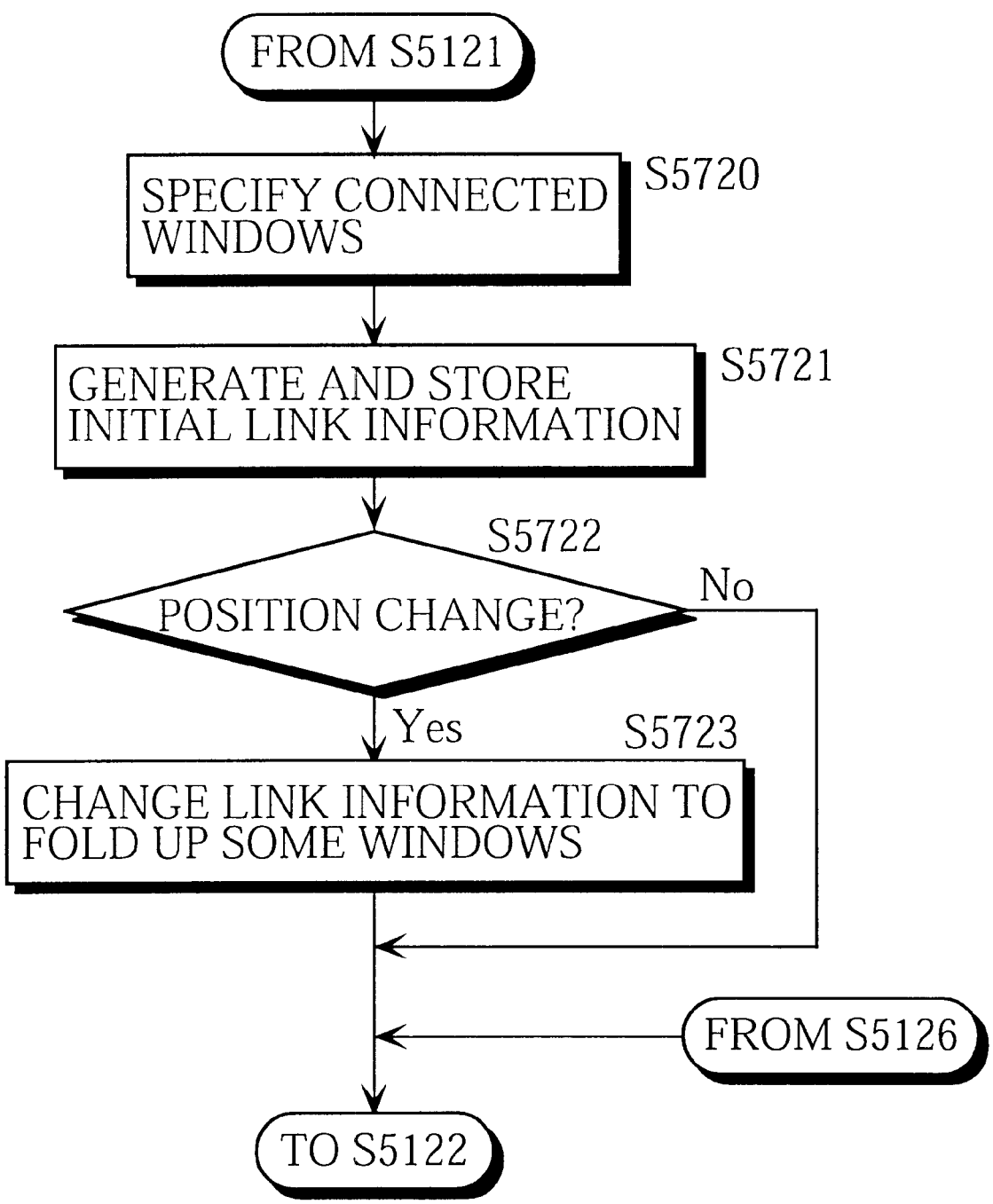
FIG. 27 is a flowchart showing operation procedures for a window linking unit 5701, a window positional relationship storage unit 5702, and a window positional relationship changing unit 5703.

FIG. 27 is a flowchart showing operating procedures for the window connecting unit 5701, the relative position storage unit 5702 and the relative position changing unit 5703.

Assume that the program execution unit 5101 has already stored the display data (code data and image data) for five windows displaying pages 1 to 5 of a document based on the execution of the same application program in the storage unit 5102, and notified the window connecting unit 5701 of this. (FIG. 4, step S5121).

The window connecting unit 5701 specifies the five windows stored in the storage unit 5201 according to the notification, and notifies the relative position storage unit 5702 of the five pages in ascending order of page number by referring to the code data for the windows (step S5720).

The relative position storage unit 5702 generates and stores initial linking information for the windows of which it was informed by the window connecting unit 5701. The information is generated so that the windows will be connected in the notified order arranged as a concertina (step S5721).

Figure 28A:
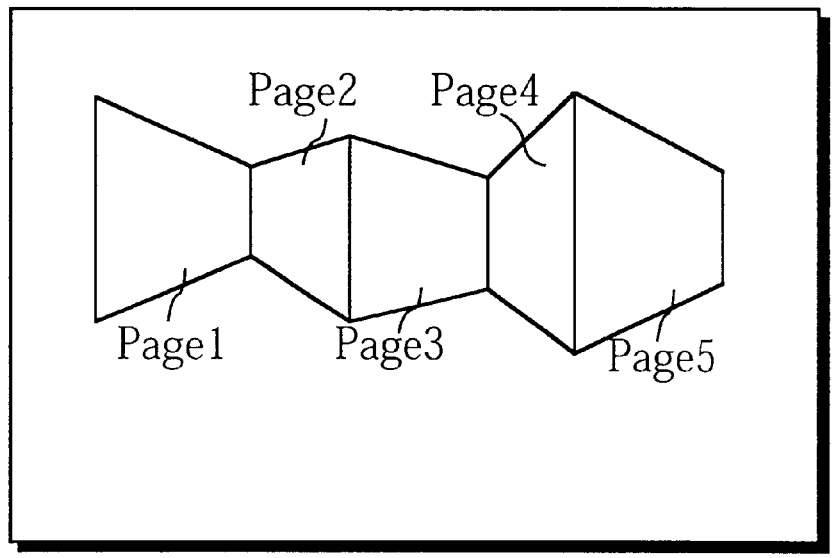
FIG. 28A is an example display screen on which windows page 1 to page 5 are displayed based on initial link information.

FIG. 28A shows a screen display when the initial linking information is unchanged (step S5722) and the position of the windows for the pages 1 to 5 is calculated by the 3D position calculating unit 5104 and windows displayed, according to the link information (steps S5122 to S5125).

The five windows are displayed in perspective, lined up horizontally, with neighboring windows sharing a common edge. Windows incline alternately to the left and right in the depth direction.

If the relative position changing unit 5703 receives a notification from the input unit 5103 instructing it to fold up a specific window (step S5722), the relative position changing unit 5703 changes the storage content (link information) in the relative position storage unit 5702 so that the windows are connected bypassing the specified window (step S5723).

Figure 28B:
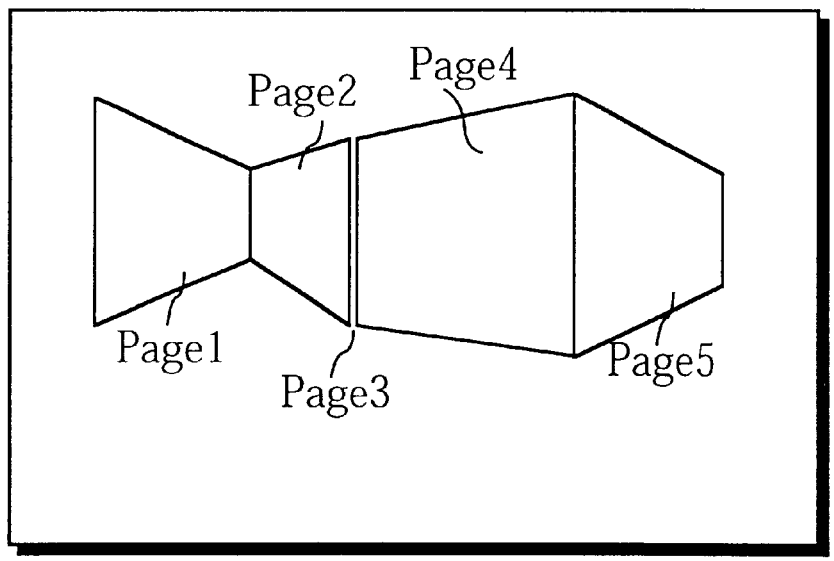
FIG. 28B shows an example display screen when link information is changed so that the window of page 3 is folded up.

FIG. 28B shows an example of a display screen when the link information is changed so that the window for page 3 is folded up (steps S5722, S5723), and positions for the windows of the following pages 4 and 5 are calculated by the 3D position calculating unit 5104 and displayed, according to the link information (FIG. 4, step S5122 to S5125).

The position of pages 4 and 5 is changed so that they are connected to page 2. The relative position of page 4 to page 3 is saved.

The multiple window display device of the present embodiment displays inter-related page windows in perspective, with the edge of one window connected to the edge of the next window, enabling the user to grasp the relationship between windows at a glance by noting the way in which they are connected.

Application programs such as word-processing programs often handle documents composed on a plurality of pages. In this case, it is difficult to display a plurality of pages simultaneously in a conventional windowing system in which windows face the front. Windows have to be displayed overlapping other windows, or only a few pages can be displayed. In the multiple window display device of the present invention, a large number of pages can be and displayed in sequence in a limited display area without overlapping.

Additionally, the user is able to select which windows are to be displayed, and windows that need not be displayed are stored folded up behind other windows. This enables inter-relations between windows, such as in a sequence of pages, to be preserved, while only a plurality of significant windows are displayed at any one time.

Furthermore, as the bit-map pasting performed by the texture mapping unit 5105 is not performed on the windows which have been folded up behind other windows, one part of the texture-mapping processing can be omitted.

In the present embodiment, inter-related windows were described as windows generated by the same application program. Frequently, however, pages that are from different documents but belong to the same project have a strong inter-relationship. Thus, specifying inter-related windows in advance enables even windows generated by different application programs to be displayed connected to each other.

A means for performing editing techniques such as copying or moving an object between windows displayed connected in sequence may also be provided.

Figure 29A:
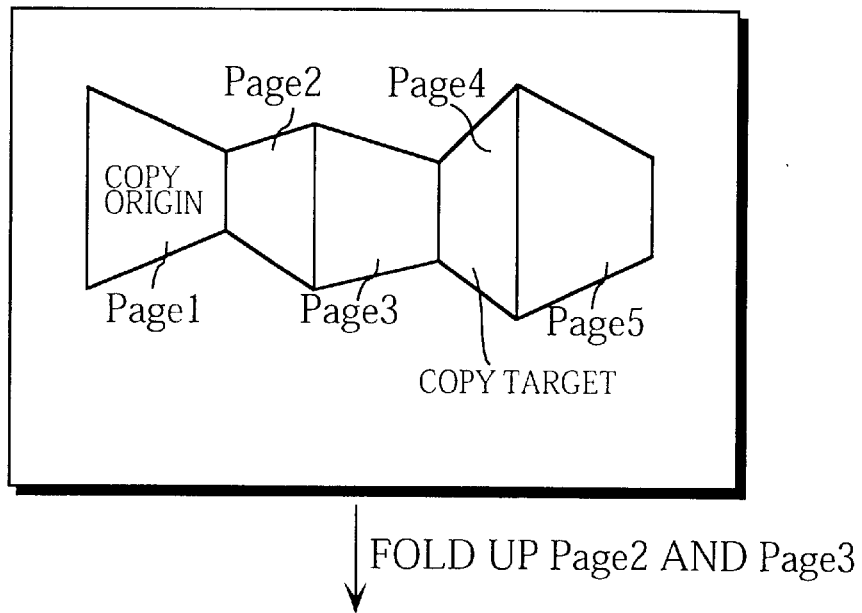
FIGS. 29A and 29B show examples of a display screen when a means for performing an operation extending over more than one page of the linked page windows on an object is provided.
Figure 29B:
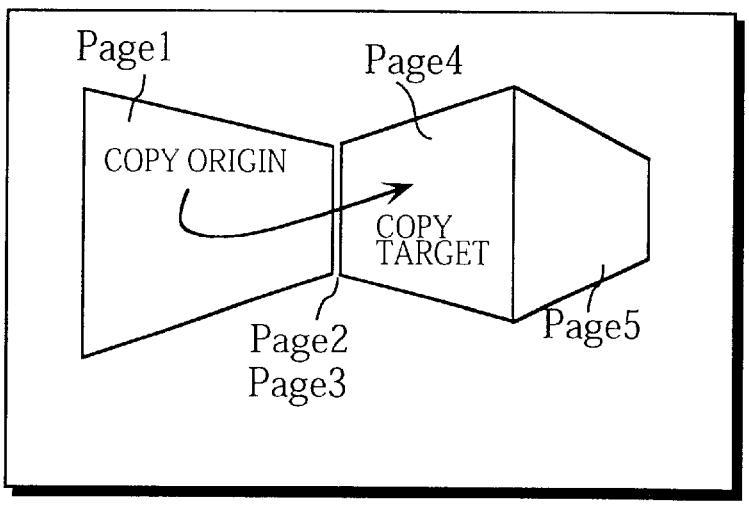

FIGS. 29A and 29B show examples of screen displays when a means for performing operations spanning connected page windows on an object is provided.

FIG. 29A shows a screen display when the windows of pages 1 to 5 are displayed based on initial link information. This drawing is identical to FIG. 28A.

FIG. 29B shows a situation in which page 2 and 3 are folded up so that page 1 and page 4 are displayed as facing pages, and an object is copied from page 1 to page 4. This is realized by overwriting display data (code data and image data) for page 1, stored in the storage unit 5102, on page 5, so that an object indicated on the original window by the input unit 5103 is copied onto the target window.

Ninth Embodiment

The following is an explanation of a multiple window display device in the ninth embodiment.

The multiple window display device of the present embodiment relates to special character display processing used when windows are displayed in perspective, and is characterized by not needing to perform a perspective projection transform (3D processing) directly on characters. Instead, a perspective projection transform is performed on window frames and the obtained 2D data is used to display characters.

Structure

Figure 30:
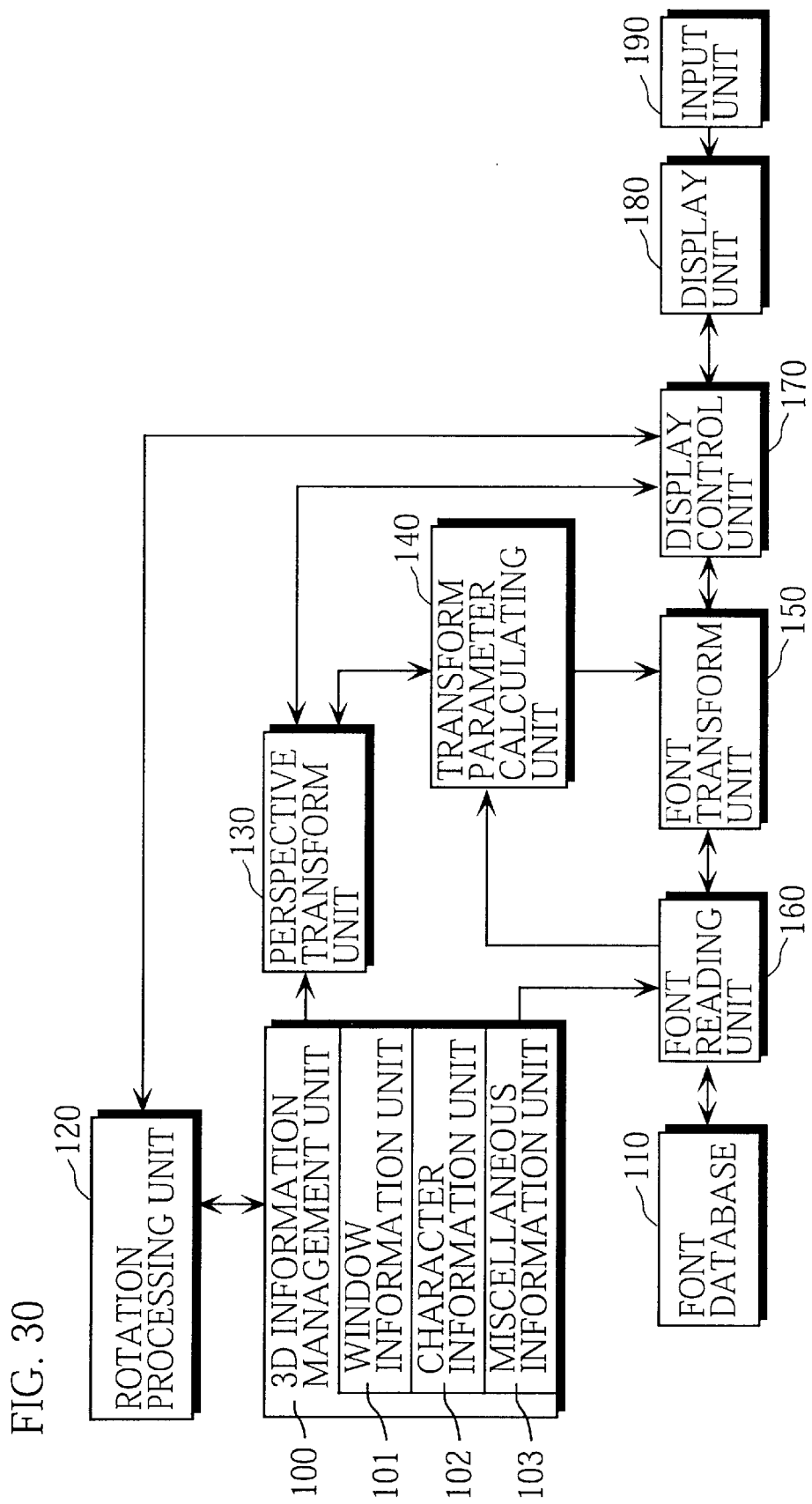
FIG. 30 is a block diagram showing a ninth embodiment for the window display device of the present invention.

FIG. 30 is a block diagram of the multiple window display device in the ninth embodiment. This multiple window display device includes a 3D information management unit 100, a font database 110, a rotation processing unit 120, a perspective transform unit 130, a transform parameter calculating unit 140, a font transform unit 150, a font reading unit 160, a display control unit 170, a display unit 180 and an input unit 190.

Figure 31:
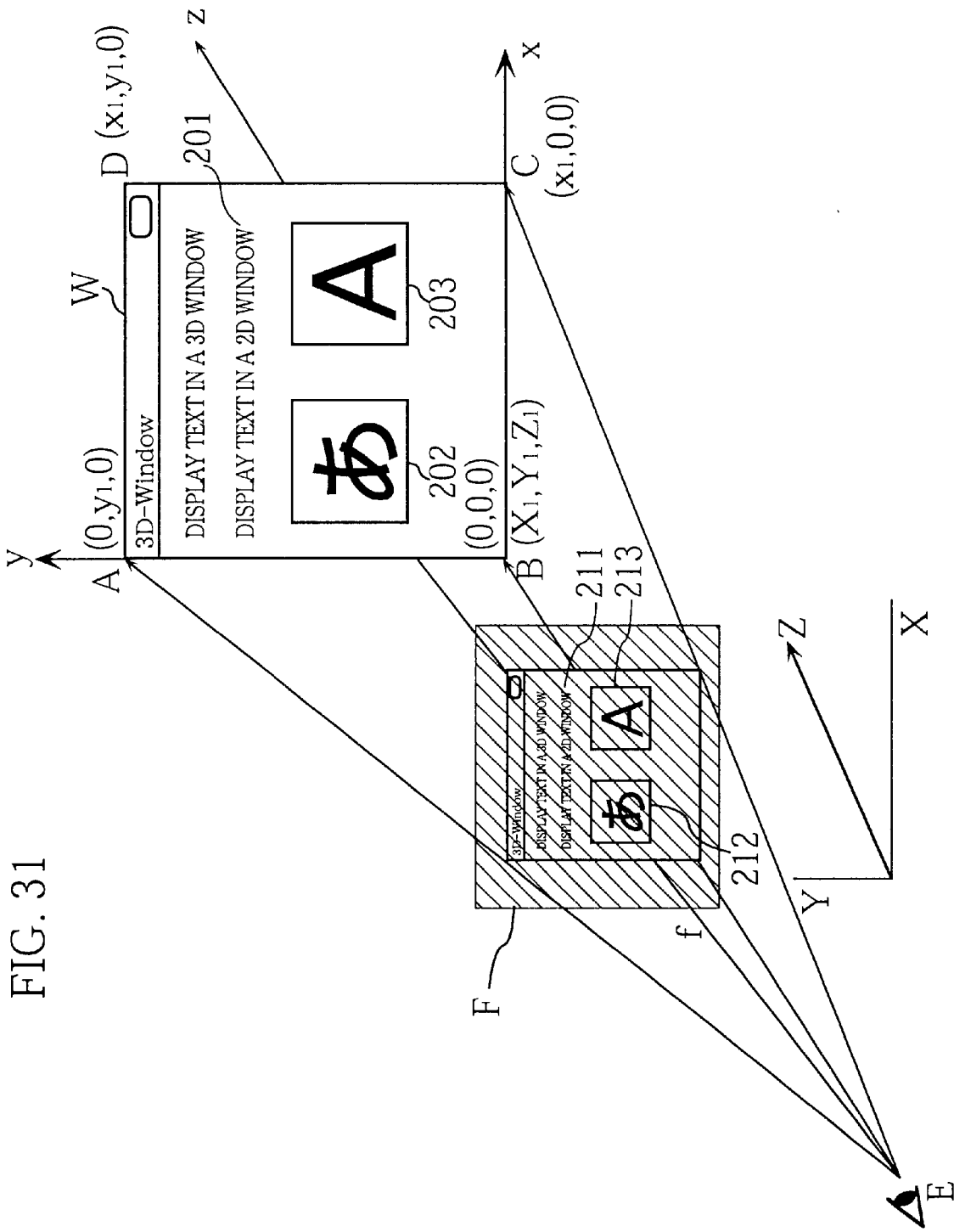
FIG. 31 shows an example of an object placed in virtual space in the ninth embodiment.

FIG. 31 shows a situation in which a window W is placed in a virtual space constructed within the multiple window display device. In this drawing, point E is the viewpoint and screen F is a display screen for a perspective transform view seen from the viewpoint E. The window W is arranged in the virtual space so that it appears to be to the rear of the screen F when viewed from the viewpoint E. The positions of areas within the virtual screen can be expressed by an XYZ coordinate system in which a screen parallel to the display screen F is an XY screen. For convenience, the bottom left vertex f of the display screen F is taken as the coordinate origin (0,0,0). However, positions in the window W are expressed by a fixed coordinate system (hereafter referred to as the window coordinate system) in which the bottom left vertex B of the window W is the coordinate origin. The axes in the window coordinate system are x, y, z (lower case). A character string 201 and a character 202 are displayed in the window W.

The 3D information management unit 100 stores information relating to the window W in the virtual space and the character string 201 and enlarged character 202 displayed in the window. The 3D information management unit 100 thus has a window information unit 101, a character information unit 102 and a miscellaneous information unit 103.

The window information unit 101 stores window information, including coordinates showing the position of the window W in the virtual space, and window rotation angle information showing the number of degrees the window W is rotated around each of the x, y and z axes. This information is stored for each window in the virtual space.

FIG. 32 shows example window information 300 stored in the window information unit 101.

A window identifier showing which window in the virtual space the information refers to is stored in a window identifier column 301. Only one window is shown in the example in FIG. 31, but if a plurality of windows are arranged in the virtual space, windows can be distinguished using this identifier.

Coordinate values for the window coordinate origin (the left vertex of the window, point B in the example in FIG. 31) in the virtual space are stored in a spatial coordinates column 302.

Coordinate values for the four vertices of the window in the window coordinate system are stored in a window coordinate column 303. Here, coordinates in the window coordinate system for the vertices of the window W shown in FIG. 31, that is A, B, C, and D, are stored.

Rotation angles showing the number of degrees the window has rotated about each of the x, y and z axes are stored in a rotation angle column 304. Here, the window W in FIG. 31 is arranged on a plane that includes the x and y axes of the window coordinate system, so the angles are all 0°.

The character information unit 102 controls character information, that is information relating to characters displayed in windows. Information combining a character code representing the character, font size, font type and character coordinates showing the position of a character in the virtual space are stored for each character. The actual character image itself is not stored, however. The character coordinates represent one point, an upper left corner of a font character in the window.

FIG. 33 shows example character information 400 stored in the character information unit 102. The content displayed here relates to the character string 201 and the character 202 in the window W of FIG. 31. The character in the window W to which each group of data corresponds to is also shown.

A two-byte, hexadecimal display code indicating each displayed character is stored in a character code display column 401. In the example of FIG. 33, a code indicating the character '3' at the beginning of the first line of the character string 201 in FIG. 31 is stored in the first row.

Values showing the font size for each character in point units are stored in a font size column 402.

Codes showing font types are stored in a font type column 403. Here, a code 'M' indicating Mincho typeface is stored.

Window coordinate system coordinates for a vertex of the upper left corner of each font character are stored in a character coordinate column 404. The content shown in FIG. 33 relates to characters in the window W arranged on a plane that includes the x and y axes (FIG. 31), so the z coordinate value for each character is 0. Also, as can be seen from FIG. 33, the y coordinate value for characters on the same line in window W is identical.

Only part of the information for constructing a window is stored in the window information unit 101 and the character information unit 102. The other information, including image data for objects displayed in the window and the like, is stored in the miscellaneous information unit 103.

Font data is stored in the font database 110, along with unique character codes indicating each font character. These character codes are the same as part of the character information stored in the character information unit 102.

The display unit 180 is a computer display apparatus and displays windows containing text.

The input unit 190 is an input device such as a keyboard or a mouse. A user uses this device to give an input for window rotation. The input unit 190 informs the display control unit 170 of the input.

The rotation processing unit 120, receives the content of a window rotation input (rotation object window, rotation axis, rotation angle) made by the user using the input 190. The content is received via the display control unit 170. The rotation processing unit 120, rotates a window within the virtual space according to the input, and then updates the window information and character coordinates according to the rotation result.

Figure 34:
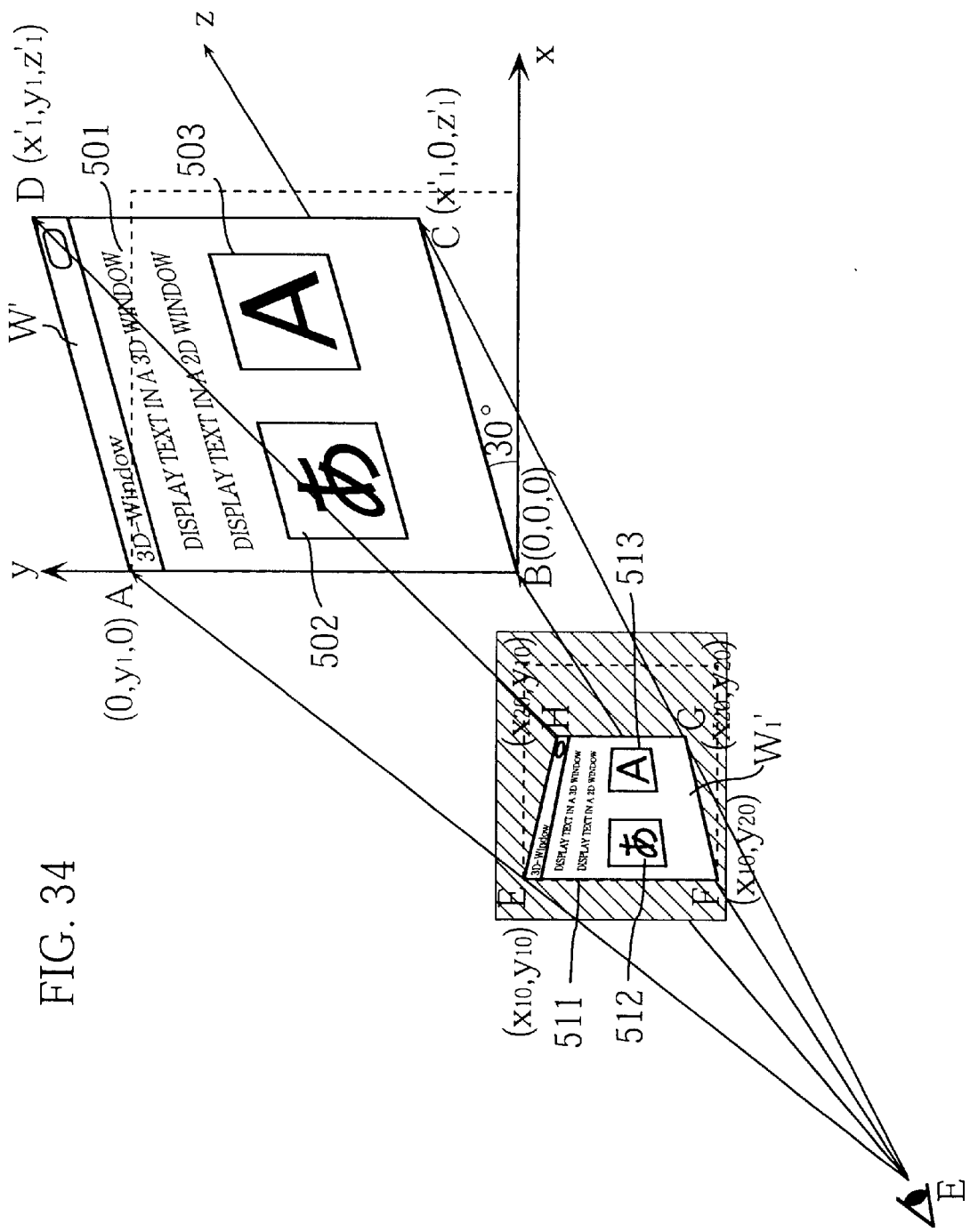
FIG. 34 shows an example of window rotation and perspective transform in the ninth embodiment.

FIG. 34 shows the result of this rotation processing, a window W'. The processed object is the window W in FIG. 31, and a rotation of 30 degrees is performed around the left edge (y-axis) of the window W.

The rotation processing unit 120, reads the window information shown in FIG. 32 and the character information (coordinates) shown in FIG. 33 from the 3D information management unit 100 and performs the following processing.

First, processing is performed on the window information by changing the coordinates for the vertices of the window W to the coordinates following rotation. Here, rotation takes place around the y-axis, so the coordinates for the C and D vertices are moved by changing the values of the x and z coordinates for the two vertices. If the coordinate values for the C and D vertices following rotation are expressed so that the x coordinate is x1' and the z coordinate z1', these coordinate values can be found using the following formula:

$$x1' = x1 \cos 30°$$

$$z1' = x1 \sin 30°$$

where value x1 is the x coordinate value for the C and D points before rotation is performed.

FIG. 35 shows the content of window information for the window W after rotation processing has been performed. Comparison with the content of FIG. 32 reveals the change in content caused by the rotation processing. The parts of the information that have changed are shaded in the drawing.

Next, processing is performed on the character information, changing position coordinates for each character in the window W. The x and z coordinate values are changed in the same way as the window coordinate values, but the size of the change differs according to the distance of a character from the y-axis, in other words the x coordinate value before the change. The values of both the x and z coordinates after the change can be found using the same formula as was used to find the coordinate values for the window vertices after the change.

$$xn' = xn \cos 30°$$
$$zn' = xn \sin 30°$$

Here, xn is the x coordinate value for a character position prior to rotation, xn' is the x coordinate value for a character position following rotation, and zn' is the z coordinate value following rotation.

FIG. 36 shows the content of character information for a window following rotation processing. Comparison with the content of FIG. 33 allows the change caused by the rotation processing to be understood. The parts of the character information that have changed are shaded in the drawing.

When the rotation processing unit 120, has completed its processing, the perspective transform unit 130 performs a perspective transform on the window in the virtual space and the character position information for characters in the window, taking the display of the display unit 180 as the display screen. This perspective transform is performed based on information read from the 3D information management unit 100. This information is obtained after rotation processing and includes information on various coordinates and window angle information. From hereon, a window in the virtual space that has not yet been perspective-transformed is generally referred to as a '3D window', and a perspective-transformed window for display use as a '2D window'. When there is no need to distinguish between the two types of windows, however, both are referred to simply as 'windows'. The perspective transform method used is well-known in the art, and so is only explained in brief here.

The perspective transform is performed by projecting a window onto the display screen, while keeping the viewing angle constant, to obtain a 2D window. The distance between each vertex of the 2D window is influenced by the z coordinate value for each vertex of the corresponding 3D window that is the origin for the transform. If the gap between the z coordinate values for the two points is large, the distance between the two points on the display screen will be short, and the 2D window will be in the shape of a trapezoid.

In FIG. 34, a window Wi', which is produced by performing the perspective transform on the window W' (window W following the rotation processing) is also displayed.

On completing its processing, and obtaining the processing result,. the perspective transform unit 130 sends information for the 2D window, such as that shown in FIGS. 37A and 37B, to the display control unit 170.

FIG. 37A shows example window information for the 2D window resulting from the perspective transform, in other words the data for the window Wi' obtained by performing the perspective transform on the window w'. Comparison with the data prior to perspective transform shown in FIG. 35 allows changes in the content to be understood.

The 2D window information 800 is formed from a window identifier column 301 and a window display coordinates column 801.

The window identifier column 301 has already been explained in the description for FIG. 32.

Coordinates for the vertices of the 2D window on the perspective screen formed following the perspective transform are stored in the window display coordinates column 801. These coordinates are coordinates belonging to a 2D coordinate system for perspective screen use.

FIG. 37B shows examples of information relating to characters in a 2D window. This is the character information (in FIG. 34, a character string 511 and characters 512 and 513) produced as a result of a perspective transform performed on the character information shown in FIG. 36 (in FIG. 34, a character string 501 and characters 502 and 503). In the character information, only position coordinates are the object of the perspective transform. When the perspective transform unit 130 sends character information to the display control unit 170 following the perspective transform, it also sends the 3-dimensional coordinates prior to perspective transform (values in the window coordinate system) for each character, in order to make things more convenient for subsequent processing. Comparison with the data prior to perspective transform shown in FIG. 36 allows the changes in the content to be understood. FIG. 37B also shows the corresponding character in the window for each set of data.

Display character information 810 is formed from a display position column 811 and a 3D coordinate column 812.

2D coordinates showing the display positions for characters on the display screen are shown in the display position column 811. These coordinates belong to the 2D coordinate system and are for perspective screen use.

3D coordinates showing character positions prior to perspective transform (window coordinate system) are stored in the 3D coordinate column 812.

The perspective transform unit 130 informs the transform parameter calculating unit 140 of the coordinate information for a 2D window, and requests the calculation of transform parameters.

Upon receiving an input from the perspective transform unit 130, the transform parameter calculating unit 140 calculates transform parameters for a font character from the coordinate information received together with the input, and notifies the font transform unit 150 of these. The transform parameters are expressions showing the content of the transform performed when the font transform unit 150 transforms the font character, creating a character image to be displayed in the 2D window.

The following is an explanation of the procedure used by the transform parameter calculating unit 140 to calculate the transform parameters.

Figure 38:
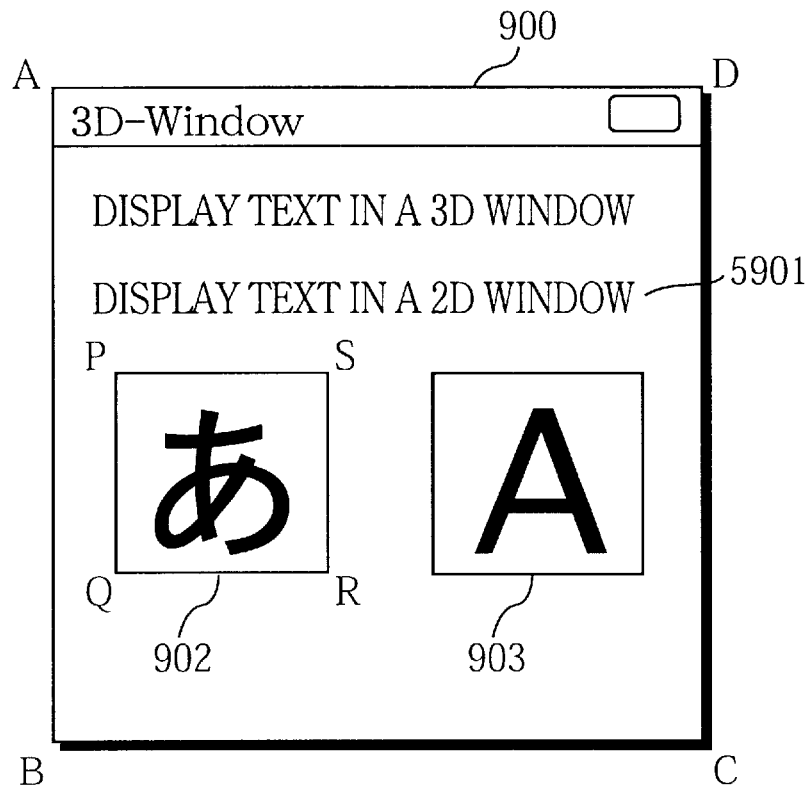
FIG. 38 shows an example of a perspective transform for a window prior to rotation processing in the ninth embodiment.

FIG. 38 shows a 2D window 900 produced when a perspective transform is performed on the window W in FIG. 31.

Figure 39:
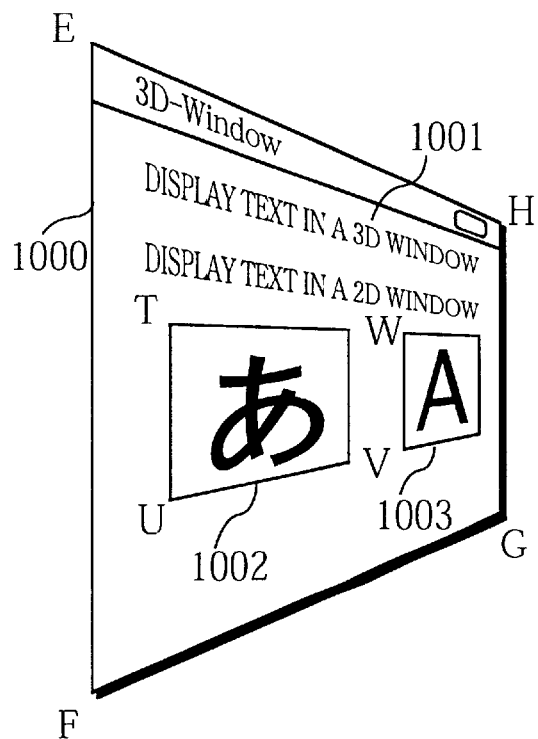
FIG. 39 shows an example of a perspective transform for a window after rotation processing in the ninth embodiment.

FIG. 39 shows a 2D window 1000 produced when a perspective transform is performed on the same window W as in FIG. 38 after it has been rotated around the y-axis in a 3D space.

A character string 901 is displayed in the window 900 and a character string 1002 in the window 1000. Enlarged character views 902 and 903 in FIG. 38 and 1002 and 1003 in FIG. 39 are enlargements of single characters in the character string used to demonstrate the character transform.

In the drawings, A to D and E to H are coordinates for the windows, and P to S and T to W are coordinates for the four corners of the character images 902 and 1002.

The transform parameter calculating unit 140 stores 2D coordinates for a window on which no rotation processing has been implemented, that is the coordinates for A to D of window 900, as reference values. Coordinates produced after window rotation and a perspective transform have been performed on the window, like those in FIG. 37, are output from the perspective transform unit 130. Suppose that the square ABCD representing the window 900 has been transformed two-dimensionally into the square EFGH representing the window 600. In this case, the character outline shown by the square PQRS can be transformed into the character outline shown by the square TUVW using a similarity transform. The expressions used for this similarity transform are output to the font transform unit 150 as the transform parameters.

The processing performed by the font transform unit 150 takes place in the following order. First, the size of the font for each character is determined by finding the font scale. Then a font character of the determined size is transformed according to the transform parameters. The font transform unit 150 stores a transform formula equivalent to a 'Z coordinate value/font scale characteristic curve' shown in FIG. 40 in order to find the font scale. The Z coordinate values substituted into the transform formula are coordinate values belonging to a virtual space XYZ reference coordinate system. When a Z coordinate value is 0, this means that the coordinate is positioned in the perspective transform projection plane (an xy plane in which a z coordinate value is 0). When the Z coordinate increases, this means that the coordinate has moved further away from the projection plane. In other words, the font scale of characters with position coordinates near the projection plane is close to 1 and the font scale of characters with position coordinates far from the projection plane is close to 0.

In order to find the font scale, the font transform unit 150 obtains information for each character from the character information unit 102 via the font read unit 160. This information describes the z coordinate value of the character coordinates, and font size, and is taken from the information shown in FIG. 36. The z coordinate value (from the window coordinate system) is converted into a Z coordinate value belonging to the virtual space coordinate system, and the obtained value is substituted into the transform formula to find the font scale. The font size is then multiplied by the font scale to find the font size to be used for display on the display screen.

FIG. 41 shows font sizes found as described above, which are used to display each character in the window Wi'. In the drawing, columns showing the character in the window to which the data corresponds and current font size have been included for each piece of data for ease of reference.

The font transform unit 150 reads corresponding font characters for each character code from the font database 110 via the font reading unit 160, and uses the above display font size information to determine coordinate values for each font character. The font coordinates for the top left corner (P in the example in FIG. 38) are (0,0), and the coordinates for the remaining three corners are determined by the display size value. For example, if the font size is a and scale is b, the display size is a×b and the coordinates for each corner are Q (0, −a×b), R (a×b, −a×b), S (a×b, 0).

The font transform unit 150 substitutes the font coordinate values found in this way into the transform parameter formula sent from the transform parameter calculating unit 140, and produces a character image for display.

Next, the font transform unit 150 sends the character image produced by transforming the font to the display control unit 170, together with 3D position coordinates for the image.

The display control unit 170 combines the character image produced by the font transform unit 150 with a 2D window, which has been transformed by the perspective transform unit 140. When doing so, the display control unit 170 determines the position of each character image in the 2D window by referring to 2D character coordinates for both before and after transformation, sent from the perspective transform unit 140, and to character position coordinates received from the font transform unit 150 together with the character images. Suppose that the character image 'A' is sent from the font transform unit 150 together with the position coordinates (x1, y1, z1). In this case, the display control unit 170 finds the data whose coordinates prior to conversion are (x1, y1, z1) from among the character coordinates received from the perspective transform unit 140, and places the character image 'A' at the position (x1', y1') denoted by the corresponding post-transformation coordinates.

The result of arranging each character image in a specified position in this way is shown in FIG. 39.

Operation

Figure 42:
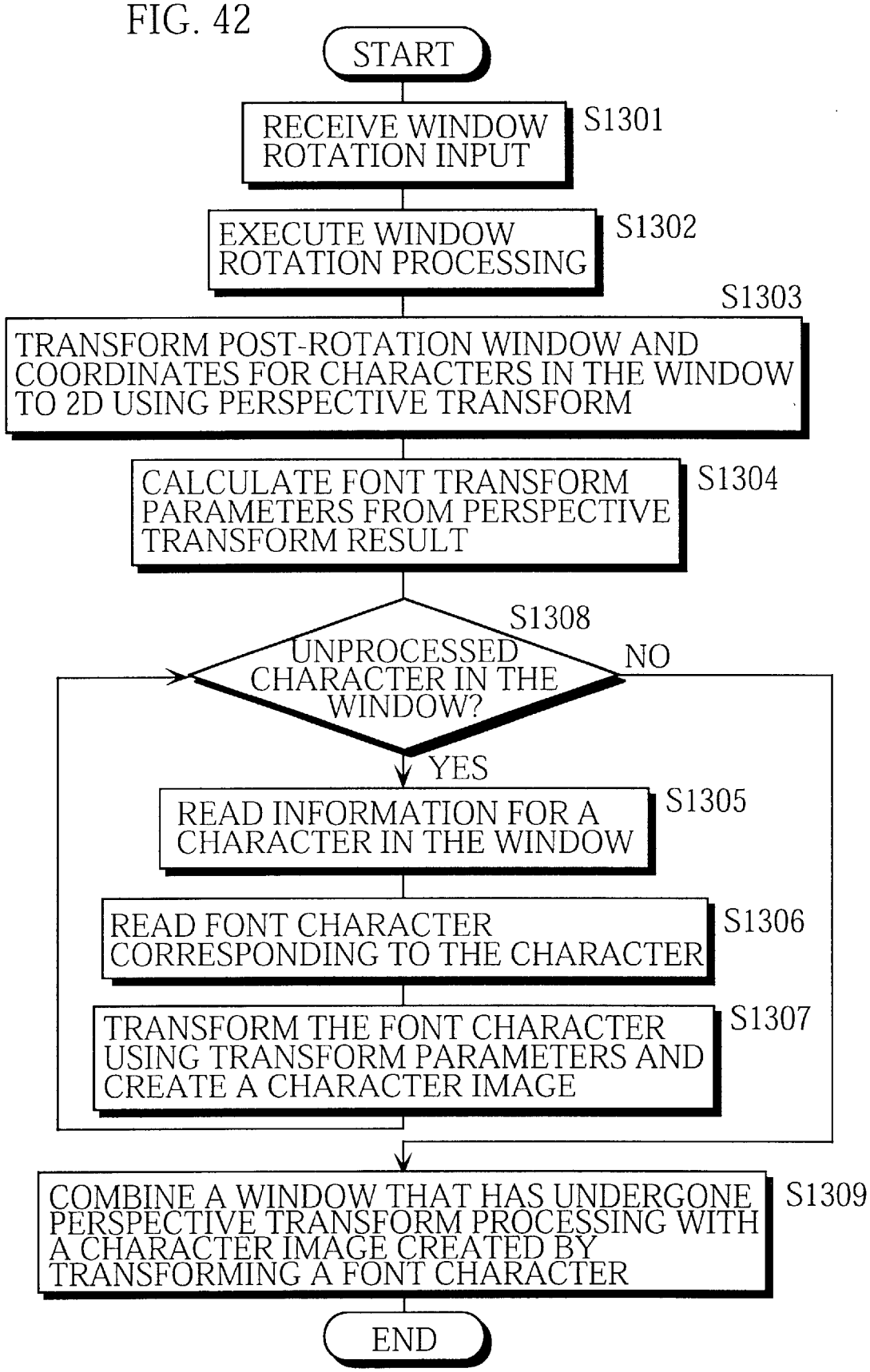
FIG. 42 is a flowchart showing window display processing in the ninth embodiment.

FIG. 42 is a flowchart showing the operation of rotation processing for a window including character font, in the ninth embodiment of the window display device in the present invention. The following is an explanation of the processing with reference to the flowchart.

First, a user uses the input unit 190 to indicate that window rotation is to be performed in a screen displayed on the display unit 180. Upon receiving this input, the display control unit 170 sends information on a rotation axis and angle of rotation obtained by analyzing the content of the input to the rotation processing unit 120, instructing it to rotate a 3D window in virtual space based on this information (step S1301).

Upon receiving this input, the rotation processing unit 120, implements rotation processing on the 3D window. The information stored in the 3D information management unit 100 prior to rotation is updated accordingly (step S1302.)

After the rotation processing unit 120, finishes the above processing, it informs the display control unit 170 that processing has been completed. Upon receiving this information, the display control unit 170 instructs the perspective transform unit 130 to perform perspective transform processing. The perspective transform unit 130 performs perspective transform processing, producing the information for a 2D window to be displayed on the display unit 180 (step S1303).

Upon finishing the above perspective transform processing, the perspective transform unit 130 sends coordinates for the transformed 2D window to the transform parameter calculating unit 140, and instructs the transform parameter calculating unit 140 to find the transform parameters. The transform parameters are to be used when the font transform unit 150 produces character images for display by performing a similarity transform on the character fonts. The perspective transform unit 130 also sends the 2D window information and character coordinate information (after transformation) resulting from the perspective transform to the display control unit 170.

Upon receiving the input from the perspective transform unit 130, the transform parameter calculating unit 140 calculates transform parameters from the coordinates for the 2D window after the perspective transform received together with the input, and outputs the calculated transform parameters to the font transform unit 150 (step S1304).

Upon receiving the transform parameters from the transform parameter calculating unit 140, the font transform unit

150 instructs the font reading unit 160 to read a font character corresponding to one of the characters in the window. Upon receiving the input, the font reading unit 160 reads information for a character code, a font size, a font type and character position coordinates from the character information unit 102 (step S1305). Following this, the font reading unit reads a font character that agrees with both the character code and the font type from the font database 110. Then, this font character, character font size and character coordinates are sent to the font transform unit 150 (step S1306).

The font transform unit 150 produces a character image for display by transforming the font based on the information sent from the font reading unit 160, the transform parameters and the font scale. The character image thus produced is sent to the display control unit 170 along with 3D character coordinate information read from the character information unit 102 (step S1307).

The font transform unit 150 repeats the above processing until there are no unprocessed characters left in the character information unit 102. Once all characters have been processed, the font transform unit 150 sends the display control unit 170 a notice to this effect (step S1308).

Upon receiving the notice from the font transform unit 150, the display control unit 170 combines the 2D window received from the perspective transform unit 130 and the character images received from the font transform unit 150, and displays the resulting image on the display unit 180 (step S1309).

In the window display device in the present embodiment, as explained above, character images in a 3D window, produced by expanding 3D data in a conventional virtual space and then performing rotation and perspective transform processing on the expanded data, are separated from other window information and transformed into pseudo-3D shapes. Then the transformed data is combined with a 2D window, which has been subject to a perspective transform. This enables processing for transforming a 3D window including character images to a 2D window and displaying the result to be performed faster than in the prior art. In addition, the character images need not be expanded in the virtual space as a set of 3D data, so that the amount of data for the 3D window is reduced and memory can be saved.

Figure 40:
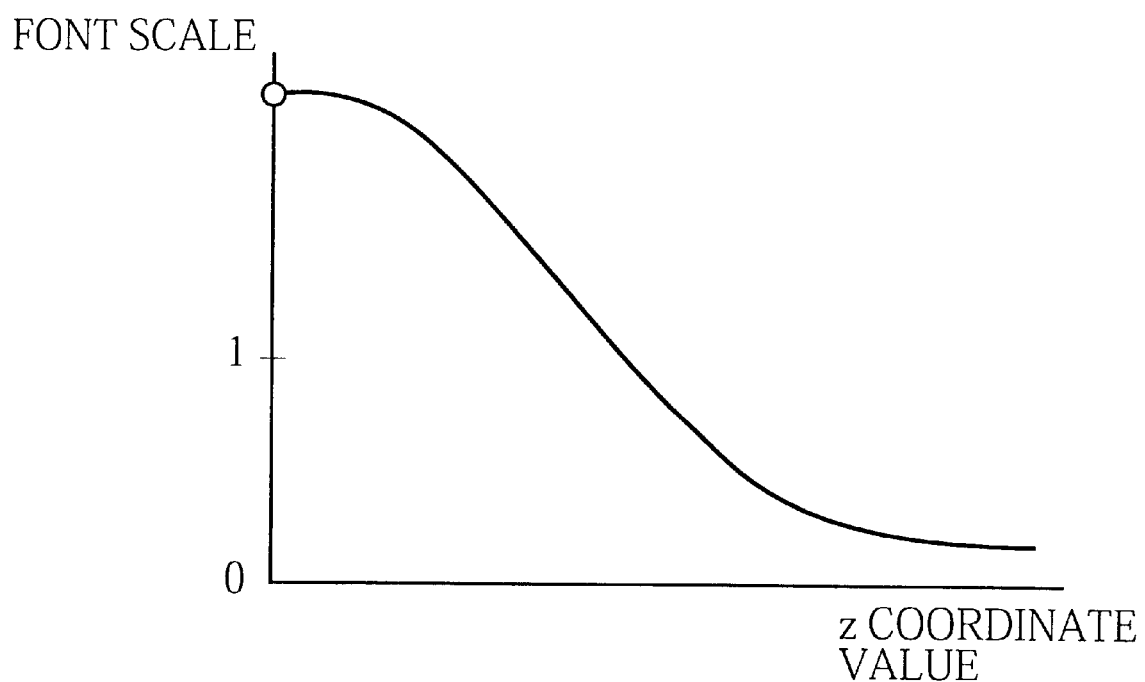
FIG. 40 shows the relation between Z coordinate values and font scale in the ninth embodiment.

Here, the transform parameters were described as being calculated when window rotation processing was performed, but they may also be obtained by performing calculation in advance using the rotation angle for the window, and storing the result in a table like the one in FIG. 40, which may be referred to when the window is rotated.

The present invention may also be realized using a standard personal computer.

Here, transform parameters were calculated using a similarity transform, but a window may also be transformed using a proportional calculation based on the length of the edges, provided that such a system only rotates the window around either the y-axis or the x-axis.

Tenth Embodiment

The following is an explanation of a window display device in the tenth embodiment of the present invention.

The window display device in the present embodiment is related to character display processing performed when a window is displayed in perspective, characterized by display processing performed so that each character always appears to be facing the front.

Structure

Figure 43:
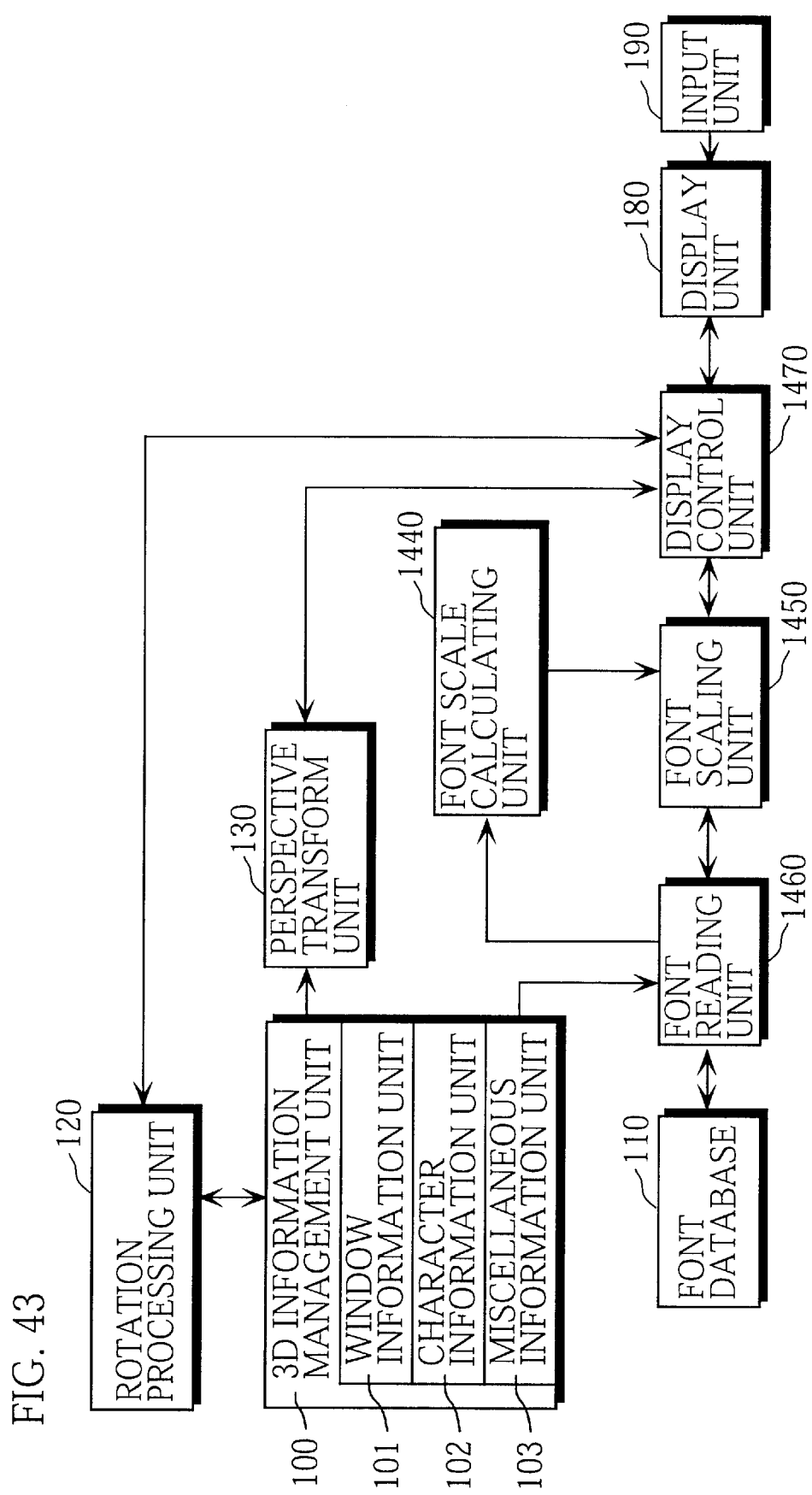
FIG. 43 is a block diagram of a window display device in the tenth embodiment of the present invention.

FIG. 43 is a block diagram showing a structure for a window display device in the tenth embodiment of the invention. This embodiment has many similarities with the ninth embodiment, so only differing parts will be explained here. The basic differences are that the font transform unit 150 is replaced by a font scaling unit 1450, and the transform parameter calculating unit 140 is replaced by a font scale calculating unit 1440.

Once rotation processing has been completed, a display control unit 1470 directs the perspective transform unit 130 to perform a perspective transform, and the font scaling unit 1450 to produce a character image, so that the two processes are performed in parallel.

The font scaling unit 1450 sends a z coordinate value from the character coordinates read from the character information unit 102 by a font reading unit 1460 to the font scale calculating unit 1440, and has the font scale calculating unit 1440 calculate a font scale from this value. The font scaling unit 1450 then performs scale processing on the font based on the font scale, producing a character image to be displayed in a 2D window. This means that the processing performed by the font transform unit 1450 is identical to that performed by the font transform unit 150 in the ninth embodiment, except for the font shape changing process.

Figure 44:
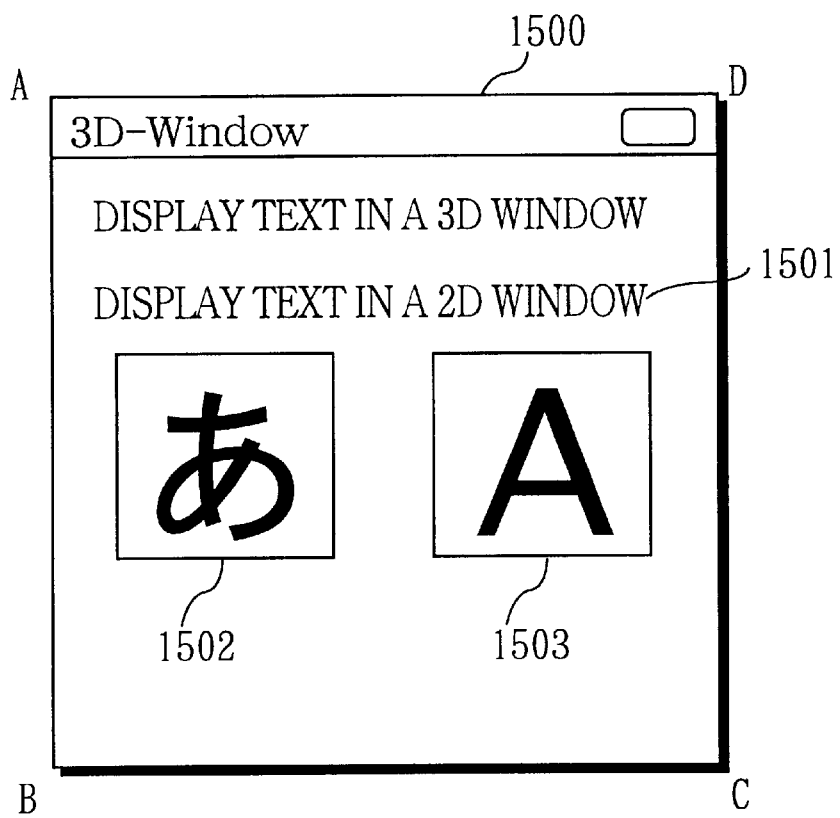
FIG. 44 shows an example of a perspective transform view of a window prior to rotation processing in the tenth embodiment.
Figure 45:
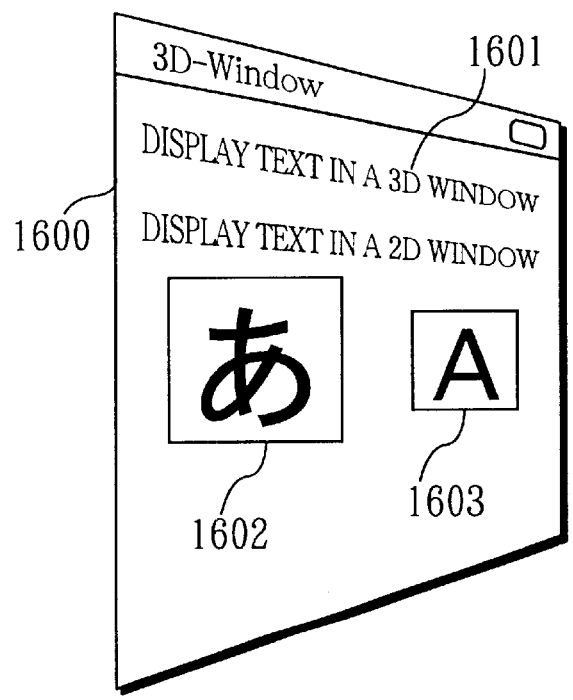
FIG. 45 shows an example of a perspective transform view of a window after rotation processing in the tenth embodiment.

Examples of character images produced by the font scaling unit 1450 are shown in FIGS. 44 and 45. FIG. 44 shows a 2D window 1500 produced by performing a perspective transform on a 3D window on which no rotation processing has been implemented. FIG. 45 shows a 2D window 1600 produced when a perspective transform is performed on the same window as in FIG. 44 after it has been rotated around the y-axis (edge AB) in a virtual space.

Character strings 1501 and 1601 are displayed in the windows. Enlarged character views 1502 and 1503 in FIG. 44 and 1602 and 1603 in FIG. 45 each show one of the characters in the character string after it has been enlarged, so as to clearly demonstrate the character transformation.

The enlarged character views 1602 and 1603 are simply reduced versions of enlarged character views 1502 and 1503, which have undergone no change in shape. As a result, if these characters are viewed in isolation no impression of depth is received. However, the size of the characters in the window becomes smaller the further they are from the rotation axis, so that a impression of depth can be received by looking at a character string as a whole.

The font scale calculating unit 1440 calculates font scale according to an input received from the font scaling unit 1450. This calculation is based on a–z coordinate value from character coordinates for a transform object character received together with the input. This processing is identical to the processing performed by the font transform unit 150 in the ninth embodiment, except that the processing for calculating shape-changing parameters is omitted. The font scale unit 1440 informs the font scaling unit 1450 of the calculated font scale.

Operation

Figure 46:
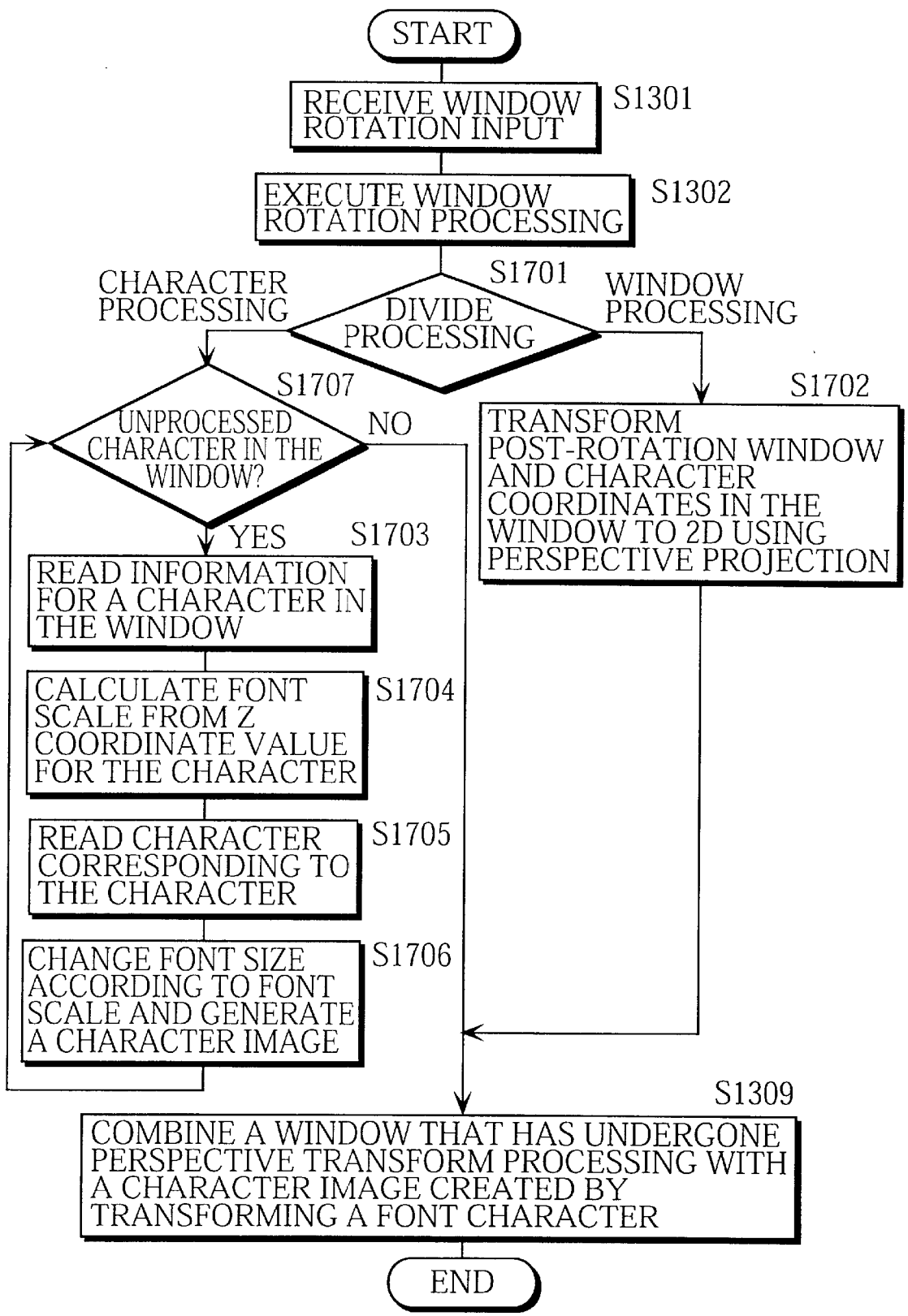
FIG. 46 is a flowchart of window display processing in the tenth embodiment.

FIG. 46 is a flowchart showing rotation processing for a window displaying characters in the window display device in the tenth embodiment of in the present invention. The following is an explanation of this processing with reference to the flowchart. This processing differs from the ninth embodiment in several respects. Firstly, the font transform processing only involves changes in size produced by the font scale and does not include shape-changing processing. In addition, the perspective transform processing and the font transform processing are performed in parallel (in the ninth embodiment the font transform processing is performed after the perspective transform processing has been completed) Processing performed up until rotation processing is performed (steps S1301 and S1302 is the same as in the ninth embodiment.

Once rotation processing has been completed, the display control unit 1470 directs the perspective transform unit 130 to execute the perspective transform processing, and instructs the font scaling unit 1450 to execute processing to produce a character image for display use by transforming a font character. These two processes are performed in parallel (step S1701).

The content of the processing performed by the perspective transform unit 130 is the same as in the ninth embodiment (S1702).

Meanwhile the font scaling unit 1450 has the font reading unit 1460 read character position coordinates (step S1703), sends the z coordinate from the coordinates to the font scale unit 1440 and has the font scale calculating unit 1440 calculate the font scale (step S1704). Subsequent processing, in other words the processing up until a character image for display use is produced by changing font size according to the font scale, and sent to the display control unit 1470 (steps S1705 to S1707), is the same as steps S1306 to S1308 in the ninth embodiment, apart from the omission of the font shape-changing processing.

Processing for combining character images with a window on which perspective transform has been performed (step S1309) is also the same as in the ninth embodiment.

In the window display device of the present embodiment, a font character is transformed by a font scale calculated based on information stored in a window information managing means, as explained above. As a result, there is no need to wait for the result of the perspective transform before transforming the font character, as was the case in the ninth embodiment. Instead, font transform processing is performed in parallel with perspective transform processing, and font shape-changing processing is not performed, resulting in high processing efficiency.

Eleventh Embodiment

The following is an explanation of a window display device in the eleventh embodiment of the present embodiment.

The window display device in the present embodiment relates to display processing for characters occurring when a window is displayed in perspective, and is characterized by displaying individual characters facing the front, while altering the aspect ratio for the outline of each character using a perspective transform.

Structure

Figure 47:
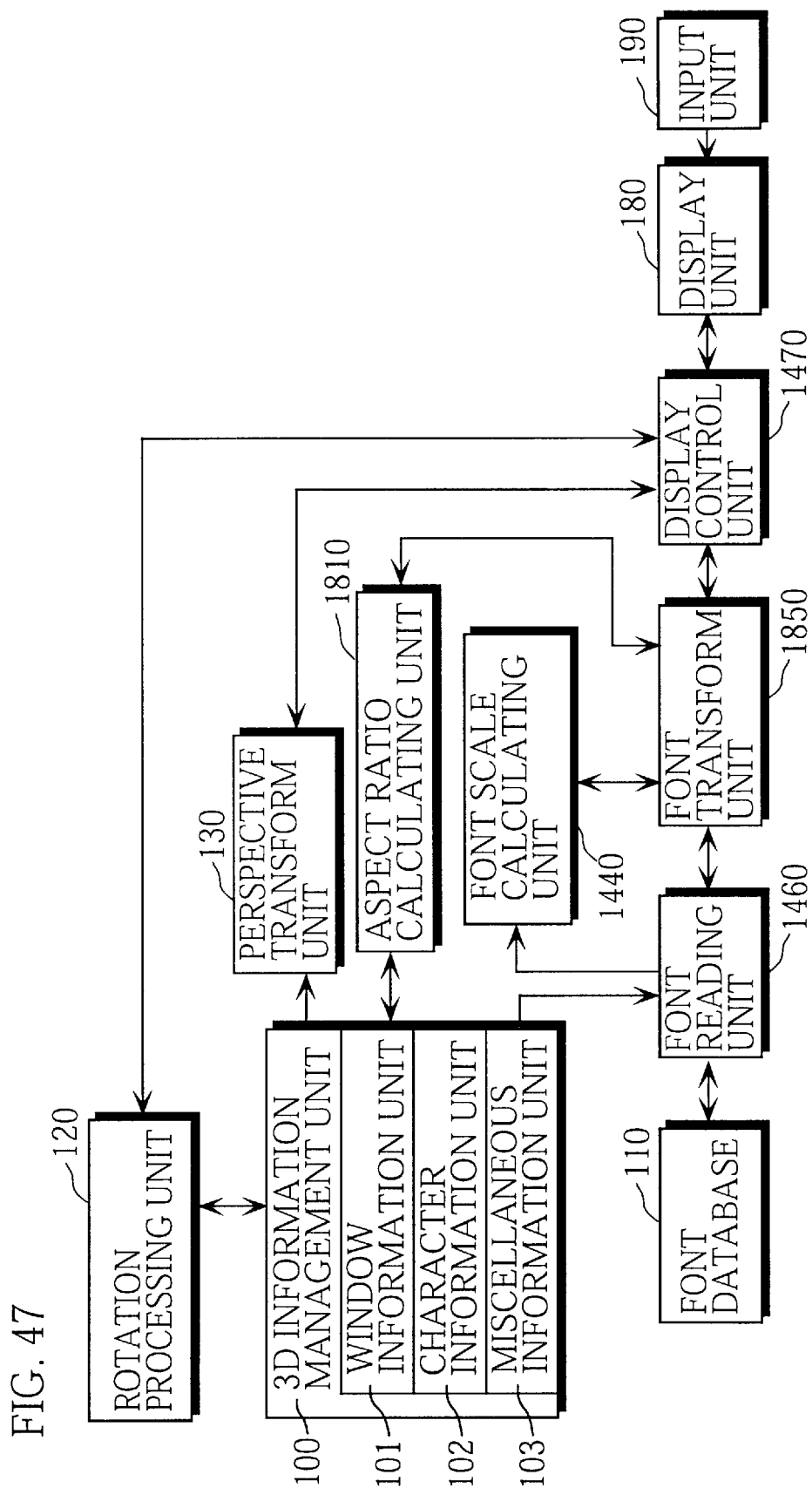
FIG. 47 is a block diagram of a window display device in the eleventh embodiment of the present invention.

FIG. 47 is a block diagram of the eleventh embodiment of the present invention. Explanation of those parts identical to the tenth embodiment will be omitted.

Upon receiving an input from the display control unit 1470, a font transform unit 1850 sends a z coordinate from character position coordinates, obtained by instructing a font reading unit 1460, to a font scale calculating unit 1440, and has the font scale calculation unit 1440 calculate a font scale from this value (this process is identical to the tenth embodiment). Meanwhile, the font transform unit 1850 instructs an aspect ratio calculating unit 1810 to find an aspect ratio.

The font transform unit 1850 instructs the font reading unit 1460 to read a font character and changes the height to width ratio and size of the font character based on the aspect ratio and the font scale, producing a character image to be displayed in a 2D window.

Figure 48:
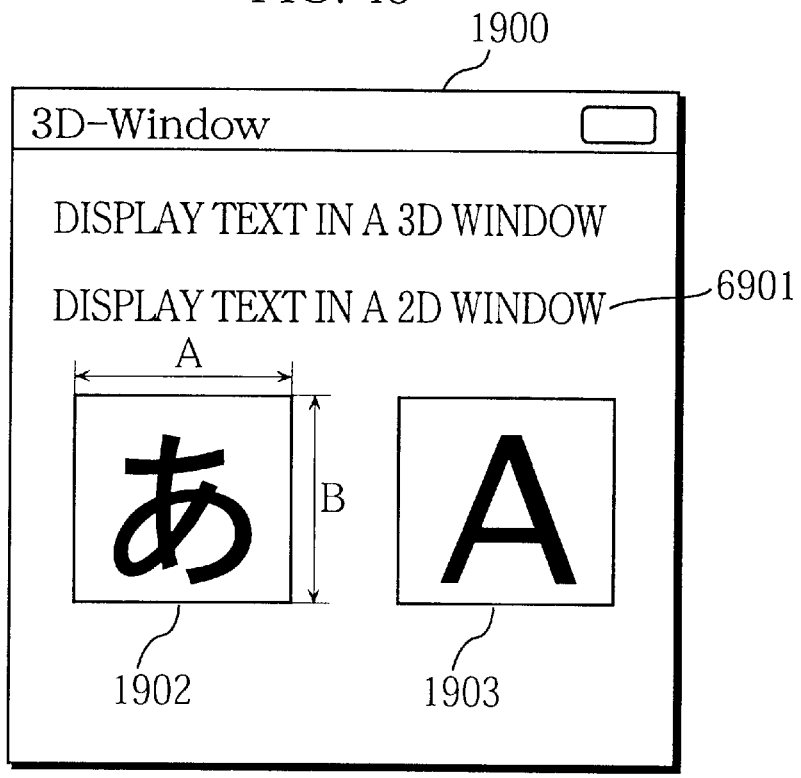
FIG. 48 shows an example of a perspective transform view of a window prior to rotation processing in the eleventh embodiment.
Figure 49:
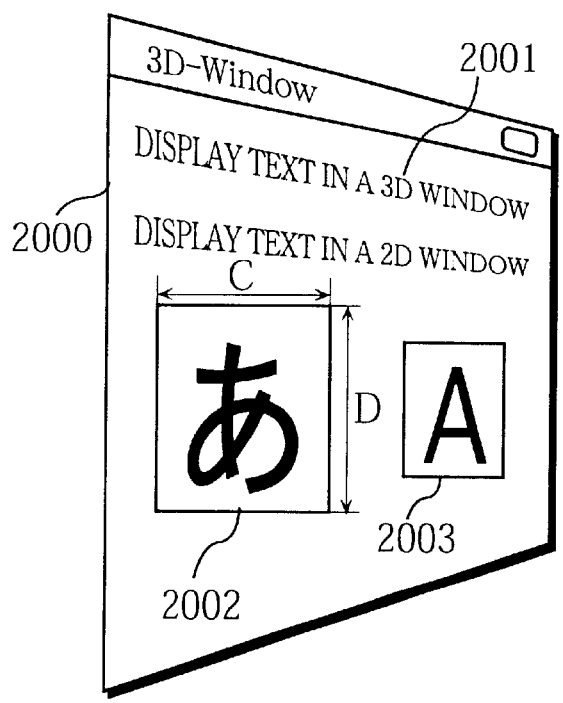
FIG. 49 shows an example of a perspective transform view of a window after rotation processing in the eleventh embodiment.

Examples of the processing performed by the font transform unit 1850 are shown by FIGS. 48 and 49.

FIG. 48 shows a 2D window 1900 produced by performing a perspective transform on a 3D window on which no rotation processing has been performed. FIG. 49 shows a 2D window 2000 produced by performing a perspective transform on the same window as the one in FIG. 48 after it has been rotated around the y-axis in virtual space.

Character strings 1901 and 2001 are displayed in the windows. Enlarged character views 1902 and 1903 in FIG. 48 and 2002 and 2003 in FIG. 49 display a character from the character string after it has been enlarged, in order to demonstrate the character transform clearly.

Since rotation is performed around the y-axis, the aspect ratio has a scale factor of 1 in the y direction and a scale factor of a in the x direction, where $0<\alpha<1$. If the output font scale based on the z coordinate value of the character display position is y, and the size of the enlarged character views 1902 and 1903 is P, then an x direction length C and a y direction length D for enlarged character views 2002 and 2003 are expressed by the following formulas:

$$C = \gamma \times \alpha \times P$$

$$D = \gamma \times 1 \times P$$

where C is shorter than D.

Figure 50A:
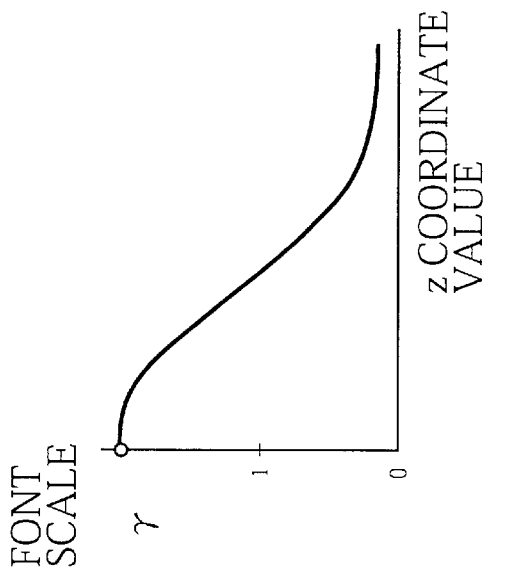
FIGS. 50A to 50C show the relation between window position and aspect ratio, and between character position and size, in the eleventh embodiment.
Figure 50B:
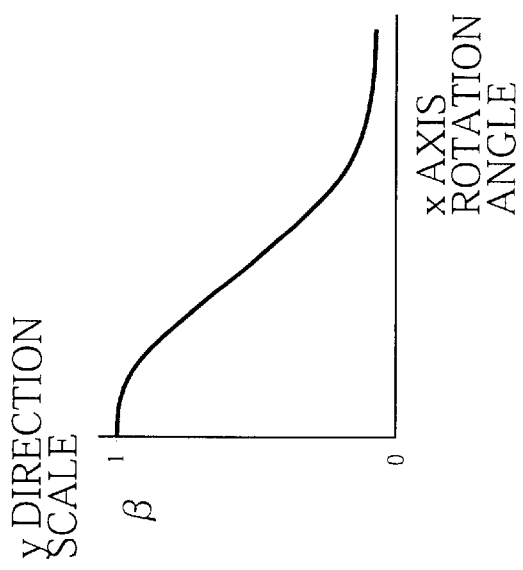
Figure 50C:
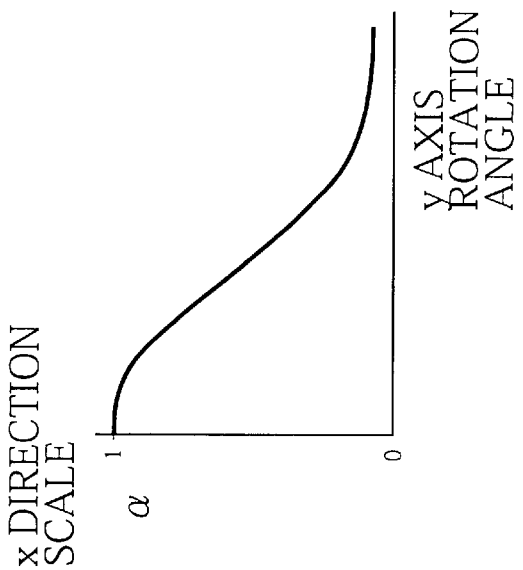

The aspect ratio calculating unit 1810 reads a window angle from the 3D information management unit 100, calculates an aspect ratio from this angle, and informs the font transform unit 1850 of the aspect ratio. The aspect ratio is the length to width ratio. An x direction scale and y direction scale for a font character are calculated from the window angle by the aspect ratio calculating unit 1810 and then output. The scales are calculated according to various rotation angles, as shown in FIGS. 50A and 50B.

Operation

Figure 51:
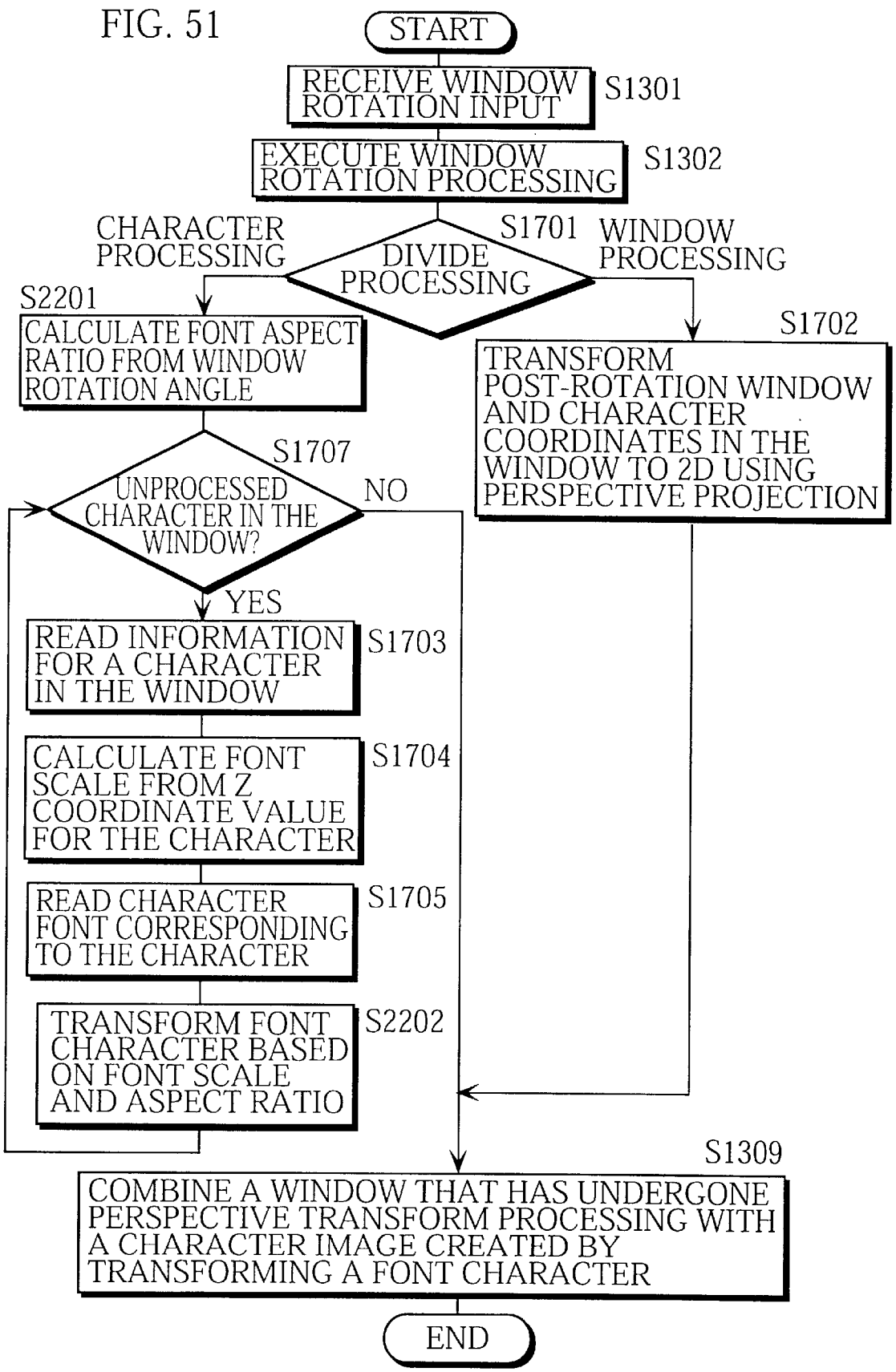
FIG. 51 is a flowchart showing window display processing in the eleventh embodiment.

FIG. 51 is a flowchart showing rotation processing for a window displaying characters in the window displaying device of the eleventh embodiment of this invention. The following is an explanation of this processing with reference to the flowchart. Here, processing identical to that in the tenth embodiment has the same effects and so explanation is omitted.

First, the procedure in which the control display unit 1470 receives an input for performing a window rotation from a user using the input unit 190, and has the rotation processing unit 120, perform rotation processing on coordinates (steps S1301, and S1302 is the same as in the tenth embodiment.

Upon receiving notice that the rotation processing has been completed from the rotation processing unit 120, the display control unit 1470 outputs a perspective transform indication to the perspective transform unit 130, as well as instructing the font transform unit 1850 to change the size of a font character and transmit it (step S1701).

The processing performed by the perspective transform unit 130 is the same as in the tenth embodiment (step S1702).

Meanwhile, the font transform unit 1850 instructs the aspect ratio calculating unit 1810 to find an aspect ratio. The aspect ratio calculating unit 1810 reads a window angle from the 3D management information unit 100, calculates the aspect ratio from this angle, and then informs the font transform unit 1850 of this aspect ratio (step S2201).

The font transform unit 1850 instructs the font reading unit 1460 to read coordinates for a character position in the window (step S1703). Then the font transform unit 1850 sends the z coordinate from the received character position coordinates to the font scale calculating unit 1440, and has the font scale calculating unit 1440 calculate a font scale from that value (step S1704). Upon receiving the font scale, the font transform unit 1850 directs the font reading unit

1460 to read a font character corresponding to the character being processed from the font database 110, and a font size from the character information unit 102 (step S1705).

Then, the font transform unit 1850 performs a font transform processing based on the obtained font size, font scale and aspect ratio, and sends the resulting character image to the display control unit 1470 together with character position coordinates (step S2202).

The font transform unit 1850 repeats the above processing (from steps S1703 to S2202) until no unprocessed characters remain. When all of the characters have been processed, the font transform unit 1850 informs the display control unit 570 of this (step S1707).

The subsequent combining processing (step S1309) is the same as the processing in FIG. 10.

In the window display device of the present embodiment, font characters are transformed according to an aspect ratio based on the rotation angle of the window, in addition to a font scale, as explained above. As a result, when a character string is displayed on the display unit 180, a more natural impression of depth can be achieved than was the case in the tenth embodiment when only the font size was changed.

The font scale calculating unit and the aspect ratio calculating unit may also store a font scale and an aspect ratio corresponding respectively to a z coordinate and a window rotation angle in memory. This data may be stored in memory as a table that has already been quantized and that can be referred to when processing is performed.

Twelfth Embodiment

The following is an explanation of a window display device in a twelfth embodiment of the present invention.

The window display device in the present invention is related to display processing for characters when a window is displayed in perspective, and characterized by having character font of various shapes on which a perspective transform has already been performed.

Structure

Figure 52:
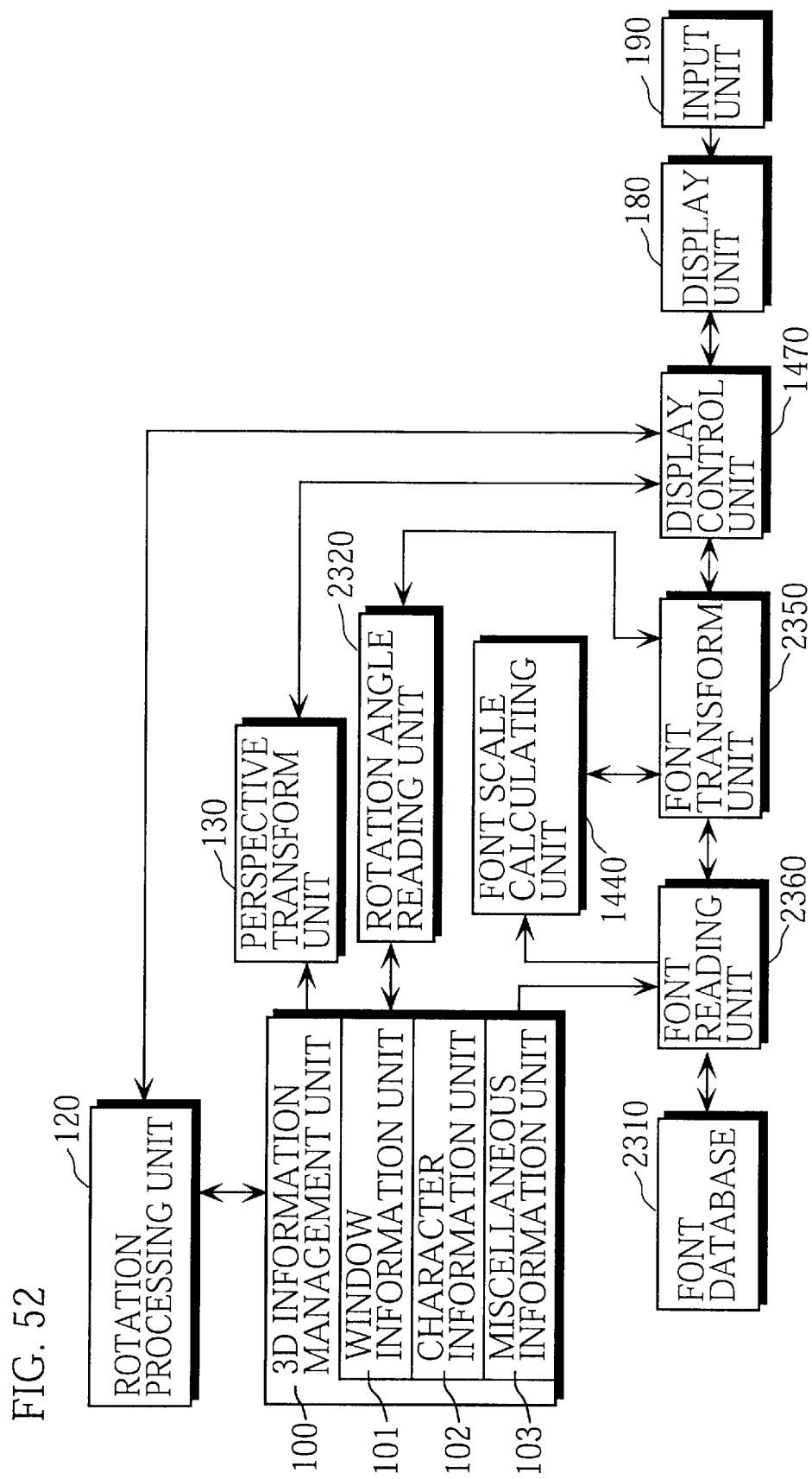
FIG. 52 is a block diagram of a window display device in the twelfth embodiment of the present invention.

FIG. 52 is a block diagram of the twelfth embodiment of the present invention.

Transformed font characters for each font character are stored in a font database 2310. Suppose that each font character has a perspective transform performed on it after being rotated around the x or y-axis in a virtual space, in a similarity transform similar to that in the ninth embodiment.

Figure 53A:
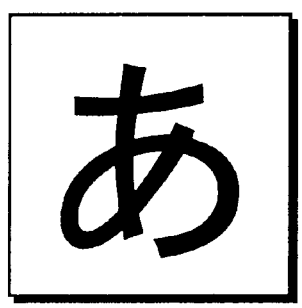
FIGS. 53A to 53F are examples of font characters stored in the font database in the twelfth embodiment.
Figure 53B:
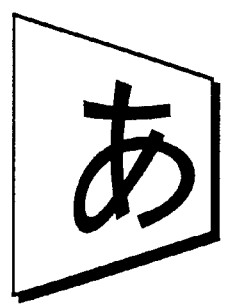
Figure 53C:
Figure 53D:
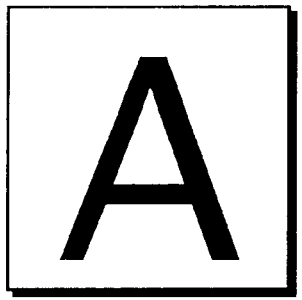
Figure 53E:
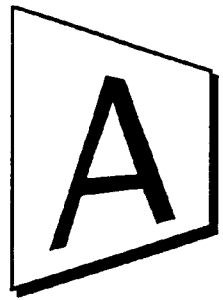
Figure 53F:

FIGS. 53A to 53F are examples of such transformed font characters obtained when a font character is rotated around the y-axis. FIGS. 53A and 53D show examples when a rotation angle is 0°, FIGS. 53B and 53E when a rotation angle is 30°, and FIGS. 53C and 53F when a rotation angle is 60°.

A font reading unit 2360 reads a transformed font character from the font database 2310. The transformed font character corresponds to the rotation angle nearest to a rotation angle that is an output value of a rotation angle reading unit 2320. If a rotation angle output by the rotation angle reading unit 2320 is 20°, for example, the font reading unit 2360 reads the transformed font character shown in FIG. 53B, corresponding to a rotation angle of 30°, and sends the read transformed font character to a font transform unit 2350.

The rotation angle reading unit 2320 reads rotation angle information for a 3D window from window information unit 101, and informs the font transform unit 2350 of the value obtained.

The font transform unit 2350 directs the rotation angle reading unit 2320 to find the size of the window rotation angle formed in the virtual 3D space. Next, the font transform unit 2350 informs the font reading unit 2360 of the angle and directs the font reading unit 2360 to read a corresponding transformed font character from the font database 2310 and the font size and character coordinates for this font character from the character information unit 102. Having received this data, the font transform unit 2350 sends the z coordinate from the character coordinates to the font scale calculating unit 1440 and causes it to find the font scale from this value.

The font transform unit 2350 implements scale processing, based on the obtained font scale and font size, on the transformed font obtained from the font reading unit 2360. The font transform unit 2350 then sends the resulting character image and corresponding character position coordinates to the display control unit 1470.

Operation

Figure 54:
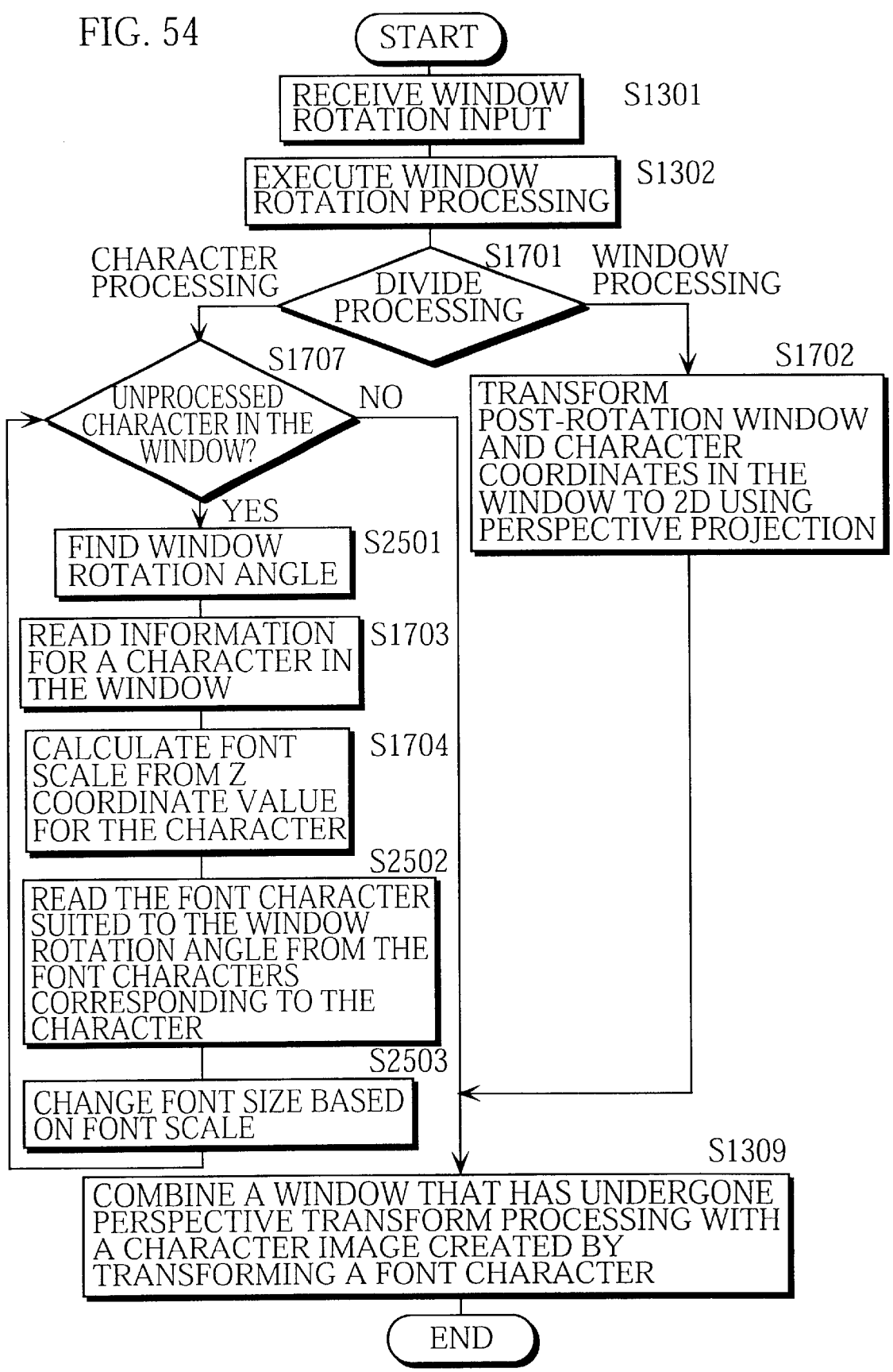
FIG. 54 is a flowchart of window display processing in the twelfth embodiment.

FIG. 54 is a flowchart showing the rotation processing for a window displaying characters in the window display device in the twelfth embodiment of the present invention.

The following is an explanation of the rotation processing with reference to the flowchart. Processes that are the same as processes in the tenth embodiment will be indicated as such and will not be described.

Here, the procedures in which the display control unit 1470 receives an input for a window rotation from a user via the input unit 190 and the font transform unit 2350 initializes processing of a font character (steps S1301 and S1302 and the perspective transform processing (step S1702) are identical to the tenth embodiment.

The font transform unit 2350 instructs the rotation angle reading unit 2320 to calculate the window rotation angle (step S2501). Next, the font transform unit 2350 informs the font reading unit 2360 of the angle and instructs the font reading unit 2360 to read a corresponding font size and character coordinates from the character information unit 102 (step S1703). Having received this data, the font transform unit 2350 sends the z coordinate value from the character coordinates to the font scale calculating unit 1440, and has the font scale calculating unit 1440 calculate a font scale from this value (step S1704). Next, the font transform unit 2350 instructs the font reading unit 2360 to read a font character that corresponds to the angle read by the rotation angle reading unit 2320, and a character code and font type stored in the character information unit 102, from the font database 2310 (step S2502).

The font transform unit 2350 performs transform processing, based on font scale and font size, on the font obtained from the font reading unit 2360, and sends the resulting character image and corresponding character coordinates to the display control unit 1470 (step S2503).

The font transform unit 2350 repeats the above processing for each character in the window in turn, until no unprocessed characters remain. Once all of the characters have been processed, the font transform unit 2350 informs the display control unit 1470 that processing has been completed (step S1707).

The subsequent combining processing (step S1309) is the same as in the tenth embodiment.

In the window display device of the present embodiment, font characters on which a transform has already been performed according to the window rotation angle are stored in the font database 2310, as described above. Character images can be displayed in virtual 3D simply by changing the size of the font characters in accordance with the font scale. The shape-changing processing of the ninth embodiment is unnecessary, and so the amount of processing can be reduced accordingly.

In the present embodiment, character sets that have been rotated at representative angles are stored in advance and characters in the set that best represents the window rotation angle are used. If the actual rotation angle does not equal any of the representative angles, a transformed character set corresponding to the actual angle may be formed by combining the two closest types of transformed font. If the rotation angle is 20°, for example, the transformed font may be formed by combining FIG. 53A (or D) with FIG. 53B (or E).

Thirteenth Embodiment

The following is an explanation of a window display device in the thirteenth embodiment of the present invention.

The window display device in the present embodiment relates to display processing for characters when a window is displayed in perspective, and is characterized by displaying a special fixed symbol for characters smaller than a certain size.

Structure

Figure 55:
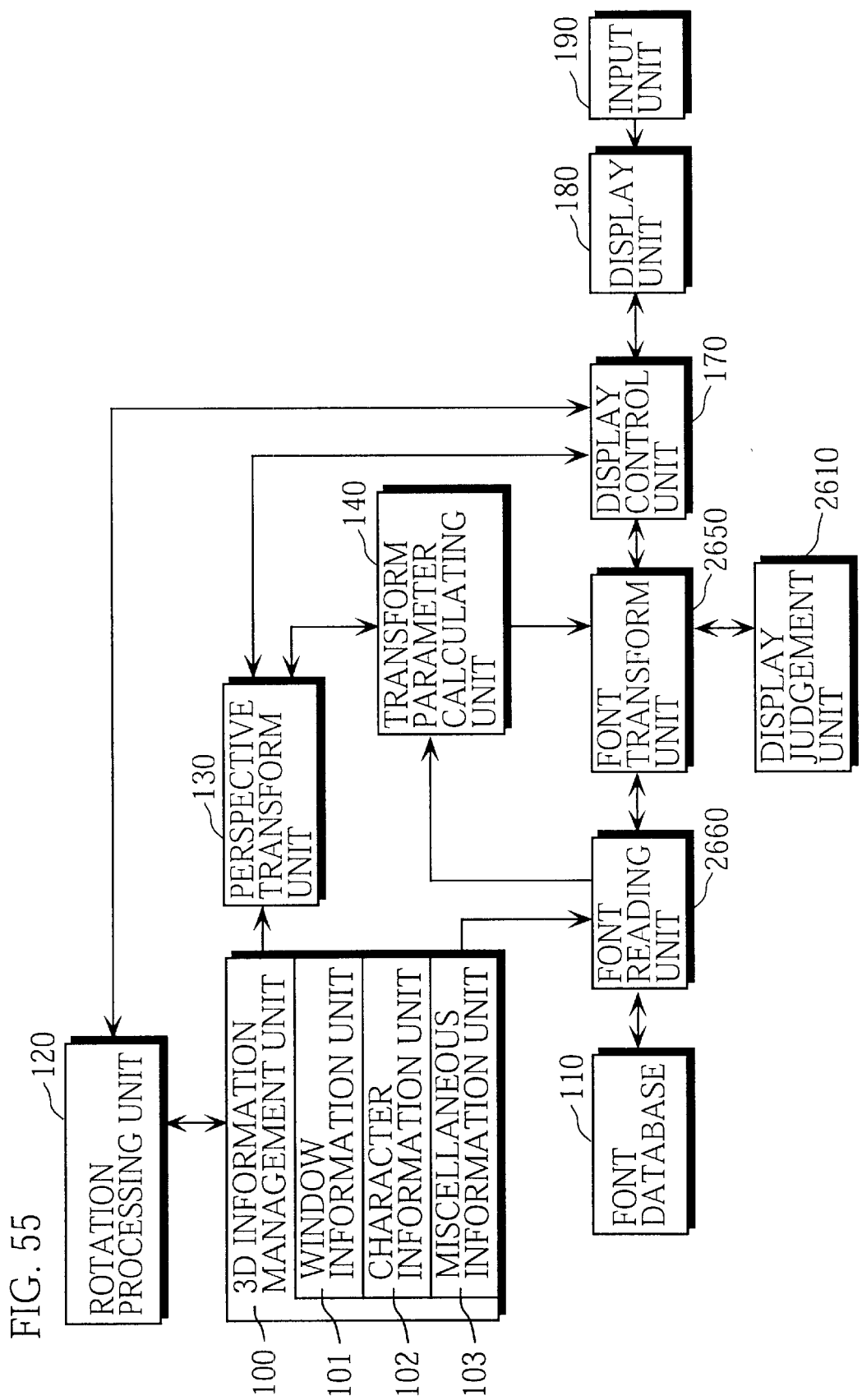
FIG. 55 is a block diagram of a window display device in the thirteenth embodiment of the present invention.

FIG. 55 is a block diagram of the window display device in the thirteenth embodiment of the present invention. Explanation of those parts identical to the ninth embodiment is omitted.

A display judgement unit 2610 judges whether character images should be displayed, based on information from the 3D information management unit 100. The aim of performing such judgements is explained below.

Thus far in this description, when a character image is displayed in a virtual 3D window, the size of the displayed character image is determined by the position of the character in virtual space (Z coordinate) and font size, as explained in the ninth to twelfth embodiments. As a result, if characters are positioned in the back of the space (have a large z coordinate value) and have a small font size, displayed character images become smaller and impossible to read. Processing for producing and displaying such unreadable character images is unnecessary. Here, the size of character images is calculated in advance based on character coordinates and font size and, if it is thought a character image will be unreadable, the font transform unit 2650 is directed not to display it. In this case, a symbol or similar is output instead of the character image.

The display judgement unit 2610 calculates the length of the vertical edge of the character image from the font size and transform parameters (scale). following transformation, and performs judgement by comparing the result with a threshold value.

The font transform unit 2650 instructs the font reading unit 2660 to read a character code, font size, font type and character coordinates from the character information unit 102. Next the font transform unit 2650 informs the display judgement unit 2610 of the font size and z coordinate value from the character coordinates in this read information, along with the transform parameters, and has the display judgement unit 2610 judge whether the character should be displayed as a character image or replaced with a symbol. If the result of the judgement is that the character should be replaced with a symbol, the font transform unit 2650 sends a specified symbol to be displayed instead of the character image to the display control unit 170 along with the character position coordinates for the character that is to be replaced.

Figure 56:
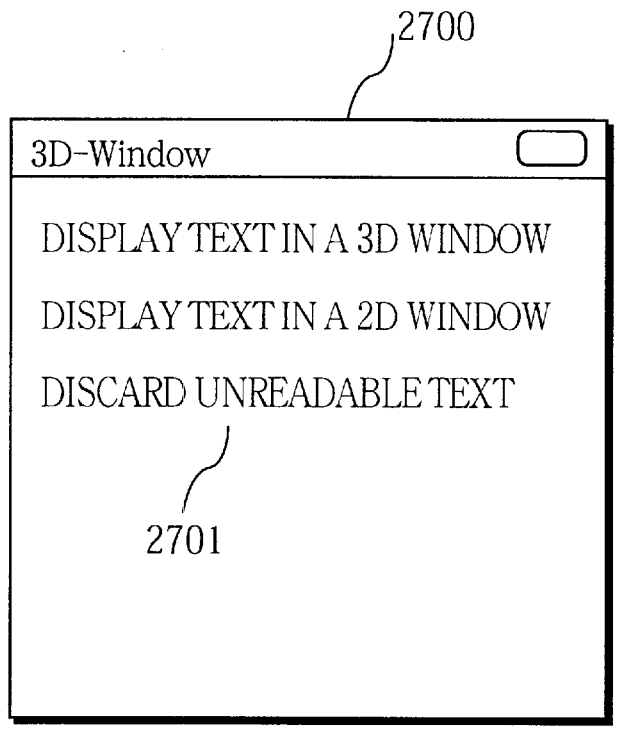
FIG. 56 is an example of a perspective transform view of a window before rotation processing is performed in the thirteenth embodiment.
Figure 57:
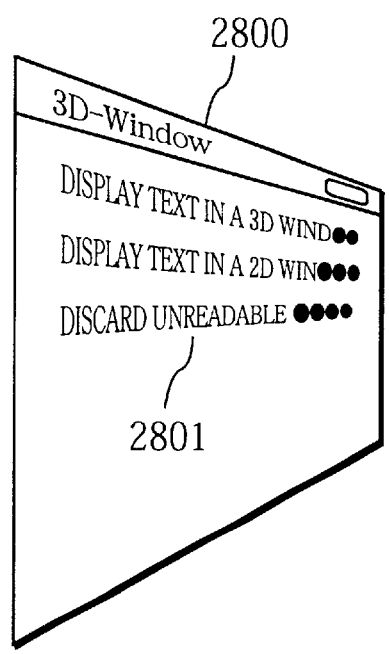
FIG. 57 is an example of a perspective transform view of a window after rotation processing is performed in the thirteenth embodiment.

An example of the replacement of characters by symbols performed by the font transform unit 2650 is explained with reference to FIGS. 56 and 57. FIG. 56 shows a perspective converted window 2700 prior to rotation processing, and FIG. 57 shows a perspective converted window 2800 on which rotation processing has been performed about the y-axis. A character string 2701 is displayed in the window 2700 and a character string 2801 in the window 2800. The characters in the character string 2801 decrease in size the further to the right they are (as the z coordinate in the virtual space becomes larger). In each line any characters to the right of the tenth character are judged to be unreadable, and replaced by a black dot.

The display judgement unit 2610 finds the length of the vertical edge nearest to the rotation axis for each transformed character image from the font size and transform parameters (scale). The display judgement unit 2610 performs a judgement by comparing this length with a specified threshold value stored in memory.

Operation

Figure 58:
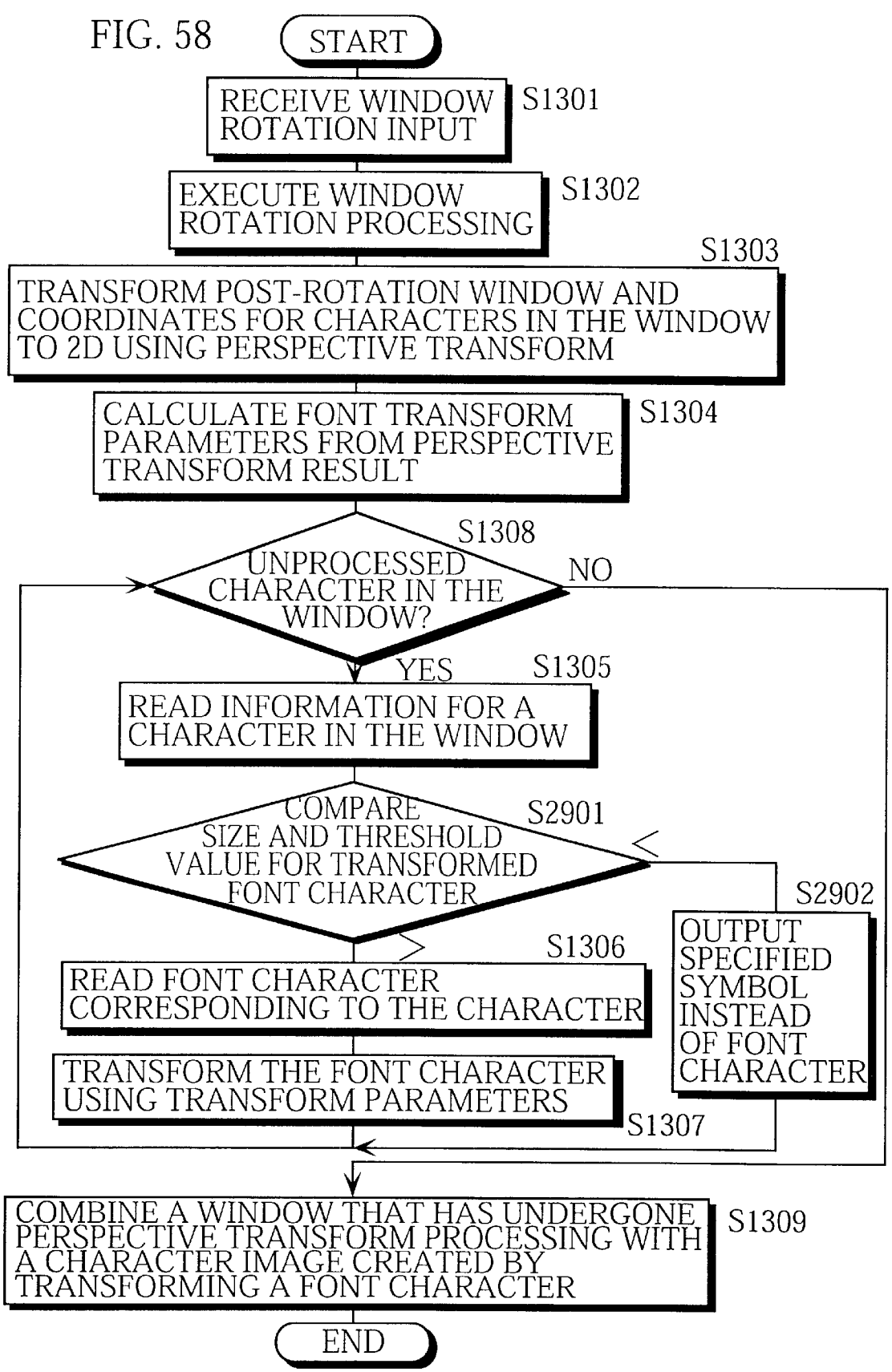
FIG. 58 is a flowchart showing window display processing in the thirteenth embodiment.

FIG. 58 is a flowchart showing the operation of rotation processing for a window including text fonts in the window display device of the thirteenth embodiment of the invention. The following is an explanation of the processing with reference to the flowchart. Here, processing that is the same as in the ninth embodiment has the same content and so explanation is omitted.

The processing up until the initialization of font transform processing by the font transform unit 2650, that is the processing from the reception of a window rotation input to the calculation of transform parameters (steps S1301 to S1304), is identical to the ninth embodiment.

The font transform unit 2650 directs the font reading unit 2660 to read a character code, font size, font type and character coordinates from the character information unit 102 (step S1305). Next, the font transform unit 2650 informs the display judgement unit 2610 of the font size, and the z coordinate from this information, along with the transform parameters, and has the display, judgement unit 2610 judge whether the character is to be replaced by a symbol (step S2901).

If the judgement result is that the character is to be replaced by a symbol, the font transform unit 2650 sends a specified symbol to the display control unit 170 along with character position coordinates (step S2902).

If the judgement result is that the character be displayed using a font character, subsequent processing is the same as in the ninth embodiment (steps S1306 and S1307).

The font transform unit 2650 repeats the above processing until no unprocessed characters remain, and once all the characters have been processed, informs the display control unit 170 that processing has been completed (step S1308).

Subsequent processing (step S1309) is the same as in the ninth embodiment.

In the window display device of the present embodiment, characters that are thought to be unreadable or difficult to read if transformed are replaced by a black dot when displayed, enabling the font reading and font transform processing (steps S1306 and S1307) to be omitted, so that both the amount of processing and processing time are reduced.

In the present embodiment, the length of the vertical edge nearest to the rotation axis for the transformed character image was used as the judgement criteria, but the width or the area of the character image may also be used as the criteria.

The present embodiment was explained in conjunction with the block diagram of the ninth embodiment, but the present embodiment may also be used in conjunction with the tenth, eleventh or twelfth embodiments. The display judgement unit 2610 forms judgements on the basis of font size and font scale when used in conjunction with the tenth and twelfth embodiments and on the basis of font size, font scale and aspect ratio when used in conjunction with the eleventh embodiment.

Fourteenth Embodiment

The following is an explanation of a window display device in the fourteenth embodiment of the present invention.

The window display device in the present embodiment is related to display processing for characters in a window displayed in perspective, and characterized by displaying characters smaller than a certain size using specific fixed font.

Structure

Figure 59:
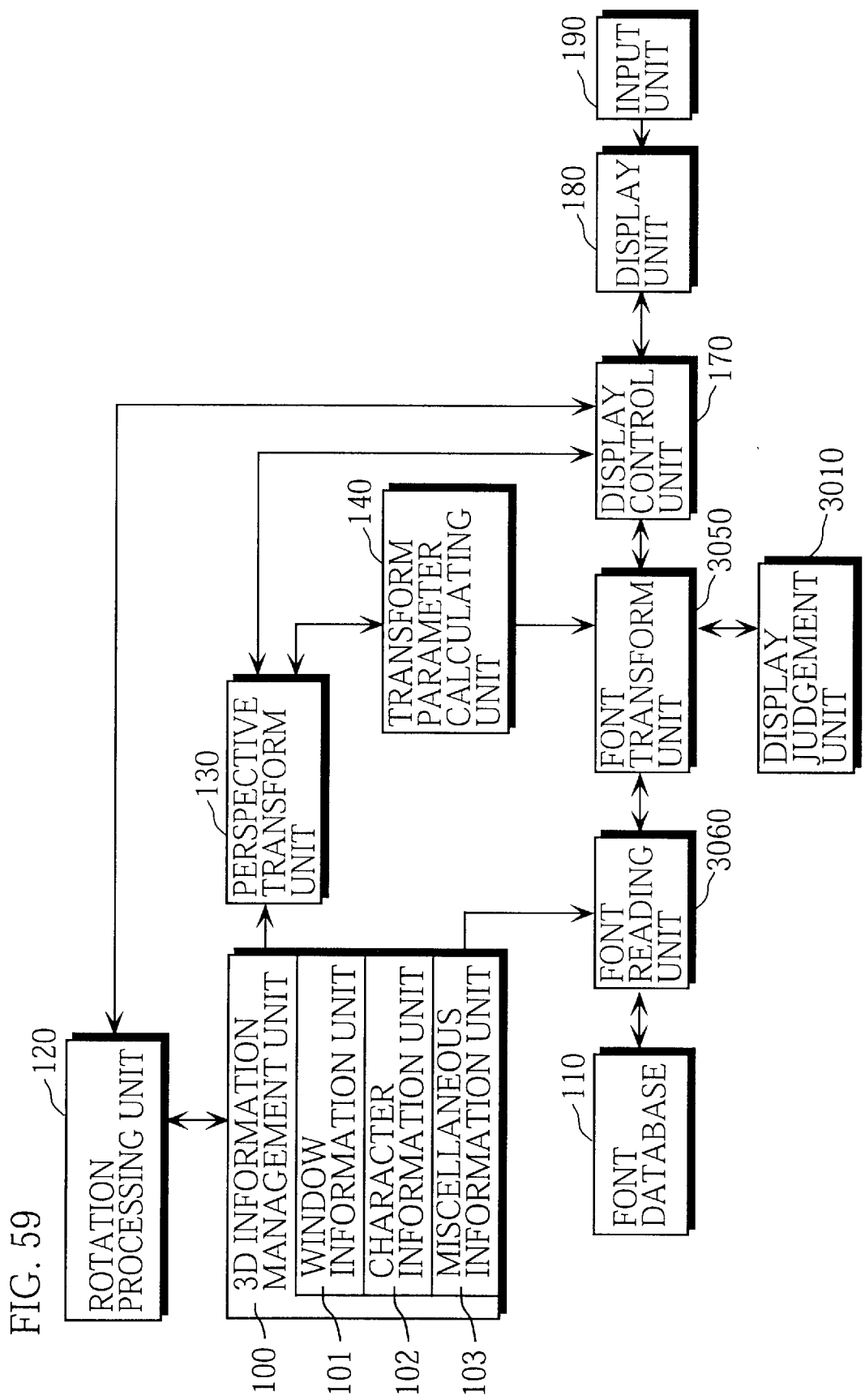
FIG. 59 is a block diagram of a window display device in the fourteenth embodiment of the present invention.

FIG. 59 is a block diagram of a window display device in the fourteenth embodiment of the present invention. Parts with the same numerical references as in FIG. 30 have the same function and so explanation of such parts is omitted.

A display judgement unit 3010 judges whether character images need to be displayed using a specified font type. The object of this process is explained below.

When characters are. displayed in a virtual 3D window, the size of character images displayed is determined according to the position of characters in virtual space (Z coordinate value) and font size, as was also explained in the thirteenth embodiment. As a result, if characters are positioned in the back of the space, (have a large Z coordinate value) and have a small font size, the displayed character images become smaller. If the user cannot tell which font is being used, there is no point in using different font types. Here, if it is thought that the font type will be unidentifiable if transformed, due to the character display position and size, and z coordinate value used, only characters from a specified font type are used.

Using the above processing method improves processing efficiency for the following reasons.

First, when font characters are read from the font database 110, a specified font type group is stored in a cache memory. This means that, so long as the same type of font is being used, all reading takes place from the cache memory and, since the cache hit rate is high, the read speed is improved. On the other hand, if the type of font being read changes suddenly, the hit rate falls, and transmission from the font database unit 110 to the cache increases, lowering the read speed. As a result, the processing method in the present embodiment uses the specified font type for characters whose display font will not be discernable, improving the cache hit rate and increasing the read processing speed.

As in the thirteenth embodiment, the display judgement unit 3010 calculates the length of the vertical edge of a transformed character image from the font size and transform parameters, and makes a judgement by comparing the result with a threshold value.

Upon receiving an input from a font transform unit 3050, a font reading unit 3060, reads information concerning a character stored in the character information unit 102, and sends this information to the font transform unit 3050.

Then, in response to an input from the font transform unit 3050, the font reading unit 3060 reads either a font character corresponding to the font type information in the character information unit 102, or to the specified font type and sends this data to the font transform unit 3050.

The font transform unit 3050 instructs the font reading unit 3060 to read a character code, font size, font type, and character coordinates from the character information unit 102. Next, the font transform unit 3050 informs the display judgement unit 2710 of the font size and z coordinate value from the character coordinates in this information, along with transform parameters. If the character has been transformed, the font transform unit 3050 has the font judgement unit 2710 judge whether the character is of sufficient size for the font type to be identified.

If the result of the judgement is that identification will be impossible, the font transform unit 3050 instructs the font reading unit 3060 to ignore the font type information obtained from the character information unit 102, and read the font character corresponding to the character from the specified font type group.

Figure 60:
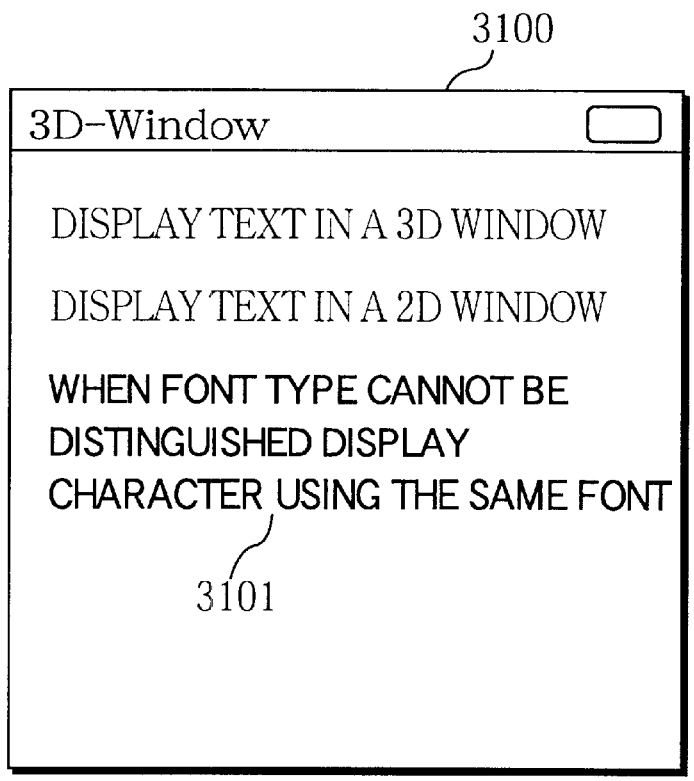
FIG. 60 shows an example of a perspective transform view of a window before rotation processing is performed in the fourteenth embodiment.
Figure 61:
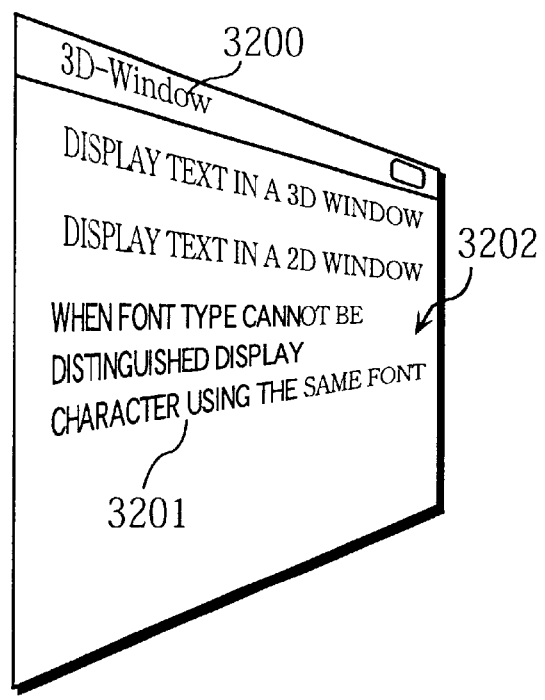
FIG. 61 shows an example of a perspective transform view of a window after rotation processing is performed in the fourteenth embodiment.

An example of the font type replacement performed by the font transform unit 3050 is shown in FIGS. 60 and 61.

FIG. 60 shows a perspective converted window 3100 prior to rotation processing. FIG. 61 shows a perspective converted window 3200 which has been rotated around the y-axis. A character string 3101 is displayed in the window 3100 and a character string 3201 in the window 3200. The character string 3201 has four lines, the characters in the first and second lines having a different font type to those in the third and fourth lines. The character string 3201 in the window 3200 becomes smaller as it moves further to the right (as the z coordinate value in the virtual space becomes larger). A part 3202 of the character string 3201, for which the font type is judged to be unidentifiable, is displayed with characters from the specified font type, without distinguishing between font types.

Operation

Figure 62:
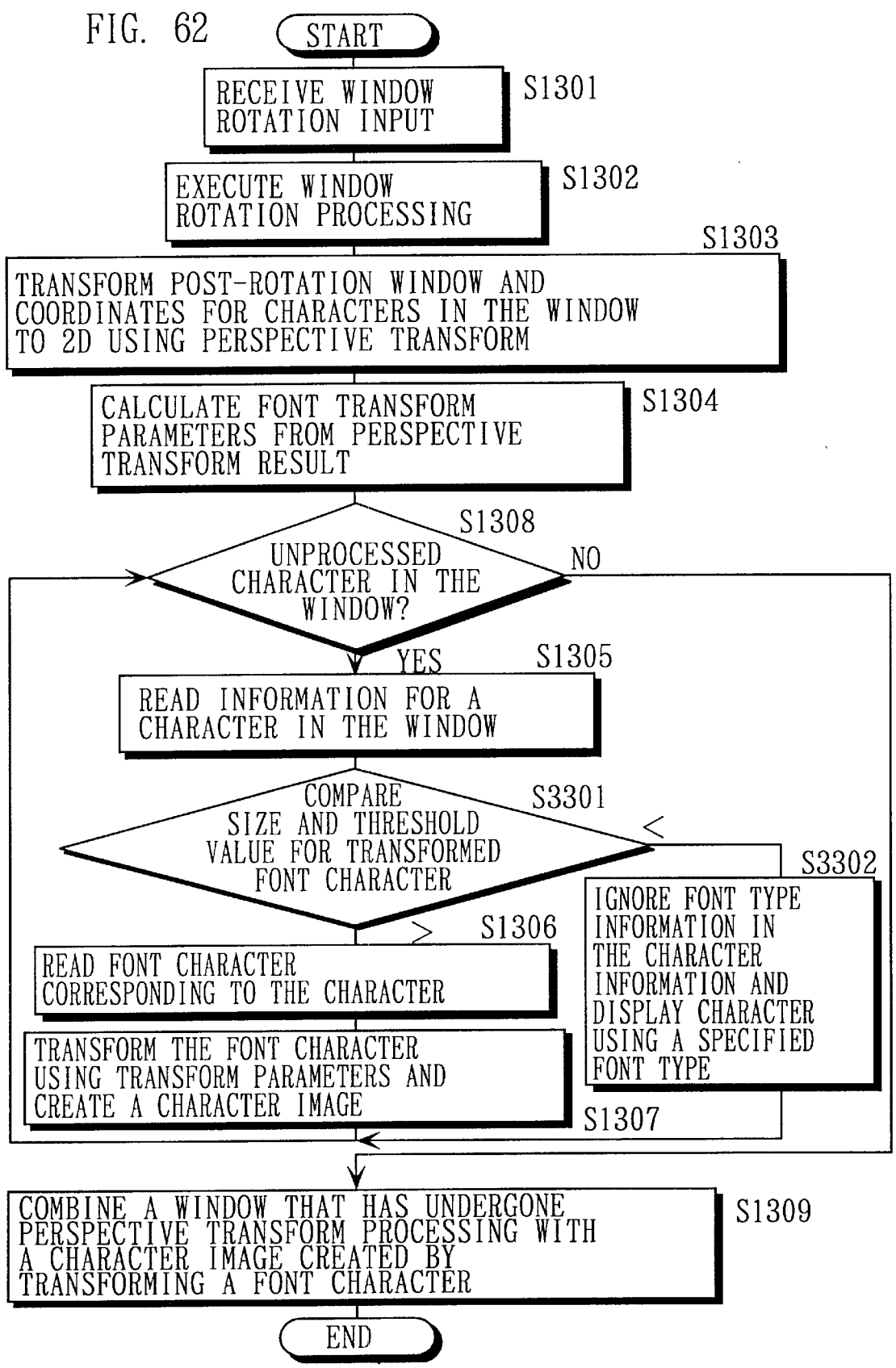
FIG. 62 is a flowchart of window display processing in the fourteenth embodiment.

FIG. 62 is a flowchart showing the operation of rotation processing for a window displaying characters in a window display device in the fourteenth embodiment of the invention. The following is an explanation of the processing with reference to the flowchart. Here, processing that is the same as in the ninth embodiment has the same effects and so explanation is omitted.

The processing up until the initialization of font transform processing by the font transform unit 3050, that is the processing from the reception of a window rotation input to the calculation of transform parameters (steps S1301 to S1304), is identical to the ninth embodiment.

The font transform unit 3050 instructs the font reading unit 3060 to read a character code, font size, font type and character coordinates from the character information unit 102 (step S1305). Next, the font transform unit 3050 informs the display judgement unit 3010 of the font size, and the z coordinate value from the character coordinates from this information, along with the transform parameters, and if the character has been transformed, has the display judgement unit 3010 judge whether the character is large enough for the font type to be identified (step S3301).

If identification is judged to be impossible, the font transform unit 3050 instructs the font reading unit 3060 to ignore the font type information obtained from the character information unit 102, and read the font character from the specified font type group (step S3302).

If identification is judged to be possible, the font transform unit 3050 directs the font reading unit 3060 to read the font character from a font type group in the character information unit 102, as was the case in other embodiments (step S1306). The subsequent processing is the same as in the thirteenth embodiment (step S1307).

The font transform unit 3050 repeats the above processing until no unprocessed characters remain, and when all characters have been processed, informs the display control unit 170 of the completion of processing (step S1308).

Subsequent combining processing is identical to that in the thirteenth embodiment (step S1309).

In the window display device of the present embodiment, the individual font types are ignored for characters thought to have an unidentifiable font type if transformed. Such characters are displayed using a constant specified font type. As a result, if a cache memory is used, the cache hit rate for font read processing improves and processing efficiency is raised.

Here, if the font type is judged to be unidentifiable, the font character was to be read from the specified font type group, but it may also be read from the font type group stored in the cache memory at that point in time, thus further improving the cache hit rate.

The replacement of font by the font transform unit 3050 was mandatory, but, alternatively, the font type may be left unchanged, and a font character may be displayed after certain elements used to construct it have been omitted.

The present embodiment, was explained in conjunction with the block diagram of the ninth embodiment, but the present embodiment may also be used in conjunction with the tenth, eleventh or twelfth embodiments. The display judgement unit 3010 forms judgements on the basis of font size and font scale when used in conjunction with the tenth and twelfth embodiments, and on the basis of font size, font scale, and an aspect ratio when used in conjunction with the eleventh embodiment.

Fifteenth Embodiment

The following is an explanation of a window display device in the fifteenth embodiment of the present invention.

The window display device in the present embodiment is related to display processing for characters when a window is displayed in perspective, and characterized by the ability to change the scale of a coordinate axis so that characters are displayed with a fixed width even if they are positioned deep within the 3D space.

The processing order in the present embodiment is the same as in other embodiments, except for the way in which a 2D window coordinate system is changed prior to rotation processing, so explanation of the operation using a flowchart is omitted.

Figure 63:
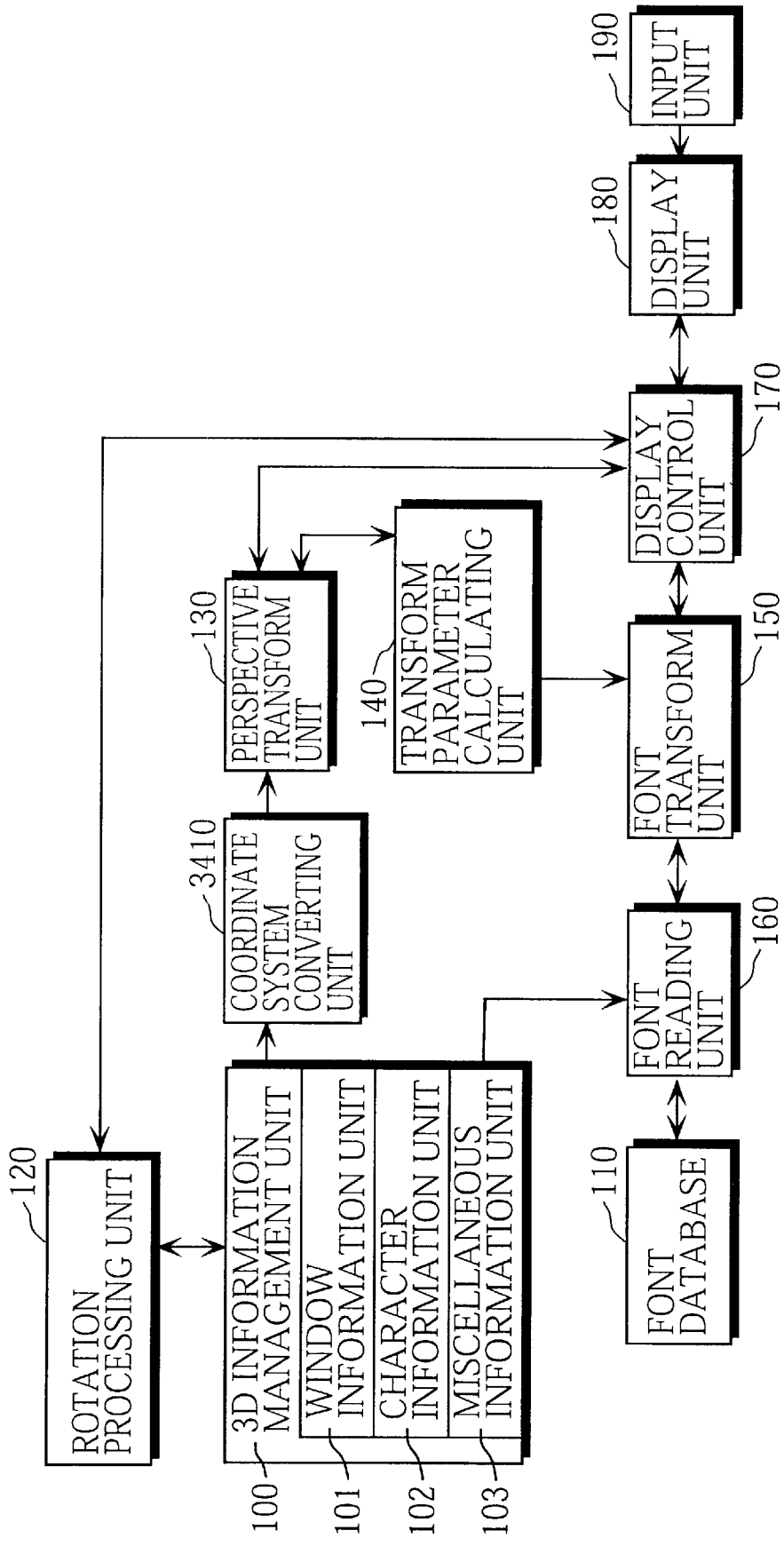
FIG. 63 is a block diagram of a window display device in the fifteenth embodiment of the present invention.

FIG. 63 is a block diagram of the window display device in the fifteenth embodiment of the present invention. Parts with the same reference numerals as those in FIG. 30 have an identical function, so explanation of these parts is omitted. In FIG. 63, a coordinate system converting unit 3410 changes the ratio (scale of the coordinate axis) of a screen coordinate system displayed in a window, based on a window position and rotation angle read from the 3D information management unit 100. The change is timed to be performed immediately before the perspective transform processing. The coordinate system data is stored in the miscellaneous information unit 103.

Figure 65D:
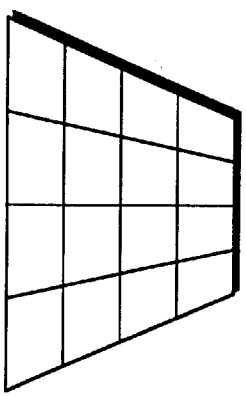
FIGS. 65A to 65D are examples of window display coordinate systems before and after conversion in the fifteenth embodiment.
Figure 65C:
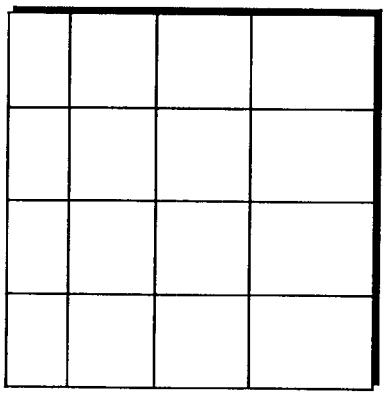
Figure 65B:
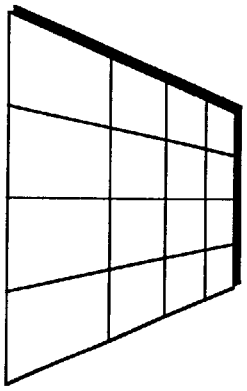
Figure 65A:
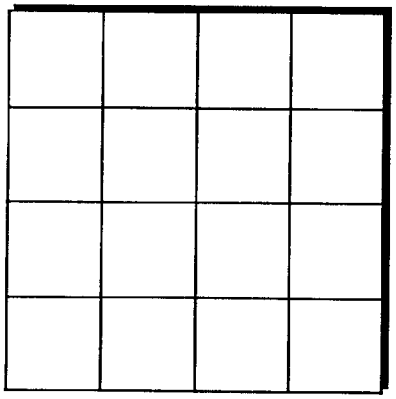

The coordinate system converting unit 3410 converts the coordinate system in the window in the following way. First, the coordinate system converting unit 3410 obtains window rotation information from the 3D information management unit 100. Then, if the new screen coordinate system is (X, Y), the coordinate system converting unit 3410 converts the coordinate system so that $$(X, Y) = \frac{1}{\alpha}(x, y)$$

where the value of a is set according to the rotation angle. As a result, the display area in the window space looks like that shown in FIG. 65C, and after rotation, like that in FIG. 65D.

This situation is explained with reference to FIGS. 64 and 65.

FIG. 64A is a perspective converted view of a window with a coordinate system using prior art techniques, prior to rotation processing. FIG. 64B is a perspective converted view of a window with a prior art coordinate system, on which rotation processing has been performed around the x-axis. FIG. 64C is a perspective converted view of a window with the converted coordinate system, prior to rotation processing. FIG. 64D is a perspective converted view of a window with the converted coordinate system, on which rotation processing has been performed around the x-axis.

If a perspective transform is performed on the window in FIG. 64A after it has been rotated around the x-axis, the upper part of the window shown in FIG. 64B will be displayed much larger than the lower part.

FIG. 65 shows window coordinate systems. FIG. 65A is a window coordinate system prior to rotation, and FIG. 65B is a coordinate system when the window is rotated about the x-axis. When rotation is performed about the x-axis, the upper part of the window appears larger and the lower part smaller, as shown in FIG. 65B. Here, when an x-axis rotation is performed, the window coordinate system is already set as the one shown in FIG. 65C. This transform is performed according to a ratio calculated based on the rotation angle. By converting the coordinate system, when an x-axis rotation is performed the upper and lower parts of the window have almost the same display area, as shown in FIG. 65D. This is illustrated by an actual window in FIGS. 64C and 64D. In FIG. 64D, the proportion of the window in which the menu is displayed is smaller and that in which the main text is displayed larger than in FIG. 64B, and so characters in the lower part of the window are much easier to read.

In the window display device of the present embodiment, changing the ratio of the coordinate system enables characters far from the rotation axis, which would have become tightly packed and difficult to read in a normal coordinate system, to be displayed so that they are readily decipherable.

The value of a need not be changed based only on the rotation angle. If the title bar and menu bar part of the window, for example, are judged not to require such a large amount of display space, the coordinate system may be changed only for this part of the window, enabling the display area of the window to be used effectively.

In the present embodiment, explanation took place in conjunction with the block diagram of the ninth embodiment, but the present embodiment may also be used in conjunction with the tenth, eleventh or twelfth embodiments.

In the ninth to fifteenth embodiments, each character font is a conventional font (one pixel is expressed by one bit). However, the present invention may also be applied when characters are displayed using a gray scale font (density for one pixel is expressed in multi-level data expressed as one of three or more values). As shown in FIGS. 66A and B, curved parts of the characters appear smoother and more natural when represented by gray scale fonts (FIG. 66B) rather than conventional fonts (FIG. 66A). Two font types such as these may be applied selectively in the thirteenth and fourteenth embodiments. In the thirteenth embodiment, for example, characters smaller than a certain size are represented by a specified symbol (FIG. 66C), but characters of a medium size may be represented using a gray scale font. This means that conventional font can be used for large characters without obvious jagged curves, a gray scale font for medium characters which would have obvious jagged curves if expressed by a conventional font, and specified symbols for characters that are too small to be readable. As a result, display processing of the characters can be completed in a short time using less memory, without any deterioration in the quality and attractiveness of character display.

Figure 67B:
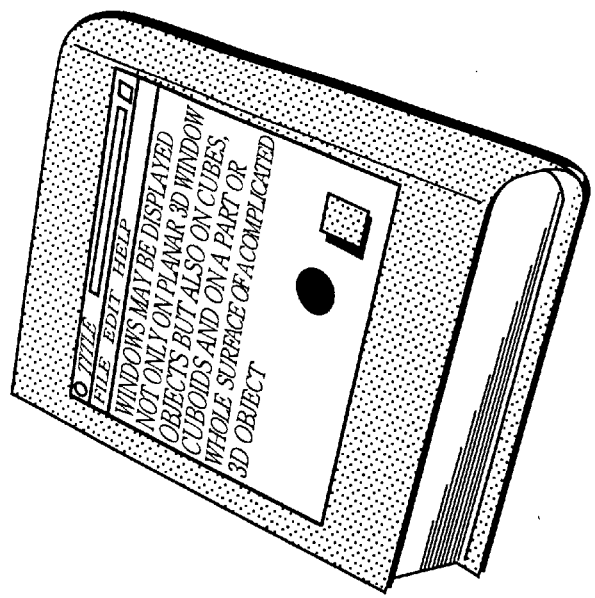
FIGS. 67A and 67B show display screens when the present invention is applied to windows displayed on the surfaces of a solid object.
Figure 67A:
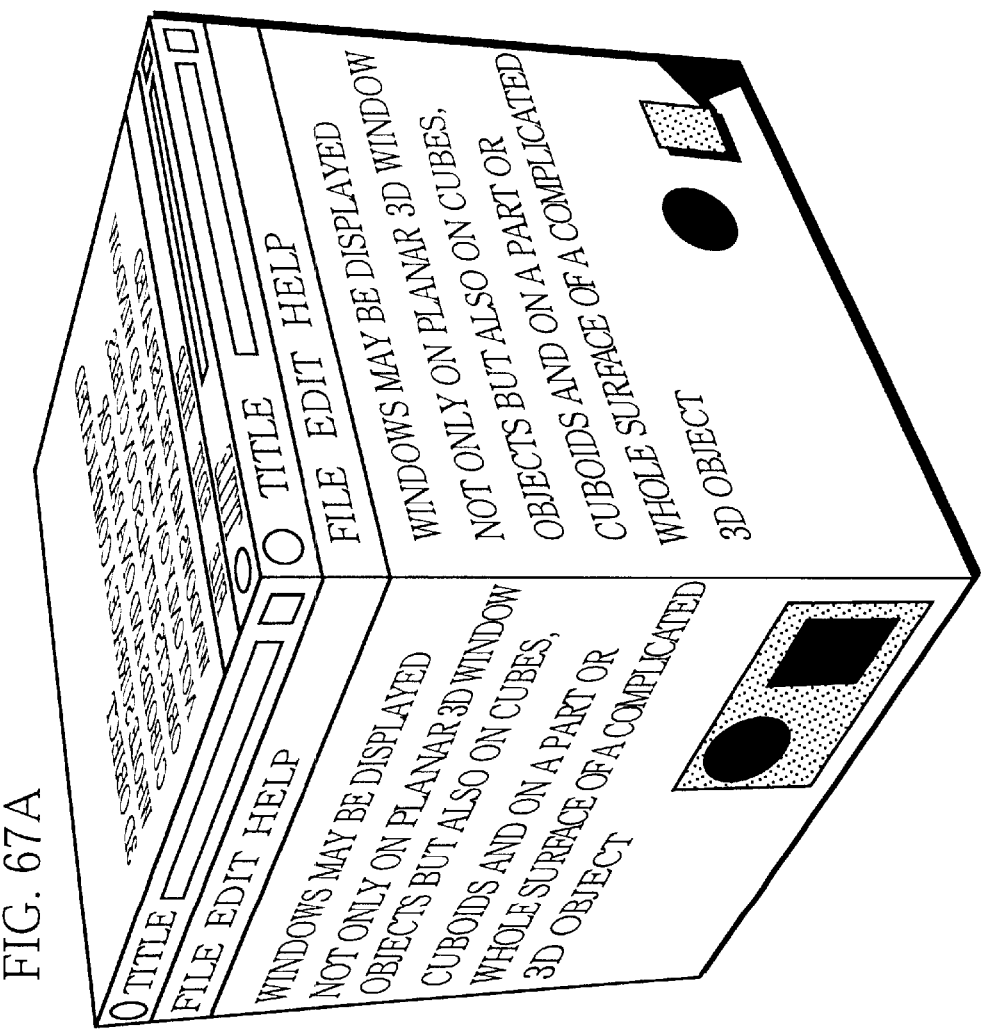

In the above embodiments, windows are rectangular planes, but need not be limited to this shape. Windows may themselves have depth or be polygonal in shape. This is because the display screen of a window may be projected so that it appears in perspective, regardless of its shape. The present invention may of course be applied in cases such as FIG. 67A, in which the faces of a cuboid correspond to a plurality of windows, and FIG. 67B, in which a window is displayed on the cover of a book.

Figure 68A:
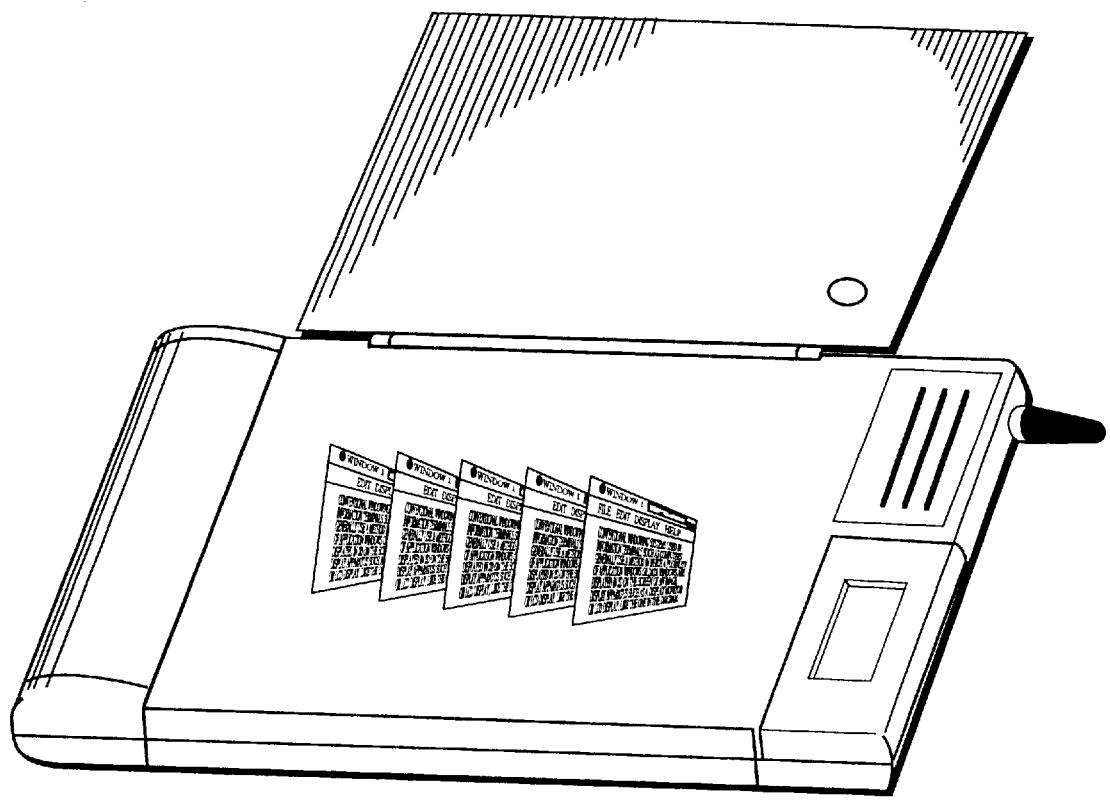
FIGS. 68A and 68B show examples of the application of the present invention in actual electronic products.
Figure 68B:
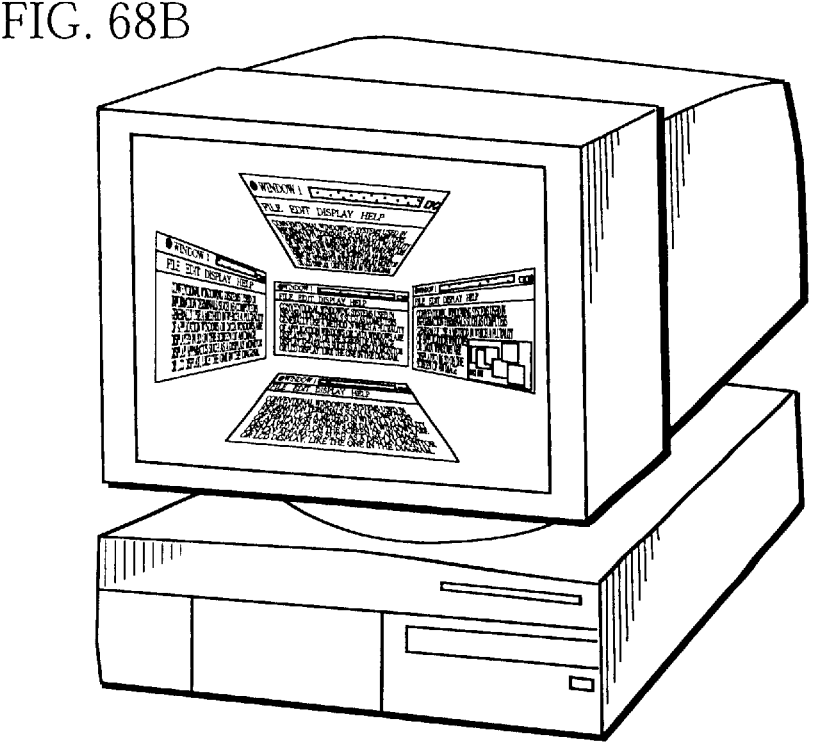
Figure 69:
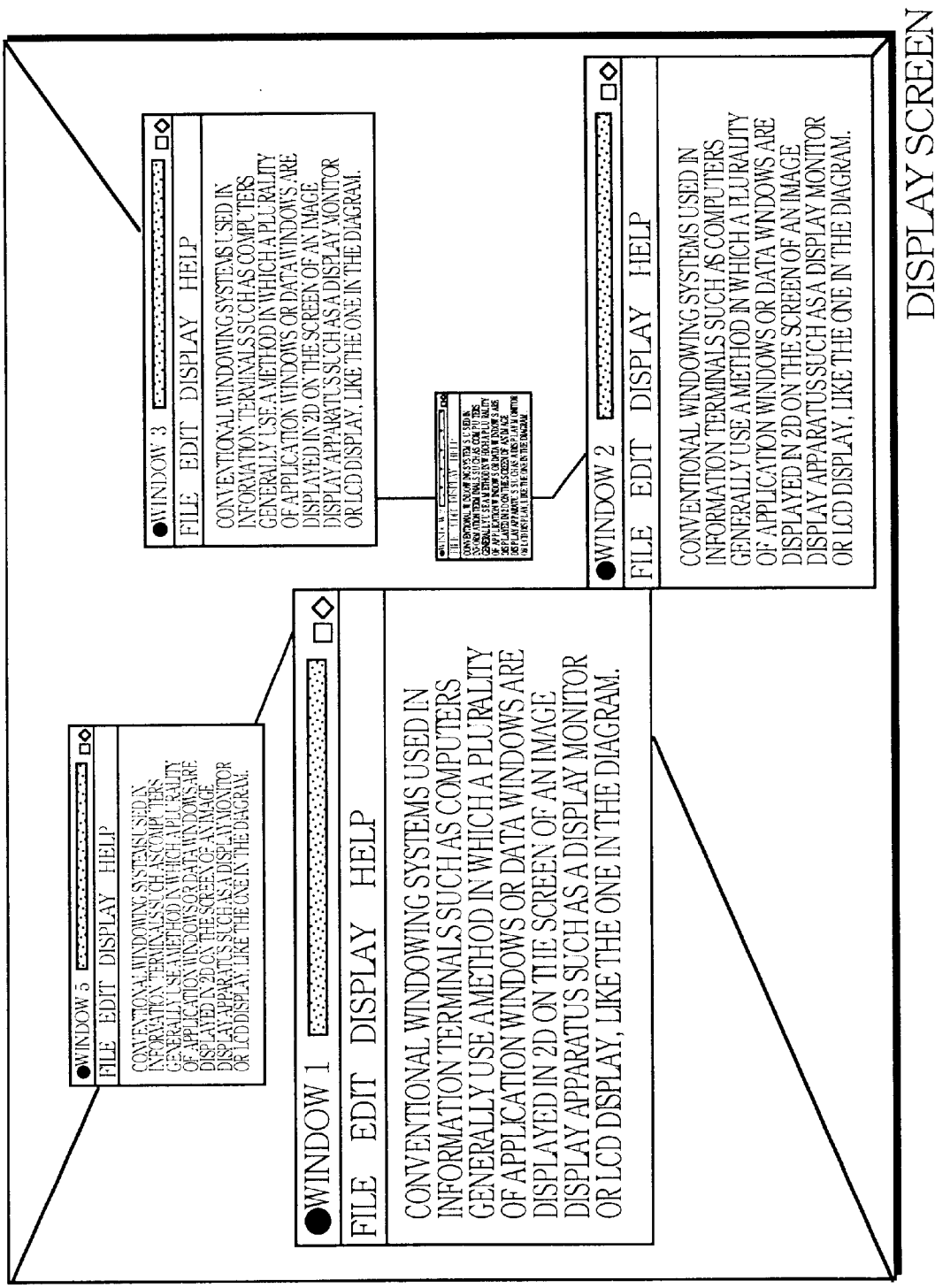
FIG. 69 is an example of a multiple window display screen in the prior art.

As explained above, the window display device of the present invention displays windows so that they appear to be in perspective. As a result, the display area of a window placed in perspective is less than that required to display a window facing the front in a conventional windowing system, enabling the display area of the screen to be used more effectively. Accordingly, the present invention can be applied to a portable information terminal, such as the one in FIG. 68A, which needs to display a large number of windows on a small screen, and to a windowing system for a computer system providing a high-performance GUI.

Industrial Applicability

The invention may be used as a man-machine interface in electronic devices such as personal computers and information processing terminals. It is particularly suited for use as a windowing system interacting with a user using a plurality of windows in a portable information terminal with a small screen.

What is claimed is:

1. A window display device displaying a plurality of windows on a screen, the window display device comprising:

a display data holding means for holding display data representing display content of the plurality of windows;

a position determining means for determining a position for each window in a virtual three-dimensional (3D) space, the positions being such that the windows are not parallel to the screen, wherein the position determining means determines 3D coordinates for each vertex of a window as the position for the window;

an input means for acquiring an indication from a user, wherein the position determining means determines positions according to indications acquired from the input means;

an window analyzing means for detecting, as a key part for each window, a part of the display content fulfilling certain conditions, detection being performed based on display data held by the display data holding means, wherein the position determining means determines the position of windows so that the key parts detected by the window analyzing means are displayed near the front of the virtual 3D space;

a perspective projection means for transforming the display data to project the windows onto the screen in perspective based on the determined positions; and a display means for displaying the transformed display data on the screen.

2. The window display device of claim 1, wherein the window analyzing means determines whether a title is included in the display data for each window and, if a title is included, detects a part of a window in which the title is displayed as the key part.

3. The window display device of claim 1, wherein the window analyzing means determines whether a text and an indication for displaying the text horizontally are included in the display data for each window, and if the text and the indication are included, detects a left side of a window when viewed from the front as the key part.

4. The window display device of claim 1, wherein the window analyzing means determines whether a text, and an indication for displaying the text vertically are included in the display data for each window, and if the text and the indication are included, detects a right side of a window when viewed from the front as the key part.

5. The window display device of claim 1, wherein the position determining means includes an automatic alignment unit for determining the position of a plurality of windows so that the windows are placed in a predetermined arrangement, where at least one window is not parallel with the screen.

6. The window display device of claim 5, wherein the position determining means further includes:

a means for determining a position according to an indication acquired from the input means, so that a window displayed in the alignment position is newly displayed facing the front; and a means for determining a position according to an indication acquired from the input means, so that a window displayed facing the front is returned to the alignment position.

7. The window display device of claim 1, further comprising a window information image position changing means for editing display data stored in the display data holding means so that a window information image is displayed near the front of the virtual 3D space, the window information image being formed from a title bar and a menu bar, and editing being performed based on a position determined by the position determining means.

8. The window display device of claim 1, further comprising a window information image orientation changing means for controlling the position determining means so that, in a window where a window information image is displayed near the front of the virtual 3D space, the window information image faces the front, while the remaining part of the window is not parallel with the screen.

9. The window display device of claim 1, further comprising:

an unreadable area determining means for determining whether an unreadable area displaying characters smaller than a specified size has been generated from display data transformed by the perspective projection means;

a scroll button position determining means for determining a position for a scroll button when an unreadable area has been determined to exist, the position determined as if the unreadable area was not displayed in the window; and a scroll bar attachment means for editing the display data so that a scroll bar image, including a scroll button arranged at the determined position, is attached to the window.

10. The window display device for claim 1, further comprising:

a layer separating means for separating the display data held in the display data holding means, the display data corresponding to a window with a layered construction having a base layer and at least one upper layer, and the display data for each upper layer, but not the base layer, being separated; and a window layer generating means for generating display data for a window layer corresponding to each separated layer,
wherein the position determining means determines a position for each window layer parallel with and a specified distance from the base layer.

11. The window display device of claim 1, further comprising:
a keyword searching means for searching display data held in the display data holding means for parts that match a keyword acquired from the input means, and
a window layer generating means for generating display data for a new window layer in which the keyword is arranged at positions corresponding to the matching parts, and storing the generated display data in the display data holding means,
wherein the position determining means determines a position for the window layer parallel with and a specified distance from a display object window.

12. The window display device of claim 1, further comprising:
an inter-related window specifying means for specifying a group of inter-related windows from the plurality of displayed windows; and
a link information storage means for generating and storing link information used to line up the group of inter-related windows in a concertina arrangement with frames of neighboring windows touching,
wherein the position determining means determines positions of the group of inter-related windows based on the link information.

13. The window display device of claim 12, further comprising:
a link information changing means for changing the link information according to an indication acquired from the input means, so that the group of inter-related windows is lined up with part of the group excluded,
wherein the position determining means determines positions for the group of inter-related windows, apart from the excluded part of the group, based on the changed link information.

14. The window display device of claim 13, further comprising:
an inter-window editing means for editing display data held in the display data holding means according to an indication acquired from the input means, so that editing of display content can be performed between two windows in the group of inter-related windows.

15. A window displaying device displaying a plurality of windows on a screen, the window display device comprising:
a display data holding means for holding display data representing display content of the plurality of windows;
a position determining means for determining a position for each window in a virtual three-dimensional (3D) space, by determining 3D coordinates for each vertex of a window as the position for the window, the positions being such that the windows are not parallel to the screen;
an input means for acquiring an indication from a user, wherein the position determining means determines positions according to indications acquired from the input means;
a window information image orientation changing means for controlling the position determining means so that, in a window where a window information image is displayed near the front of the virtual 3D space, the window information image faces the front, while the remaining part of the window is not parallel with the screen;
a perspective projection means for transforming the display data to project the windows onto the screen in perspective based on the determined positions; and
a display means for displaying the transformed display data on the screen.

16. A window display device displaying a plurality of windows on a screen, the window display device comprising:
a display data holding means for holding display data representing display content of the plurality of windows;
a position determining means for determining a position for each window in a virtual three-dimensional (3D) space, by determining 3D coordinates for each vertex of a window as the position for the window, the positions being such that the windows are not parallel to the screen;
an input means for acquiring an indication from a user, wherein the position determining means determines positions according to indications acquired from the input means;
a layer separating means for separating display data held in the display data holding means, the display data corresponding to a window with a layered construction having a base layer and at least one upper layer, but not the base layer, being separated;
a window layer generating means for generating display data for a window layer corresponding to each separated layer, wherein the position determining means determines a position for each window layer parallel with and a specified distance from the base layer;
a perspective projection means for transforming the display data to project the windows onto the screen in perspective based on the determining positions; and
a display means for displaying the transformed display data on the screen.

17. A window display device displaying a plurality of windows on a screen, the window display device comprising:
a display data holding means for holding display data representing display content of the plurality of windows;
a position determining means for determining a position for each window in a virtual three-dimensional (3D) space, by determining 3D coordinates for each vertex of a window as the position for the window, the positions being such that the windows are not parallel to the screen;
an input means for acquiring an indication from a user, wherein the position determining means determines positions according to indications acquired from the input means
a keyword searching means for searching display data held in the display data holding means for parts that match a keyword acquired from the input means, and
a window layer generating means for generating display data for a new window layer in which the keyword is arranged at positions corresponding to the matching parts, and storing the generated display data in the display data holding means, wherein the position determining means determines a position for the window layer parallel with and a specified distance from a display object window;
a perspective projection means for transforming the display data to project the windows onto the screen in perspective based on the determined positions; and
a display means for displaying the transformed display data on the screen.

18. A window display device displaying a plurality of windows on a screen, the window display device comprising:
a display data holding means for holding a display data representing display content of the plurality of windows;
a position determining means for determining a position for each window in a virtual three-dimension (3D) space, by determining 3D coordinates for each vertex of a window as the position for the window, the positions being such that the windows are not parallel to the screen;
an input means for acquiring an indication from a user, wherein the position determining means determines positions according to indications acquired from the input means
a perspective projection means for transforming the display data to project the windows onto the screen in perspective based on the determined positions; and
a display means for displaying the transformed display data on the screen, wherein the display data holding means includes:
a character data storage unit storing character data formed of character information displayed in the windows; and
a window data storage unit storing window data formed of information concerning non-character information displayed in the windows,
wherein the position placement determining means determines a position for each window and the corresponding characters according to an indication acquired from the input means, and
the perspective projection means includes:
a perspective transform unit generating two-dimensional data showing the vertices and window image data by performing a perspective projection transform on the window data, the perspective projection transform being performed based on window positions determined by the position determining means;
a character data transform unit generating character image data by transforming the character data, based on character positions determined by the position determining unit and two-dimensional data showing vertices obtained by the transform performed by the perspective transform unit; and
a combining unit combining image data generated by the perspective transform unit and image data generated by the character data transform unit,
the display means displaying image data combined by the combining unit, wherein the character data storage unit includes:
a character information storage unit storing information relating to characters displayed in the window, the information relating to characters displayed in the window, the information including at least character position information showing positions of the characters in virtual space, character identifying information specifying which characters should be displayed, and character size information; and
a character image storage unit storing character images,
wherein the window data storage unit stores graphics data, comprising window display content excluding characters, and window coordinate information showing a position of the window in the virtual 3D space,
the position determining means changes the window data and the character position information in response to an indication acquired from the input means;
the perspective transform unit performs a perspective projection transform on window data that has been changed by the position determining means,
the character data transform unit includes:
a character position information conversion unit converting character position information changed by the position determining means into screen position information;
a character image selecting unit selecting a character image from the character images stored in the character image storage unit, the character image corresponding to the character identifying information; and
a character image transform unit transforming the character image selected by the character image selecting unit in accordance with the result of the position changing process performed by the position determining means,
wherein the combining unit combines a character image transformed by the character image transform unit with image data generated by the perspective transform unit, so that the character image is placed at a position in the window shown by the screen position information produced by the character position information conversion unit, the window having been transformed onto the screen by the perspective transform unit,
wherein the character image storage unit stores character images on which a similarity transform has been performed for each of a plurality of representative positions for a window in the virtual 3D space, the similarity transform being related to the shape of the window produced at each of the plurality of positions as a result of a perspective projection transform;
the character image selecting unit selects a character image from the character image storage unit, the character image coinciding with character identifying information stored in the character information storage unit, and with window coordinate information stored in the window data storage unit; and
the character image transform unit finds a scale based on character position information stored in the character information storage unit, and changes the size of the character image selected by the character image selecting unit, the size of the character image being changed according to the scale.

19. The window display device of claim 18, further comprising a coordinate system converting means for changing a scale of a coordinate axis showing screen positions, the scale being changed according to window coordinate information stored in the window data storage unit, wherein the perspective projection unit performs a perspective projection transform, converting the coordinate system to a coordinate system having a coordinate axis with the changed scale.

20. A window display device displaying a plurality of windows on a screen, the window display device comprising:
- a display data holding means for holding a display data representing display content of the plurality of windows;
- a position determining means for determining a position for each window in a virtual three-dimensional (3D) space, by determining 3D coordinates for each vertex of a window as the position for the window, the positions being such that the windows are not parallel to the screen;
- an input means for acquiring an indication from a user, wherein the position determining means determines positions according to indications acquired from the input means
- a perspective projection means for transforming the display data to project the windows onto the screen in perspective based on the determined positions; and
- a display means for displaying the transformed display data on the screen, wherein the display data holding means includes:
  - a character data storage unit storing character data formed of character information displayed in the windows; and
  - a window data storage unit storing window data formed of information concerning non-character information displayed in the windows,
    wherein the position placement determining means determines a position for each window and the corresponding characters according to an indication acquired from the input means, and
- the perspective projection means includes:
  - a perspective transform unit generating two-dimensional data showing the vertices and window image data by performing a perspective projection transform on the window data, the perspective projection transform being performed based on window positions determined by the position determining means;
  - a character data transform unit generating character image data by transforming the character data, based on character positions determined by the position determining unit and two-dimensional data showing vertices obtained by the transform performed by the perspective transform unit; and
  - a combining unit combining image data generated by the perspective transform unit and image data generated by the character data transform unit,
  the display means displaying image data combined by the combining unit,
  wherein the character data storage unit includes:
    a character information storage unit storing information relating to characters displayed in the window, the information relating to characters displayed in the window, the information including at least character position information showing positions of the characters in virtual space, character identifying information specifying which characters should be displayed, and character size information; and
    a character image storage unit storing character images, wherein the window data storage unit stores graphics data, comprising window display content excluding characters, and window coordinate information showing a position of the window in the virtual 3D space,
  the position determining means changes the window data and the character position information in response to an indication acquired from the input means;
  the perspective transform unit performs a perspective projection transform on window data that has been changed by the position determining means,
  the character data transform unit includes:
    a character position information conversion unit converting character position information changed by the position determining means into screen position information;
    a character image selecting unit selecting a character image from the character images stored in the character image storage unit, the character image corresponding to the character identifying information; and
    a character image transform unit transforming the character image selected by the character image selecting unit in accordance with the result of the position changing process performed by the position determining means,
    wherein the combining unit combines a character image transformed by the character image transform unit with image data generated by the perspective transform unit, so that the character image is placed at a position in the window shown by the screen position information produced by the character position information conversion unit, the window having been transformed onto the screen by the perspective transform unit,
    further comprising a character image readability judging means for (1) calculating a size for a transformed character image transformed by the character image transform unit from (a) size information stored in the character information storage unit, and (b) a scale calculated from character position information stored in the character information storage unit, (2) judging whether the transformed character image is readable by comparing the calculated size with a threshold value, and (3) informing the character image selecting unit of the judgment result,
    wherein the character image storage unit further stores symbol images;
    the character image selecting unit selects a specified symbol image from the character image storage unit to be displayed instead of a character image if the character image readability judging means judges that the character is unreadable;
    the character image transform unit does not perform transform processing on the symbol image, and
    the combining unit combines the symbol image with image data generated by the perspective transform unit so that the symbol image is placed at a position in a window shown by screen position information produced by the character position information conversion unit, the window having been transformed onto the screen by the perspective transform unit.

21. The window display device of claim 20, wherein the character image transform unit includes:
- a shape transform unit transforming the shape of the character image using a similarity transform related to the shape of the window transformed by the perspective transform unit; and a scaling unit finding a scale based on character position information stored in the character information storage unit, and changing the size of the character image according to the scale.

22. The window display device of claim 20, wherein the character image transform unit calculates a scale based on character position information stored in the character information storage unit, and changes the size of the character image according to the scale.

23. The window display information of claim 20, wherein the character image transform unit includes:

an aspect ratio conversion unit finding an aspect ratio based on character position information stored in the character information storage unit and changing the length to width ratio of the character image according to the aspect ratio; and a scaling unit finding a scale based on character position information stored in the character information storage unit, and changing the size of the character image according to the scale.

24. A window display device displaying a plurality of windows on a screen, the window display device comprising:

a display data holding means for holding a display data representing display content of the plurality of windows;

a position determining means for determining a position for each window in a virtual three-dimensional (3D) space, by determining 3D coordinates for each vertex of a window as the position for the window, the positions being such that the windows are not parallel to the screen;

an input means for acquiring an indication from a user, wherein the position determining means determines positions according to indications acquired from the input means a perspective projection means for transforming the display data to project the windows onto the screen in perspective based on the determined positions; and a display means for displaying the transformed display data on the screen, wherein the display data holding means includes:

a character data storage unit storing character data formed of character information displayed in the windows; and a window data storage unit storing window data formed of information concerning non-character information displayed in the windows, wherein the position placement determining means determines a position for each window and the corresponding characters according to an indication acquired from the input means, and the perspective projection means includes:

a perspective transform unit generating two-dimensional data showing the vertices and window image data by performing a perspective projection transform on the window data, the perspective projection transform being performed based on window positions determined by the position determining means;

a character data transform unit generating character image data by transforming the character data, based on character positions determined by the position determining unit and two-dimensional data showing vertices obtained by the transform performed by the perspective transform unit; and a combining unit combining image data generated by the perspective transform unit and image data generated by the character data transform unit, the display means displaying image data combined by the combining unit, wherein the character data storage unit includes:

a character information storage unit storing information relating to characters displayed in the window, the information relating to characters displayed in the window, the information including at least character position information showing positions of the characters in virtual space, character identifying information specifying which characters should be displayed, and character size information; and a character image storage unit storing character images, wherein the window data storage unit stores graphics data, comprising window display content excluding characters, and window coordinate information showing a position of the window in the virtual 3D space, the position determining means changes the window data and the character position information in response to an indication acquired from the input means;

the perspective transform unit performs a perspective projection transform on window data that has been changed by the position determining means, the character data transform unit includes:

a character position information conversion unit converting character position information changed by the position determining means into screen position information;

a character image selecting unit selecting a character image from the character images stored in the character image storage unit, the character image corresponding to the character identifying information; and a character image transform unit transforming the character image selected by the character image selecting unit in accordance with the result of the position changing process performed by the position determining means, wherein the combining unit combines a character image transformed by the character image transform unit with image data generated by the perspective transform unit, so that the character image is placed at a position in the window shown by the screen position information produced by the character position information conversion unit, the window having been transformed onto the screen by the perspective transform unit, wherein the character information storage unit further stores font type information showing character font types;

the character image storage unit stores character images for each font type; and the window display device further includes a character image readability judging means for (1) calculating a size for a transformed character image transformed by the character image transform unit from (a) size information stored in the character information storage unit, and (b) a scale calculated from character position information stored in the character information storage unit, (2) judging if the font type of the transformed character image is readable by comparing the calculated size with a threshold value, and (3) informing the character image selecting unit of the judgment result, wherein, when the font type of a character is judged unreadable by the character image readability judging means, the character image selecting unit selects a character image with a specified font type, ignoring font type information stored in the character information storage unit.

\* \* \* \* \*